US012197412B2

(12) United States Patent
Thompson et al.

(10) Patent No.: US 12,197,412 B2
(45) Date of Patent: Jan. 14, 2025

(54) AUTOMATED TRANSFORMATION OF INFORMATION FROM IMAGES TO TEXTUAL REPRESENTATIONS, AND APPLICATIONS THEREFOR

(71) Applicant: TUNGSTEN AUTOMATION CORPORATION, Irvine, CA (US)

(72) Inventors: Steve Thompson, Bonsall, CA (US); Veronika Levdik, Podgorica (ME); Iurii Vymenets, St. Petersburg (RU); Donghan Lee, Anaheim, CA (US)

(73) Assignee: TUNGSTEN AUTOMATION CORPORATION, Irvine, CA (US)

( * ) Notice: Subject to any disclaimer, the term of this patent is extended or adjusted under 35 U.S.C. 154(b) by 0 days.

(21) Appl. No.: 18/763,909

(22) Filed: Jul. 3, 2024

(65) Prior Publication Data
US 2024/0362197 A1   Oct. 31, 2024

Related U.S. Application Data

(63) Continuation-in-part of application No. 18/080,627, filed on Dec. 13, 2022, which is a continuation of
(Continued)

(51) Int. Cl.
*G06F 16/22*        (2019.01)
*G06V 10/70*        (2022.01)
(Continued)

(52) U.S. Cl.
CPC ........ *G06F 16/2282* (2019.01); *G06V 10/70* (2022.01); *G06V 30/412* (2022.01); *G06V 30/413* (2022.01); *G06V 30/414* (2022.01)

(58) Field of Classification Search
CPC ...... G06F 18/214; G06F 40/103; G06F 18/22; G06T 11/206
(Continued)

(56) References Cited

U.S. PATENT DOCUMENTS 5,588,072 A   12/1996 Wang
5,854,853 A   12/1998 Wang
(Continued)

FOREIGN PATENT DOCUMENTS

AU   2019201016 A1   8/2019
CA      2734613 C    6/2020
(Continued)

OTHER PUBLICATIONS

Gatterbauer et al., "Table Extraction Using Spatial Reasoning on the CSS2 Visual Box Model," American Association for Artificial Intelligence, 2006, pp. 1313-1318.
(Continued)

*Primary Examiner* — Hung T Vy
(74) *Attorney, Agent, or Firm* — Zilka-Kotab, P.C.

(57) ABSTRACT

Recent developments in machine learning (commonly coined "artificial intelligence" or "AI") have vastly expanded applications for this technology, such as myriad "chat" agents adept at understanding natural human language. While state of the art generative models can parse text queries from a user and provide comprehensive, accurate responses (including generating images depicting desired content), current implementations struggle with understanding all information present in images of documents, especially images of business documents. In particular, generative models fail to understand structured and semi-structured information, e.g., as indicated by graphical information such as lines, geometric relationships (e.g., indicated by tables, graphs, figures, etc.), formatting, and other contextual information that human readers easily and implicitly understand. The disclosed inventive concepts transform structured and semi-structured information along with textual content into a textual representation that allows generative models to better understand textual content and
(Continued)

non-textual structured information present in document images.

27 Claims, 45 Drawing Sheets

Related U.S. Application Data application No. 17/571,327, filed on Jan. 7, 2022, now Pat. No. 11,977,533.

(60) Provisional application No. 63/524,745, filed on Jul. 3, 2023, provisional application No. 63/170,268, filed on Apr. 2, 2021.

(51) Int. Cl.
   *G06V 30/412* (2022.01)
   *G06V 30/413* (2022.01)
   *G06V 30/414* (2022.01)

(58) Field of Classification Search
   USPC .......................................................... 707/822
   See application file for complete search history.

(56) References Cited

U.S. PATENT DOCUMENTS

| | | | |
|---|---|---|---|
| 7,783,106 | B2 | 8/2010 | Cooper et al. |
| 8,145,677 | B2 | 3/2012 | Al-Shameri |
| 8,345,981 | B2 | 1/2013 | Schmidtler et al. |
| 8,677,279 | B2 * | 3/2014 | Gan ...................... G06F 16/904 |
| | | | 715/764 |
| 9,576,196 | B1 | 2/2017 | Natarajan |
| 10,360,703 | B2 | 7/2019 | Bekas et al. |
| 10,685,462 | B2 | 6/2020 | Bekas et al. |
| 10,726,252 | B2 | 7/2020 | Messina et al. |
| 10,970,535 | B2 | 4/2021 | Mallick et al. |
| 11,977,533 | B2 | 5/2024 | Thompson et al. |
| 11,977,534 | B2 | 5/2024 | Thompson et al. |
| 2006/0082595 | A1 | 4/2006 | Liu et al. |
| 2010/0223276 | A1 | 9/2010 | Al-Shameri et al. |
| 2011/0249905 | A1 | 10/2011 | Singh et al. |
| 2011/0261049 | A1 * | 10/2011 | Cardno ................. G06Q 40/04 |
| | | | 345/419 |
| 2013/0051610 | A1 | 2/2013 | Roach et al. |
| 2016/0034441 | A1 | 2/2016 | Nguyen et al. |
| 2018/0204360 | A1 | 7/2018 | Bekas et al. |
| 2018/0276462 | A1 | 9/2018 | Davis et al. |
| 2018/0336405 | A1 | 11/2018 | Messina et al. |
| 2019/0130614 | A1 | 5/2019 | Bekas et al. |
| 2019/0164047 | A1 | 5/2019 | ter Haar Romenij et al. |
| 2020/0089946 | A1 | 3/2020 | Mallick et al. |
| 2020/0097713 | A1 | 3/2020 | Cramer et al. |
| 2020/0151444 | A1 | 5/2020 | Price et al. |
| 2020/0364451 | A1 * | 11/2020 | Ammar ................ G06V 10/768 |
| 2021/0056429 | A1 | 2/2021 | Gangeh et al. |
| 2021/0133556 | A1 | 5/2021 | Iwamori et al. |
| 2021/0158187 | A1 | 5/2021 | Chavan et al. |
| 2021/0201018 | A1 | 7/2021 | Patel et al. |
| 2021/0216761 | A1 | 7/2021 | Srinivas et al. |
| 2021/0256097 | A1 | 8/2021 | Jayaraman et al. |
| 2021/0350211 | A1 * | 11/2021 | Dalli ...................... H04L 9/008 |
| 2021/0366099 | A1 | 11/2021 | Liao et al. |
| 2022/0067365 | A1 | 3/2022 | Agrawal et al. |
| 2022/0318224 | A1 | 10/2022 | Thompson et al. |
| 2022/0405265 | A1 | 12/2022 | Thompson et al. |
| 2023/0237040 | A1 | 7/2023 | Thompson et al. |

FOREIGN PATENT DOCUMENTS

| | | |
|---|---|---|
| CN | 107862303 A | 4/2019 |
| CN | 111259873 B | 2/2021 |
| DE | 69432585 T2 | 4/2004 |
| EP | 0660256 A2 | 6/1995 |
| EP | 1061469 A1 | 12/2000 |
| EP | 3825909 A1 | 5/2021 |
| GB | 2574608 A | 12/2019 |
| JP | H07234918 A | 9/1995 |
| JP | 3754716 B2 | 3/2006 |
| TW | 258803 B | 10/1995 |
| WO | 2019104879 A1 | 6/2019 |
| WO | 2021034841 A1 | 2/2021 |

OTHER PUBLICATIONS

Kurama, V., "Table Detection, Information Extraction and Structuring using Deep Learning," Nanoets, 2021, 34 pages, retrieved from https://nanonets.com/blog/table-extraction-deep-learning/#table-detection.
Tengli et al., "Learning Table Extraction from Examples," Proceedings of the 20th international conference on Computational Linguistics (Coling'04), Aug. 2004, 7 pages.
Thompson et al., U.S. Appl. No. 17/571,327, filed Jan. 7, 2022.
Thompson et al., U.S. Appl. No. 17/850,835, filed Jun. 27, 2022.
Thompson et al., U.S. Appl. No. 18/080,627, filed Dec. 13, 2022.
Non-Final Office Action from U.S. Appl. No. 17/571,327, dated Apr. 13, 2023.
Non-Final Office Action from U.S. Appl. No. 17/850,835, dated Apr. 13, 2023.
Final Office Action from U.S. Appl. No. 17/571,327, dated Sep. 28, 2023.
Final Office Action from U.S. Appl. No. 17/850,835, dated Oct. 12, 2023.
Non-Final Office Action from U.S. Appl. No. 18/080,627, dated Jan. 5, 2024.
Notice of Allowance from U.S. Appl. No. 17/850,835, dated Feb. 23, 2024.
Notice of Allowance from U.S. Appl. No. 17/571,327, dated Jan. 25, 2024.
Notice of Allowance from U.S. Appl. No. 17/571,327, dated Mar. 5, 2024.
Final Office Action from U.S. Appl. No. 18/080,627, dated Jun. 18, 2024.
Heckbert, P., "Quad-Edge Data Structure and Library," Computer Graphics 2, Carnegie Mellon University, Feb. 14, 2001, 11 pages, retrieved from https://www.cs.cmu.edu/afs/andrew/scs/cs/15-463/2001/pub/src/a2/quadedge.html.
Turmo et al., "Adaptive Information Extraction," ACM Computing Surveys CSUR, Jul. 2006, pp. 1-57, retrieved from https://www.semanticscholar.org/paper/Adaptive-information-extraction-Turmo-Ageno/ef76646912d675c987af5c0fe6bd06f40886ff0d.
Notice of Allowance from U.S. Appl. No. 18/080,627, dated Aug. 28, 2024.
Corrected Notice of Allowance from U.S. Appl. No. 18/080,627, dated Sep. 23, 2024.

* cited by examiner

| | | Actual (actual return after expenses) | | Hypothetical (5% annual return before expenses) | | |
|---|---|---|---|---|---|---|
| Share Class | Beginning Account Value 1/1/18 | Ending Account Value 6/30/18 | Expenses Paid During Period 1/1/18–6/30/18 | Ending Account Value 6/30/18 | Expenses Paid During Period 1/1/18–6/30/18 | Net Annualized Expense Ratio |
| Z | $1,000 | $991.80 | $3.85 | $1,020.93 | $3.91 | 0.78% |
| A | $1,000 | $990.50 | $5.08 | $1,019.89 | $5.16 | 1.03% |
| C | $1,000 | $986.80 | $8.77 | $1,015.97 | $8.90 | 1.78% |
| R | $1,000 | $989.40 | $6.31 | $1,018.45 | $6.41 | 1.28% |
| R6 | $1,000 | $992.00 | $3.41 | $1,021.37 | $3.46 | 0.69% |

FIG. 2B

| | | Fair Value Measurements Using | | |
|---|---|---|---|---|
| | Fair Value | Quoted Prices in Active Markets for Identical Assets (Level 1) | Significant Other Observable Inputs (Level 2) | Significant Unobservable Inputs (Level 3) |
| December 31, 2017 | | | | |
| Assets: | | | | |
| Available-for-sale securities | $ 3,126 | 3,126 | — | — |
| Derivatives | 12,226 | — | 12,226 | — |
| Total assets | $ 15,352 | 3,126 | 12,226 | — |
| Liabilities: | | | | |
| Derivatives | $ 23,051 | — | 23,051 | — |
| Option agreement | 23,980 | — | — | 23,980 |
| Total liabilities | $ 47,031 | — | 23,051 | 23,980 |
| December 25, 2016 | | | | |
| Assets: | | | | |
| Available-for-sale securities | $ 3,736 | 3,736 | — | — |
| Derivatives | 87,894 | — | 87,894 | — |
| Total assets | $ 91,630 | 3,736 | 87,894 | — |
| Liabilities: | | | | |
| Derivatives | $ 11,309 | — | 11,309 | — |
| Option agreement | 28,770 | — | — | 28,770 |
| Total liabilities | $ 40,079 | — | 11,309 | 28,770 |

FIG. 2C

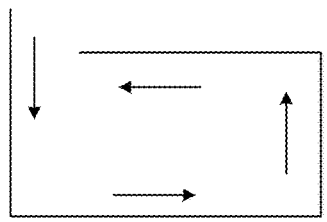
FIG. 7A
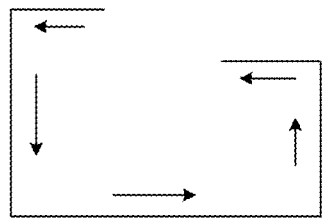
FIG. 7B
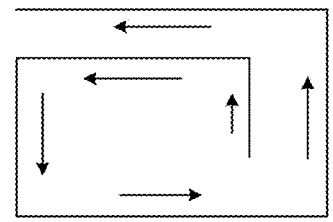
FIG. 7C
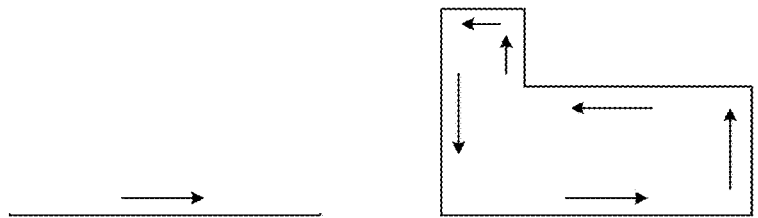
FIG. 7D
FIG. 7E

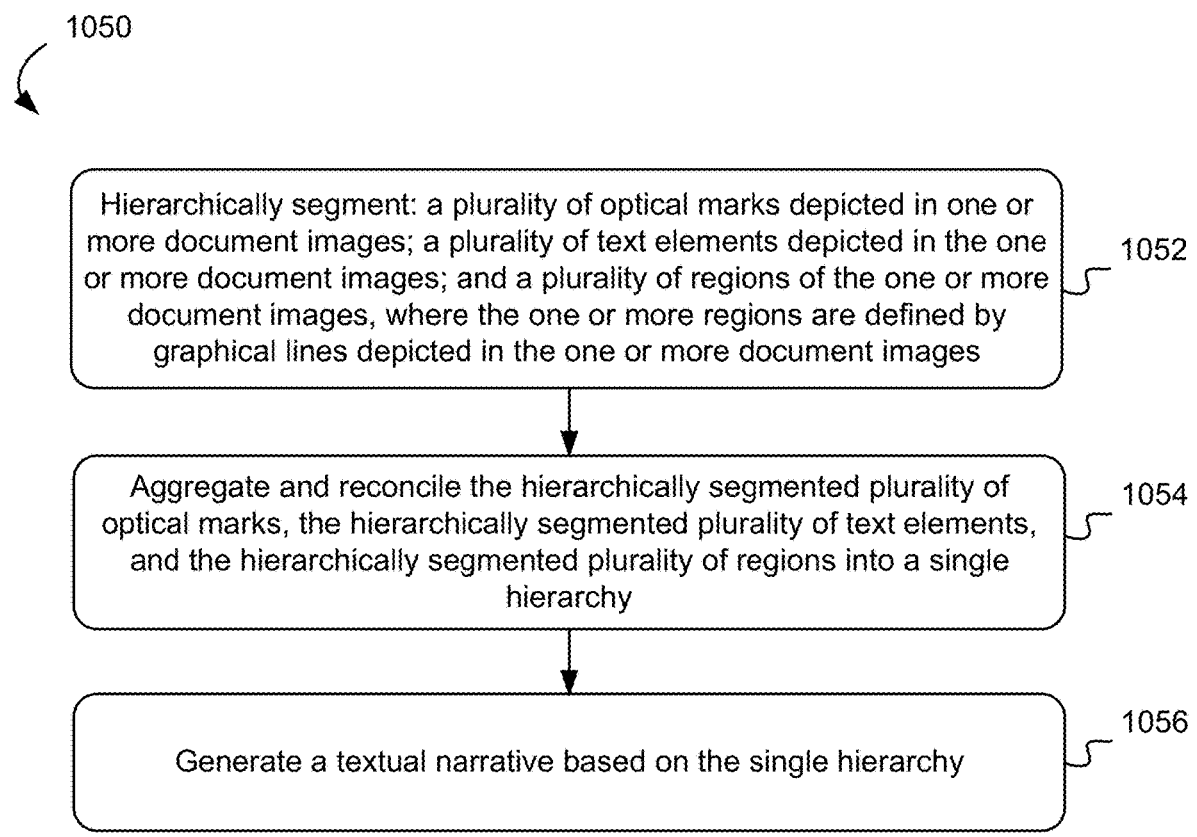
FIG. 10.5

1020

| | 2017 | Quoted Prices in Active Markets for Identical Assets (Level 1) | Significant Other Observable Inputs (Level 2) | Significant Unobservable Inputs (Level 3) |
|---|---|---|---|---|
| Assets: | | | | |
| Cash equivalents | $ 488,432 | $ 356,500 | $ 129,932 | $ — |
| Marketable securities | 48,006 | 48,006 | — | — |
| Derivatives | 1,769 | — | 1,769 | — |
| Total | $ 538,207 | $ 406,506 | $ 131,701 | $ — |
| Liabilities: | | | | |
| Derivatives | $ 21,308 | $ — | $ 21,308 | $ — |

| | 2016 | Quoted Prices in Active Markets for Identical Assets (Level 1) | Significant Other Observable Inputs (Level 2) | Significant Unobservable Inputs (Level 3) |
|---|---|---|---|---|
| Assets: | | | | |
| Cash equivalents | $ 531,519 | $ 426,266 | $ 105,253 | $ — |
| Marketable securities | 43,638 | 38,119 | 5,519 | — |
| Derivatives | 29,034 | — | 29,034 | — |
| Total | $ 604,191 | $ 464,385 | $ 139,806 | $ — |
| Liabilities: | | | | |
| Derivatives | $ 142 | $ — | $ 142 | $ — |

Table of Contents

| | | Page |
|---|---|---|
| PART I | | |
| Item 1. | Business | 3 |
| Item 1A. | Risk Factors | 16 |
| Item 1B. | Unresolved Staff Comments | 34 |
| Item 2. | Properties | 34 |
| Item 3. | Legal Proceedings | 35 |
| Item 4. | Mine Safety Disclosures | 35 |
| PART II | | |
| Item 5. | Market for Registrant's Common Equity, Related Stockholder Matters and Issuer Purchases of Equity Securities | 36 |
| Item 6. | Selected Financial Data | 38 |
| Item 7. | Management's Discussion and Analysis of Financial Condition and Results of Operations | 39 |
| Item 7A. | Quantitative and Qualitative Disclosures about Market Risk | 72 |
| Item 8. | Financial Statements and Supplementary Data | 74 |
| Item 9. | Changes in and Disagreements with Accountants on Accounting and Financial Disclosure | 169 |
| Item 9A. | Controls and Procedures | 169 |
| Item 9B. | Other Information | 169 |
| PART III | | |
| Item 10. | Directors, Executive Officers and Corporate Governance | 170 |
| Item 11. | Executive Compensation | 170 |
| Item 12. | Security Ownership of Certain Beneficial Owners and Management and Related Stockholder Matters | 170 |
| Item 13. | Certain Relationships and Related Transactions, and Director Independence | 170 |
| Item 14. | Principal Accounting Fees and Services | 171 |
| PART IV | | |
| Item 15. | Exhibits and Financial Statement Schedules | 172 |

1102 The following tables show the effect of our derivative instruments designated as cash-flow hedges for the years ended July 29, 2018, July 30, 2017, and July 31, 2016 in other comprehensive income (loss) (OCI) and the Consolidated Statements of Earnings:

| Derivatives Designated as Cash-Flow Hedges | | Total Cash-Flow Hedge OCI Activity | | |
|---|---|---|---|---|
| | | 2018 | 2017 | 2016 |
| OCI derivative gain (loss) at beginning of year | | $ (34) | $ (64) | $ (10) |
| Effective portion of changes in fair value recognized in OCI: | | | | |
| Foreign exchange forward contracts | | 8 | (4) | (8) |
| Forward starting interest rate swaps | | 18 | 23 | (38) |
| Amount of (gain) loss reclassified from OCI to earnings: | Location in Earnings | | | |
| Foreign exchange forward contracts | Cost of products sold | 1 | 6 | (11) |
| Foreign exchange forward contracts | Other expenses / (income) | — | 1 | (3) |
| Forward starting interest rate swaps | Interest expense | 2 | 4 | 6 |
| OCI derivative gain (loss) at end of year | | $ (6) | $ (34) | $ (64) |

Based on current valuations, the amount expected to be reclassified from OCI into earnings within the next 12 months is a gain of $1. The ineffective portion and amount excluded from effectiveness testing were not material.

1104 The following table shows the effects of our derivative instruments not designated as hedges in the Consolidated Statements of Earnings:

| Derivatives not Designated as Hedges | Location of (Gain) Loss Recognized in Earnings | Amount of (Gain) Loss Recognized in Earnings on Derivatives | | |
|---|---|---|---|---|
| | | 2018 | 2017 | 2016 |
| Foreign exchange forward contracts | Cost of products sold | $ (1) | $ — | $ — |
| Foreign exchange forward contracts | Other expenses / (income) | (1) | 14 | (1) |
| Cross currency swap contracts | Other expenses / (income) | — | — | 2 |
| Commodity derivative contracts | Cost of products sold | (3) | (11) | 8 |
| Deferred compensation derivative contracts | Administrative expenses | (2) | (3) | (6) |
| Treasury rate lock contracts | Interest expense | (18) | — | — |
| Total | | $ (25) | $ — | $ 3 |

14. Variable Interest Entity

In February 2016, we agreed to make a capital commitment subject to certain qualifications of up to $125 to Acre, a limited partnership formed to make venture capital investments in innovative new companies in food and food-related industries. Acre is managed by its general partner, Acre Ventures GP, LLC, which is independent of us. We are the sole limited partner of Acre and own a 99.8% interest. Our share of earnings (loss) is calculated according to the terms of the partnership agreement. Acre is a VIE. We have determined that we are the primary beneficiary. Therefore, we consolidate Acre and account for the third party ownership as a noncontrolling interest. Through July 29, 2018, we funded $81 of the capital commitment. On August 29, 2018, we provided notice of termination of the investment period and have no obligation to make any further capital contributions to Acre for new investments, but are required to pay obligations made prior to the notice of termination, the management fee and permitted partnership expenses.

FIG. 11A

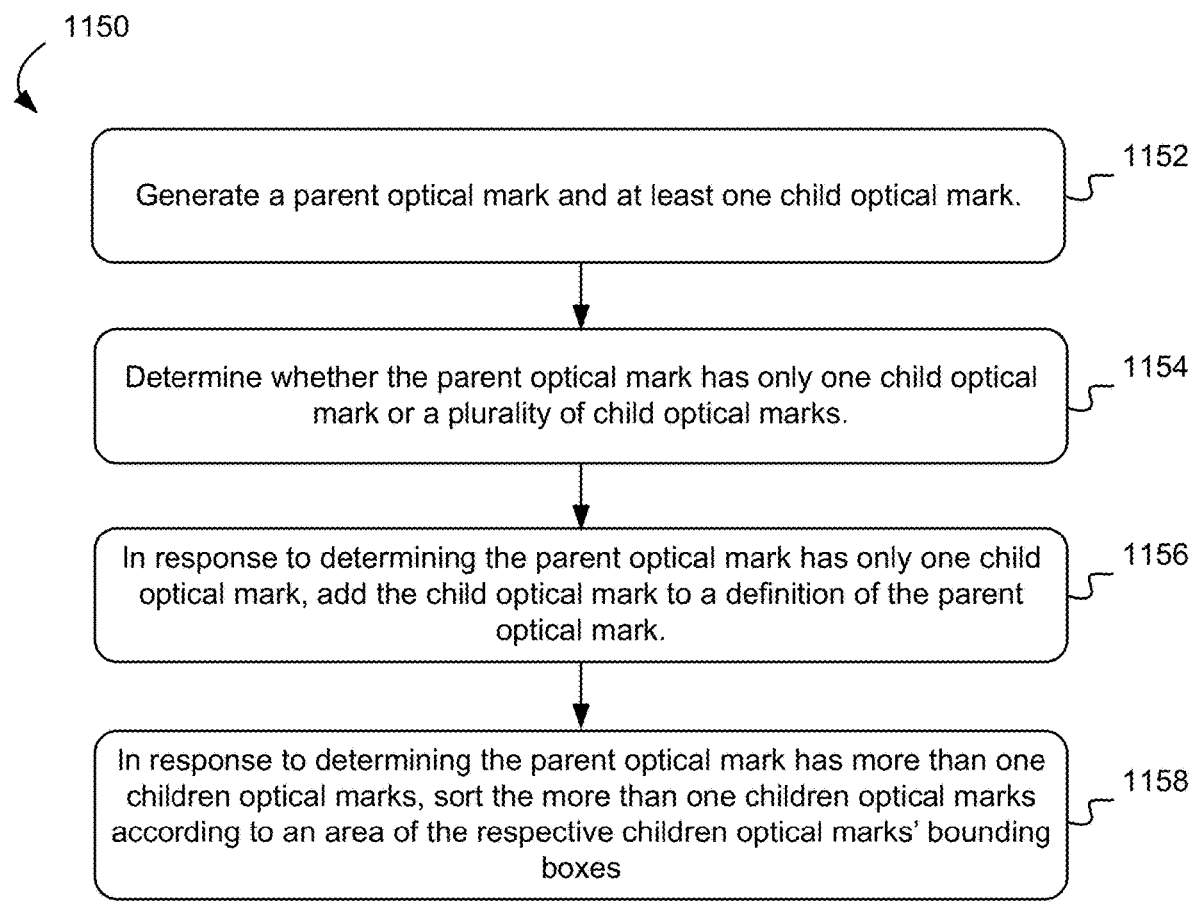
FIG. 11.5

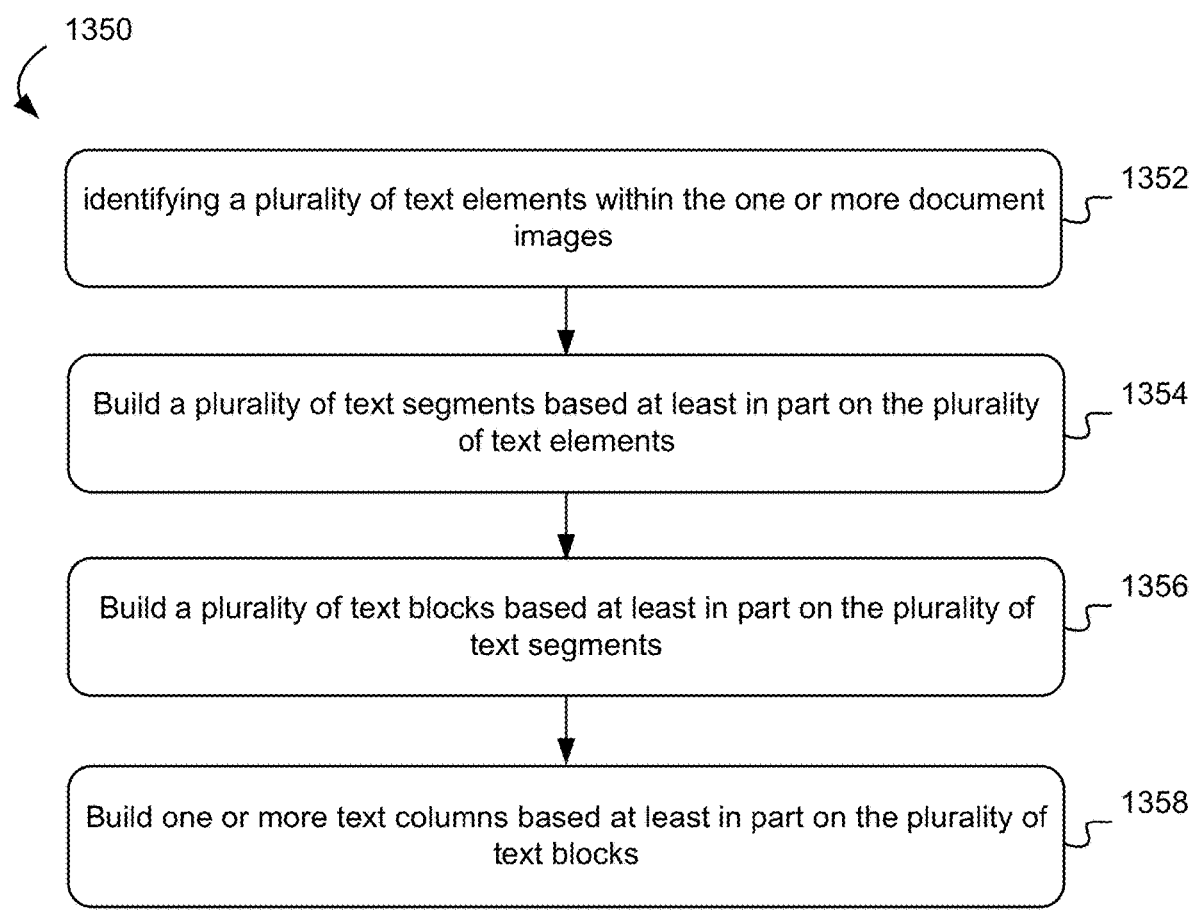
FIG. 13.5

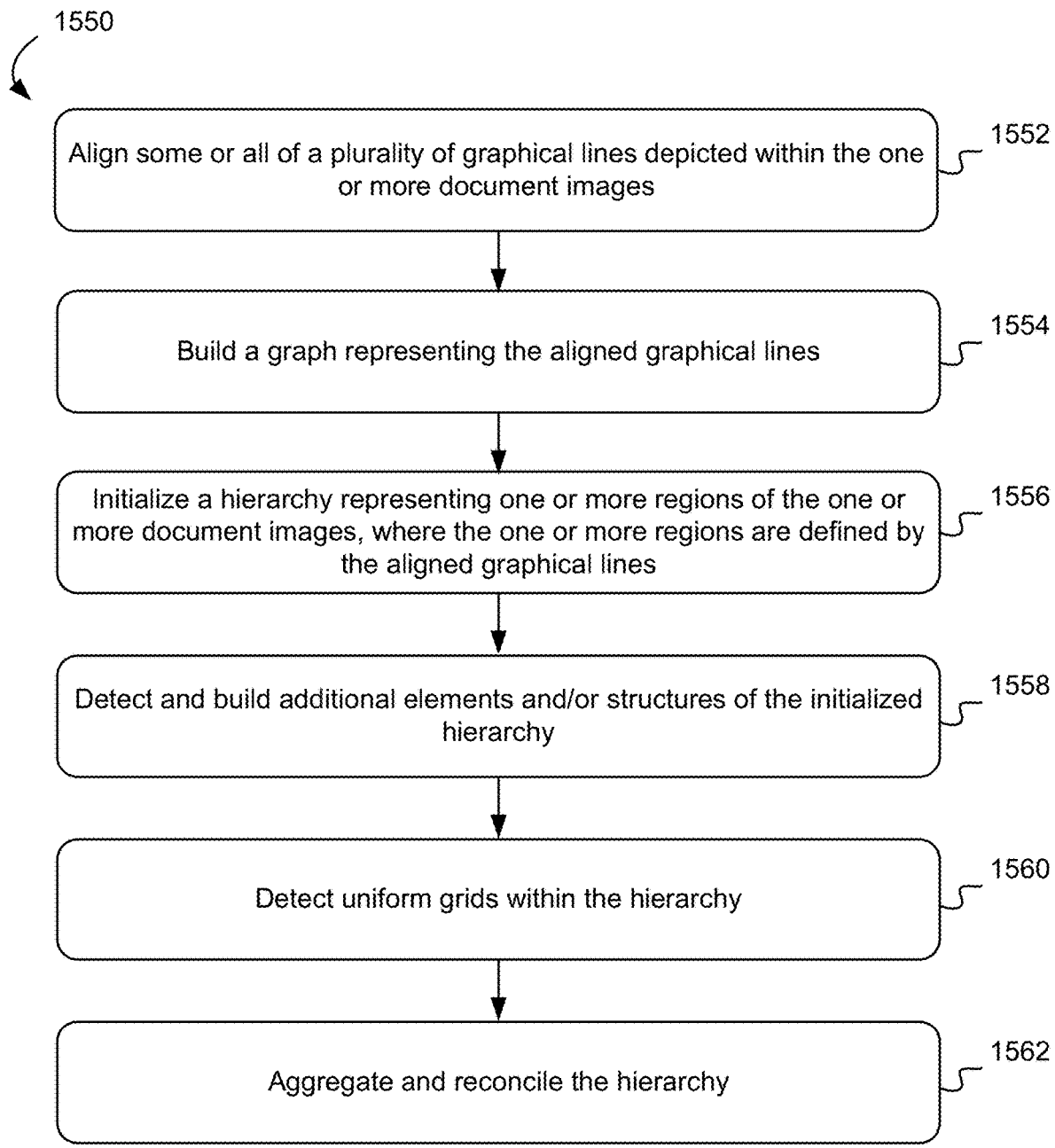
FIG. 15.5

2600

| Check Date: | 03-05-2021 |
| --- | --- |
| Pay Period Begin Date: | 02-13-2021 |
| Pay Period End Date: | 02-26-2021 |

| Federal Status: | M | Other Income: | $0.00 |
| --- | --- | --- | --- |
| Federal Exemptions: | 1 | Deductions: | $0.00 |
| Multiple Jobs: | false | State Tax Status: | M |
| Dependents: | 0 | State Exemptions: | 1 |

FIG. 26

2700
```
{
    "1":  "Check Date: 03-05-2021",
    "2":  "Pay Period Begin Date: 02-13-2021",
    "3":  "Pay Period End Date: 02-26-2021",
    "4":  "Federal Status: M",
    "5":  "Other Income: $0.00",
    "6":  "Federal Exemptions: 1",
    "7":  "Deductions: $0.00",
    "8":  "Multiple Jobs: false",
    "9":  "State Tax Status: M",
    "10": "Dependents: 0",
    "11": "State Exemptions: 1",
}
```

| Name, Vorname der Person | Geburtsdatum |
|---|---|
| Schmidt, Anna | 1 2 0 9 1 9 8 7 |

| | Name, Vorname der Person | Geburtsdatum |
|---|---|---|
| 3202 | Schmidt, Anna | 1 2 0 9 1 9 8 7 |
| 3204 | Kind (Name, Vorname) | Geburtsdatum |
| | Schmidt, Julia | 2 6 1 2 2 0 1 4 |
| 3206 | Straße, Hausnummer | |
| | Rosenstraße, 14 | |
| 3208 | Postleizahl | Wohnort |
| | 2 2 0 1 4 | Musterstadt |

| TON | 1211P003 |
|---|---|
| ITEM | |

AUTOMATED TRANSFORMATION OF INFORMATION FROM IMAGES TO TEXTUAL REPRESENTATIONS, AND APPLICATIONS THEREFOR

RELATED APPLICATIONS

The present application claims the benefit of priority to U.S. Provisional Patent Application No. 63/524,745, filed Jul. 3, 2023 and entitled "AUTOMATED TRANSFORMATION OF INFORMATION FROM IMAGES TO TEXTUAL REPRESENTATIONS, AND APPLICATIONS THEREFOR"; furthermore, the present application is a continuation in part of U.S. patent application Ser. No. 18/080,627, filed Dec. 13, 2022 and entitled "AUTOMATED DOCUMENT PROCESSING FOR DETECTING, EXTRACTING, AND ANALYZING TABLES AND TABULAR DATA," (published as U.S. Patent Gazette Publication No. 2023/0237040 on Jul. 27, 2023), which is a continuation of U.S. patent application Ser. No. 17/571,327, filed Jan. 7, 2022 and entitled the same (published as U.S. Patent Gazette Publication No. 2022/0318224 on Oct. 6, 2022), and which claims the benefit of priority to U.S. Provisional Patent Application No. 63/170,268, filed Apr. 2, 2021; priority is hereby claimed to the foregoing related applications, the contents of which are herein incorporated by reference.

FIELD OF INVENTION

The present invention relates to transforming information represented in image form into a textual representation (or equivalent thereof, such as an audio representation) to facilitate comprehension thereof, particularly comprehension of semi-structured and structured information present within the image representation.

The inventive concepts presented herein have myriad applications, including but not limited to improving the function of Large Language Models (LLMs) by extending the ability to comprehend structured and semi-structured information presented in images, particularly images of documents, and even more particularly images of business documents. The descriptions provided herein accordingly refer to various applications of the inventive concepts in the context of LLMs. It shall be understood that such descriptions are provided by way of example, not limitation, and other applications of the inventive concepts disclosed herein that will be appreciated by skilled artisans upon reviewing the specification and drawings and are to be considered within the scope of the present application.

BACKGROUND

Images, particularly images of documents, and even more particularly images of "large" and/or "complex" documents like financial reports, medical charts, explanation-of-benefits documents, etc. often contain large volumes of diverse data. The data are diverse with respect to the formatting, content, extent (e.g., single/multi-page), and/or layout, even among similar document types (e.g., the same type of document prepared by different entities and/or according to different conventions, organizational schemes, languages, etc., may exhibit drastically different organization, expression, arrangement, etc. despite depicting the same content or substantially the same content (also referred to herein as "unstructured information")).

Indeed, there is a long-felt need in the field of document analysis and processing for techniques, especially automated, computerized techniques, for accurately and faithfully processing and analyzing the information represented within images of documents despite the vast volume and extensive diversity with which that information may be presented.

Existing tools such as character recognition of various types (particularly optical character recognition (OCR)), object recognition, etc. for analyzing information present in images have advanced to the point of being capable of detecting, extracting, and analyzing (comprehending) various aspects of images, especially (unstructured) textual information. In addition, advancement in natural language processing techniques, in particular techniques based on large neural networks (often referred to as "deep learning" or "artificial intelligence"), has recently resulted in development of so-called "generative" models such as OpenAI's CHATGPT®, Google's BARD®, etc. that display new capabilities to process textual input and respond to complex prompts, inquiries, and perform unique tasks such as creative composition of "new" material, such as essays, songs, poems, images, etc.

However, these generative models remain under extensive development, and ongoing efforts seek to improve the models' capabilities, particularly regarding comprehension of input, and interpretation of context within the vast sources of information used to perform requested tasks. Exemplary problems observed to-date include chat agents behaving inappropriately, from overt examples such as attempting to persuade users to undertake detrimental actions or acting in a hostile manner, to more insidious problems such as exposure of confidential information or improper application of bias. These problems can have significant real-world impact (a chat bot behaving like an obsessive stalker, comparing users to reviled historical figures, discriminating against certain populations, making threats, etc.) and must be addressed in order to realize safe, reliable operation of generative models including but not limited to LLMs.

These problems, among myriad others that will be appreciated by those having utilized state of the art generative models, arise in part due to the limited capability of the model to fully understand the context of the document, particularly context represented in structured information. Current techniques for understanding information in documents include extensive supervised learning/training, in which a human user manually defines field(s) within a document, and provides guidance regarding at least the field name (i.e., label), and how to properly extract values within a field (e.g., what format the information is presented in, such as a phone number versus a social security number versus a tax ID or employee ID number, etc. and may include defining a mask to utilize for extracting appropriate information from the identified field, the location of the field in representative instances of the document type in question (such as exemplified by the "point and click" training paradigm), or other requisite guidance as is understood in the art). Using such user-provided and managed information, an extraction engine may be trained, e.g., using learn-by-example methodology, predefined heuristics or rules, templates, landmarks, regular expressions, etc., to identify the same type of fields and information included therein in similar documents.

In addition, conventional extraction may involve associating pieces of identified information (e.g., identified characters, words, key/value pairs, optical marks and labels, etc.), also generally referred to as "tagging" or "labeling" in the art. Conventionally, this process is largely, if not entirely, automated. However, in the absence of a predefined schema to facilitate understanding of the identified information, different but equivalent manners of expression (e.g., "DOB" vs. "Date of Birth" vs. "Birthdate" vs. "Name Day"; or "Purchase Order" vs. "PO #" vs. "Order Number" vs. 'bestsellnummer", etc.) cannot be accurately or consistently resolved. Similarly, errors in the recognition process are not easily resolved, and can cause confusion or misinformation in downstream use of the extracted information.

Accordingly, conventional extraction approaches typically serialize the content (i.e. unstructured text) in a naïve manner (i.e., according to the natural reading order of the language represented in the image, such as strict top-down, left-right sorting of words for English and other Western languages) into a one-dimensional stream (i.e., a single string) and provide the 1D stream to the model for interpretation. These approaches are particularly unsuitable for image input, for the reasons described above among others that are understood by skilled artisans continuing to develop and improve generative model performance in various applications and contexts. While LLMs outperform previous technology, this approach discards the substantial amount of additional context and information that can be derived from the structure of the document. As one very simple example, consider a common arrangement of a form including a table comprised of two lines of text, wherein each column corresponds to a field, each column header resides in the first line of text and indicates the field name, and each field value resides in the second line of text and is located immediately below and centered relative to the corresponding field name.

Naively serializing text in this manner yields a string that lists sequential field names (which appear left-to-right on the same line of text within the document) followed by a set of sequential values from the same fields. The association between the field names and values is immediately obvious to a human reader based on education and experience, but the association is not simple for an automated agent to derive. For example, consider the scenario where one or more of the fields includes a field name but no corresponding value. It is very easy for the automated agent to improperly associate values with the wrong field name, especially if the nature of the values are similar (e.g., all alphabetic characters, no easily definable pattern or mask). Some approaches may attempt to address this problem by including some form of semantic indexing, which may segment large documents into multiple ID streams, and only sending the most "relevant" streams to the generative model. However, relying on semantic meaning to determine relevancy is imperfect at best, and still fails to include or consider context that is provided by the structure of the document (e.g. the document layout as identified by the geometric relationship between textual elements, graphical lines, font sizes and styles, indentation, underlining, etc.), and any relevant graphical information.

These conventional approaches are extremely labor intensive, and subject to bias based on the sufficiency and accuracy of the sample documents provided for training the model. For instance, a model trained to recognize individuals from a certain country, belonging to a particular demographic, etc., based on facial recognition, optionally in combination with analyzing information provided by the individual or associated with the individual (e.g., information presented in a passport or on a driver license or other suitable form of photographic identification) is trained based on a sample set that includes many examples of individuals and associated information that come from or belong to a particular geographic region or a specific demographic category. The algorithm may perform well with respect to identifying other individuals coming from or belonging to the same geographic region or specific demographic category, but will struggle to accurately and consistently identify individuals that come from, or belong to, other geographic regions or demographic categories.

Solving these and related issues with state of the art extraction and recognition models cannot be solved simply by supplementing training data. Selection of examples for a training set is typically performed by humans, which have our own inherent (often unrecognized) biases. Moreover, it may be the case that training data that suitably represent various demographic groups, types of information, diversity of information, etc. are simply not available for use in training such models, and human efforts to manually curate training sets may inadvertently exacerbate the existing problems, or create entirely new problems not anticipated by the human curator.

For instance, one example of such problems involved training a neural network to identify the biological sex of individuals depicted in images. The neural network initially performed well using photographs from the 1950s for both training and testing. However, cultural shifts in the 1960s included males beginning to wear longer hair. Since, unbeknownst to the original developers, hair length was used by the neural network internally as a key distinguishing feature, a strong bias was introduced that, while quite accurate on photographs from the 1950s, caused the neural network to improperly identify individuals' sex in photographs from the 1960s. Accordingly, neural networks and other extraction and recognition models need to be "maintained" by retraining with new samples, such that the training set remains representative. This is an insidious challenge, since it is often unknown which parameters are being used to distinguish categories, and also to identify when and which kinds of shifts within such parameters will lead to erroneous results.

These problems have been well documented and have caused substantial issues, e.g., within the context of law enforcement, immigration, employment discrimination, conducting various financial transactions, etc., and must be addressed to ensure technology does not exacerbate many long-standing social issues that are increasingly present and problematic in the modern world.

Accordingly, the presently disclosed inventive concepts focus on problems associated with comprehending textual input, especially textual input provided in the form of image(s). Currently, the standard approach involves performing some form of character recognition on the image (itself an imperfect process that introduces noise and errors as will be described further hereinbelow), concatenating the identifying characters into a single, one-dimensional textual string, and providing the textual string to the generative model. While this conventional approach enables the impressive capabilities observed to-date, it also perpetuates some of the problems highlighted above, as well as general inaccuracy and/or lack of precision in provided results, and others that are well understood by persons having ordinary skill in the art of automated document analysis.

In part, the problems observed to date arise from the fact that extraction models and similar applications lack the ability to understand context, particularly context that is provided/indicated/contained in the form of structured information (and, optionally, semi-structured information) included in documents. As understood herein, the term "structured information" refers to information other than textual content per se. Examples of "structured" information include the formatting, location, and arrangement of text elements as represented within an image, including in many cases the location of text elements relative to graphical aspects such as lines, shading, etc., and the organization/hierarchy of the textual elements that are implied by the geometric relationships between all such elements (both textual and graphical). For instance, text elements such as words, phrases, sentences, paragraphs, line breaks, text blocks, columns, tables, graphs, the hierarchy of sections and sub-sections, etc. all provide information in addition to the literal text that is included in these elements. This "additional" information is not derived from the text itself, but rather from the manner in which the text is positioned and rendered (e.g., formatted) within the overall geometric organization (or the "structure") of the document portrayed in the image(s). "Additional" (structured) information may alternatively or additionally be determined based on relationships between graphical elements and text elements, etc. For instance, graphical lines of a table, chart, figure, etc. may indicate different textual elements (such as observed values for measures represented within the figure) are associated with one another, with a description (such as may be provided on a given axis of a figure), with particular units, etc.

While humans are notoriously capable of understanding structured information, computers and other automated tools are equally notoriously incapable of achieving comparable comprehension-hence the extensive efforts and expenditures to-date attempting to solve this seemingly perpetual challenge. For example, a major focus of machine learning remains on the task of understanding structured information within documents, and requires extensive reliance on a-priori assumptions regarding "ground truths", annotation and guidance by human "experts", and training models on vast "training" datasets-which may not be properly representative of the actual truth (e.g., datasets not being fully or appropriately representative of the diverse members of the population the model is designed to understand). Moreover, the resulting model, even if accurate to desired degree, is very limited in scope—the model's performance is limited to processing the type of information upon which it was trained, in which the human is a true "expert", and the extent to which a-priori assumptions turn out to be true. Accordingly, conventional efforts to understanding contextual information are cost-intensive, time-intensive, and of only limited applicability even if an accurate model can be produced in the first instance.

It would therefore be of practical benefit to implement systems, techniques, and computer program products generally configured to facilitate comprehension of information, particularly structured information, presented within images of documents. Preferably, such solutions should facilitate comprehension without relying on extensive training, perform robustly across diverse applications as well as types and forms of input information, and avoid reliance on upfront assumptions about the nature of the input.

SUMMARY OF THE INVENTION

The presently described inventive concepts principally relate to processing images, and particularly images of documents, to create a data structure that accurately captures the information, particularly as derived from structured and semi-structured information present in images, especially images of business documents. In particular, the inventive concepts presented herein facilitate the ability for extraction models to understand structured information and context that is inherently understood by humans, such as relationships between different pieces of information presented within the document as indicated by geometric arrangement of content (i.e., unstructured text), by the presence of graphical elements (particularly graphical lines), by symbols (such as units) associated with content, etc. as would be understood by a person having ordinary skill in the art upon reading the present disclosure.

The inventive concepts thus generally include the following concepts, aspects, embodiments, implementations, features, approaches, etc., which may be combined in any suitable manner as would be appreciated by those having ordinary skill in the art upon reading the present descriptions. Moreover, while the exemplary concepts described below are generally presented in the form of methods, algorithms, processes, etc., it shall be appreciated that said methods, algorithms, processes, etc. may be embodied as computer program products, computer readable instructions, computer readable media containing computer readable instructions, etc. that are configured to cause a computer (or component(s) thereof, such as processor(s), memory, etc.) to perform the methods, algorithms, processes, etc. upon execution thereof, in alternative embodiments.

According to one approach, a computer-implemented method for automated transformation of information present in one or more document images into a textual representation includes: hierarchically segmenting: a plurality of optical marks depicted in the one or more document images; a plurality of text elements depicted in the one or more document images; and a plurality of regions of the one or more document images, wherein the plurality of regions are defined by graphical lines depicted in the one or more document images; aggregating and reconciling the hierarchically segmented plurality of optical marks, the hierarchically segmented plurality of text elements, and the hierarchically segmented plurality of regions into a single hierarchy; and generating a textual narrative based on the single hierarchy. In additional and/or alternative approaches, the method for automated transformation of information present in one or more document images into a textual representation may include any combination or permutation of the following aspects, functions, operations, features, etc. For instance, hierarchically segmenting the plurality of optical marks may involve: determining a plurality of optical mark segments, wherein the plurality of optical mark segments comprise optical mark keys, optical mark selections, optical mark values, and optical mark groups; and determining relationships between some or all of the plurality of optical mark segments. Moreover, hierarchically segmenting the plurality of text elements may include: determining a plurality of text blocks based at least in part on the plurality of text elements; and determining one or more text columns based at least in part on the plurality of text blocks. Hierarchically segmenting the plurality of regions may comprise: aligning some or all of the plurality of graphical lines; building a graph representing the aligned graphical lines; initializing a hierarchy representing the plurality of regions; and detecting additional elements and/or structures of the initialized hierarchy. The graph may be an orthogonal, quad-edge graph. Additionally or alternatively, detecting the additional elements and/or structures of the initialized hierarchy may involve: finding a rectangular covering for the initialized hierarchy; searching for coverings within the initialized hierarchy; building the additional elements and/or structures into the initialized hierarchy; and merging child structures into the initialized hierarchy. Aggregating and reconciling the hierarchy may comprise: merging a first hierarchy representing the hierarchically segmented plurality of optical marks and a second hierarchy representing the hierarchically segmented plurality of text elements into a third hierarchy representing the hierarchically segmented plurality of regions to create the single hierarchy. Furthermore, generating the textual narrative comprises: rendering the single hierarchy into a tree-based data structure. Preferably, the textual narrative is arranged according to a natural reading order of a language depicted in the one or more document images. In select approaches, the single hierarchy represents structured information of the one or more document images and unstructured information of the one or more document images.

According to another implementation, a computer-implemented method for automated transformation of information present in one or more document images into a textual representation includes: interpreting, using an intelligent narrator, structured information and unstructured information present on one or more document images to generate a narrative representing the structured information and the unstructured information. The method may also include generating a prompt, where the prompt comprises: a task definition and the narrative. The task definition preferably includes: an identification of a type of task to be performed by the generative model; one or more steps of the type of task to be performed by the generative model; a type of data structure to generate as a result of the type of task to be performed by the generative model; an arrangement of information included in the result; an instruction specifying how the generative model should handle negative outcomes that may occur while performing the type of task; or any combination thereof. The prompt may further comprise: an identification of one or more document types represented in the one or more documents interpreted by the intelligent narrator; a structure of the narrative; and/or one or more sources of potential error in the narrative. The method, according to select implementations, may additionally or alternatively include processing the prompt using a generative model to generate a result, wherein the result comprises a plurality of field names and associated values, and wherein the field names and the associated values are presented in an order and a form defined by a field schema. According to one aspect, the method may include configuring the intelligent narrator to interpret and describe the structured information and the unstructured information present on the one or more document images. Configuring the intelligent narrator may involve defining a plurality of fields according to a field schema; where each of the plurality of fields independently comprises a field name and a field description; and the field name and the field description of the plurality of fields are each independently described in a natural language. The field schema may be a data structure. Moreover, generating the narrative preferably comprises: performing image segmentation and/or text segmentation on the one or more document images, wherein performing the image segmentation and/or text segmentation identifies: a plurality of segments represented on the one or more document images; and any content within each segment; ordering the identified segments based at least in part on: geometric relationships between the plurality of segments; and a natural reading order of a language in which the content is represented; ordering the content, if any, within each segment, wherein the ordering of the content is based at least in part on the natural reading order of a language in which the content is represented; and generating a data structure representing a structure of the one or more document images, wherein the data structure is generated based at least in part on either or both of: the ordering of the plurality of segments; and/or the ordering of the content. Moreover, the structure of the one or more document images may include a hierarchy of the plurality of segments. Meanwhile, performing the text segmentation and/or the image segmentation further comprises determining a hierarchy of the plurality of segments. Each segment preferably corresponds to a unique rectangular region represented within the one or more document images. In some approaches, the natural reading order of the language comprises: a natural starting position for reading the language; a natural end position for reading the language; and an orientation of textual elements according to the language. For example, the natural starting position may be selected from the group consisting of: a top-left portion of the one or more document images, a top-right portion of the one or more document images, a bottom-left portion of the one or more document images, a bottom-right portion of the one or more document images, a top-left portion of a given segment depicted in the one or more document images, a top-right portion of the given segment depicted in the one or more document images, a bottom-left portion of the given segment depicted in the one or more document images, and a bottom-right portion of the given segment depicted in the one or more document images; while the natural end position may be selected from the group consisting of: the top-left portion of the one or more document images, the top-right portion of the one or more document images, the bottom-left portion of the one or more document images, the bottom-right portion of the one or more document images, the top-left portion of the given segment depicted in the one or more document images, the top-right portion of the given segment depicted in the one or more document images, the bottom-left portion of the given segment depicted in the one or more document images, and the bottom-right portion of the given segment depicted in the one or more document images; and the orientation of textual elements may be selected from the group consisting of: left-to-right, right-to-left, top-to-bottom, bottom-to-top, and combinations thereof. In still further approaches, interpreting comprises employing, using the intelligent narrator, a plurality of expert modules, wherein each expert module is configured to perform one or more tasks selected from the group consisting of: image processing, text recognition, optical mark recognition, image segmentation, text segmentation, narrative generation, and page aggregation; and the method may further comprise: orchestrating execution of the plurality of expert modules; and resolving conflicts within some or all results of executing the plurality of expert modules to generate resolved results, where orchestrating the execution of the plurality of modules involves controlling the order in which the modules are executed. Some or all of the expert modules may independently comprise at least one neural network. According to some implementations, optical mark recognition may involve: identifying a plurality of optical marks depicted within the one or more document images, wherein the plurality of optical marks comprise a plurality of graphical lines each independently associated with one or more text elements; determining a status of the plurality of optical marks; and building an optical mark element hierarchy of the plurality of optical marks. Identifying the plurality of optical marks may utilize a visual object detection machine learning technique, a heuristic image processing technique, or a combination thereof. Text segmentation, according to one implementation, may comprise: creating a plurality of text segments based at least in part on text elements represented within the one or more documents;

creating a plurality of text blocks based at least in part on the plurality of text segments; and creating a plurality of text columns based at least in part on the plurality of text blocks. In more approaches, image segmentation may include: aligning a plurality of graphical lines depicted on the one or more document images; building a graph representing the aligned graphical lines; initializing a hierarchy based at least in part on the graph; detecting additional elements and/or structures of the hierarchy based at least in part on the graph. The method may additionally or alternatively include aggregating and reconciling the additional elements and/or structures of the initialized hierarchy to generate a final hierarchy representing the structured information and the unstructured information present on the one or more document images. Preferably, generating the narrative comprises generating a data structure representing a hierarchy of the structured information and the unstructured information present on the one or more document images, where the hierarchy comprises: a plurality of optical mark recognition (OMR) elements recognized by performing the optical mark recognition task; a plurality of text segments, text blocks, and/or text columns identified by performing the text segmentation task; and a plurality of image segments identified by performing the image segmentation task. More preferably, the narrative is a textual representation of the hierarchy, and the textual representation is arranged according to a natural reading order of a language depicted in the one or more document images. In some implementations, page aggregation includes: assembling a plurality of hierarchies into the narrative, wherein each hierarchy corresponds to one of the document images, and wherein the narrative comprises a single data structure, or, alternatively, assembling the document images into a single composite image; and providing the single composite image to the plurality of expert modules for processing.

According to another aspect, a computer-implemented method for recognizing optical mark (OMR) elements within one or more document images includes: identifying a plurality of optical marks based at least in part on a plurality of graphical lines depicted within the one or more document images; determining a status of the plurality of optical marks; building an optical mark element hierarchy based at least in part on the plurality of optical marks; and ordering the plurality of optical marks. The optical marks preferably comprise one or more check boxes, and/or one or more radio buttons. According to various approaches, identifying the plurality of optical marks may utilize a visual object detection machine learning technique, a heuristic image processing technique, or a combination thereof. Preferably, determining the status of the plurality of optical marks comprises: determining a black pixel density of a region within each optical mark, wherein the region is defined by graphical lines of the optical mark; and evaluating the black pixel density of the region within each optical mark against a predetermined black pixel density threshold. The computer-implemented method may also include assigning a textual element to each of the plurality of optical marks, where the textual element assigned to each of the plurality of optical marks is either "selected" or "not selected". In more approaches, identifying the plurality of optical marks comprises: binarizing the one or more document images; applying a dilation algorithm to the one or more binarized document images; and applying an erosion algorithm to the one or more binarized document images. The method may alternatively or additionally involve validating the plurality of optical marks, where validating the plurality of optical marks may comprise: identifying, from among the plurality of graphical lines one or more horizontal graphical lines; and identifying, from among the one or more horizontal graphical lines, one or more candidate optical marks; and designating one or more of the candidate optical marks as a valid optical mark in response to determining the one or more candidate optical marks independently satisfy a plurality of criteria of valid optical marks. The plurality of criteria of valid optical marks comprise: a first member of a given one of the one or more pairs of horizontal graphical lines is characterized by different y-axis coordinate value than a second member of the given one of the one or more pairs of horizontal graphical lines; the first and second members of the pair of horizontal lines are characterized by a common x-axis coordinate value; at least one vertical line oriented substantially perpendicular to the pair of horizontal lines intersects the pair of horizontal lines at a common x-axis coordinate thereof.

In yet another approach, a computer-implemented method for building a hierarchy of optical mark (OMR) elements depicted within one or more document images, the method comprising: identifying a parent optical mark and one or more child optical marks belonging to the parent optical mark; determining whether the parent optical mark has only one child optical mark or more than one child optical mark; in response to determining the parent optical mark has only one child optical mark, adding the one child optical mark to a definition of the parent optical mark; in response to determining the parent optical mark has more than one child optical mark: determining a bounding box area of each of the more than one child optical mark; and adding at least one of the more than one child optical mark to the definition of the parent optical mark; and determining whether any other of the one or more child optical marks are spatially located within a bounding box of the one child optical mark added to the definition of the parent optical mark or the at least one of the more than one child optical mark added to the definition of the parent optical mark; and in response to determining any other of the one or more child optical marks are spatially located within the bounding box of the one child optical mark added to the definition of the parent optical mark or the at least one of the more than one child optical mark added to the definition of the parent optical mark, adding the other of the one or more child optical marks as sub-children optical marks of the one child optical mark added to the definition of the parent optical mark or the at least one of the more than one child optical mark added to the definition of the parent optical mark. Identifying the parent optical mark and the one or more child optical marks belonging to the parent optical mark may be based at least in part on analyzing a plurality of graphical lines depicted within the one or more document images using a visual object detection machine learning technique and/or a heuristic image processing technique. The method may also include validating the hierarchy of optical mark elements, where validating the hierarchy of optical mark elements comprises: evaluating a type of the optical mark elements; evaluating relationships between the optical mark elements (and the relationships may be established by the hierarchy); determining whether any child optical mark element having a type "OMR Key" or "OMR Selection" is not designated as a child of a parent optical mark element having a type "OMR Group"; in response to determining any child optical mark element having the type "OMR Key" or "OMR Selection" is not designated as a child of a parent optical mark element having the type "OMR Group", removing the child optical mark from the hierarchy; determining whether any child optical mark element having a type "OMR Key" or "OMR Selection" has a sub-child optical mark element; and/or, in response to determining any child optical mark element having the type "OMR Key" or "OMR Selection" has a sub-child optical mark element, removing the child optical mark from the hierarchy.

According to still yet another approach, a computer-implemented method for ordering optical mark (OMR) elements includes determining a y-coordinate value of a central vertical point for each of one or more child optical mark elements of a given parent optical mark element; grouping some or all of the one or more child mark elements into at least one line of child optical mark elements based at least in part on the determined y-coordinate value(s) thereof; determining an x-coordinate value of a central horizontal point for each of the one or more child optical mark elements of the given parent optical mark element; and ordering some or all of the one or more child optical mark elements based at least in part on the determined x-coordinate value(s) and y-coordinate value(s) thereof. The method may also include sorting the one or more child optical mark elements based at least in part on: the determined x-coordinate value(s) thereof; the determined y-coordinate value(s) thereof; or both the determined x-coordinate value(s) thereof and the determined y-coordinate value(s) thereof.

In accordance with further aspects of the presently described inventive concepts, a computer-implemented method for segmenting text depicted within one or more document images includes: identifying a plurality of text elements within the one or more document images; building a plurality of text segments based at least in part on the plurality of text elements; building a plurality of text blocks based at least in part on the plurality of text segments; and building one or more text columns based at least in part on the plurality of text blocks. Each of the plurality of text elements may independently comprise one or more connected components represented in the one or more document images, where each of the plurality of text elements independently correspond to one or more physical marking on a physical document depicted in the one or more document images. Moreover, the plurality of text segments may each independently comprise an ordered plurality of some or all of the text elements, where each ordered plurality of the some or all of the text elements may be independently associated with one another in the one or more document images. The plurality of text blocks may each independently comprise a combination of two or more of the plurality of text segments that meet a predetermined set of geometric criteria and/or a predetermined set of visual criteria. Additionally or alternatively, the one or more text columns may each independently comprise a predetermined set of text blocks that meet: a predetermined set of geometric criteria; a predetermined set of visual criteria; a predetermined set of semantic criteria; or any combination of the predetermined set of geometric criteria, the predetermined set of visual criteria, and the predetermined set of semantic criteria. In select implementations, identifying the plurality of text elements within the one or more document images, building the plurality of text segments based at least in part on the plurality of text elements, building the plurality of text blocks based at least in part on the plurality of text segments, and building the one or more text columns based at least in part on the plurality of text blocks may each independently utilize one or more predefined parameters selected from the group consisting of: a "Containing Percentage" parameter, a "Vertical Element Threshold" parameter, a "Vertical Distance Threshold" parameter, a "Horizontal Intersection Threshold" parameter, a "Vertical Distance Threshold for Columns" parameter, a "Horizontal Intersection Threshold for Columns" parameter, a "Horizontal Distance Threshold" parameter, a "Join Overlapping Text Blocks" parameter, a "Join Nested and/or Overlapping Columns" parameter, and combinations thereof.

According to additional approaches, a computer-implemented method for creating text blocks from text elements depicted within one or more document images includes: building one or more text segments from some or all of the text elements that satisfy a first set of predetermined criteria; joining some or all of the one or more text segments into a set of one or more joined text blocks based at least in part on evaluating the one or more text segments against a second set of predetermined criteria and add the set of one or more joined text blocks to a set of text blocks; joining two or more overlapping text blocks within the set of text blocks; and ordering the set of text blocks based at least in part on evaluating the set of text blocks against a third set of predetermined criteria. The method may also include adding, to the set of text blocks, one or more list blocks, where the one or more list blocks each independently comprise one or more text lines designated as a list using a layout analysis and zone identification technique; and/or adding, to the set of text blocks, one or more related text blocks, where the one or more related text blocks each independently comprise one or more text elements within a same geometric neighborhood of one another. Preferably, the first set of predetermined criteria comprise, for a first of the text elements "A" and a second of the text elements "B": (1) a leftmost x-coordinate of B is greater or equal to a leftmost x-coordinate of A; (2) a common vertical span of A and B is greater or equal to half of a height of B; (3) A and B are not separated by any vertical line(s); and (4) a horizontal distance between the two text elements A and B is less than a product of the value of a Horizontal Distance Threshold parameter and an average width of characters appearing in the one or more document images. Moreover, the second set of predetermined criteria preferably comprise, for the first of the text elements "A" and the second of the text elements "B": (1) an uppermost y-coordinate of B is greater than or equal to an uppermost y-coordinate of A; (2) A and B are either left-aligned or center-aligned; (3) Len ($[A_{left}, A_{right}] \cap [B_{left}, B_{right}]$)$\geq$HIT$\times$W, where $A_{left}$ and $A_{right}$ are leftmost and the rightmost coordinates of A, $B_{left}$ and $B_{right}$ are the leftmost and the rightmost coordinates of B, Len is a length of an intersection of two intervals, HIT is a value of a Horizontal Intersection Threshold parameter, and W is a width of a document depicted in the one or more document images; (4) $B_{top} - A_{bottom} \leq$ VDT$\times H_{avg}$, where $B_{top}$ is a top coordinate of B, $A_{bottom}$ is a bottom coordinate of A, VDT is a value of a Vertical Distance Threshold parameter, and Have is an average height of text elements in the document; (5) A and B are not separated by any horizontal graphical lines or any discovered text blocks; (6) A and B each independently contain more than two of the text elements or contain a text element with at least two non-punctuation characters; and (7) a value of a y-coordinate extent of A is at most twice a value of a y-coordinate extent of B, and a value of a y-coordinate extent of B is at most twice a value of a y-coordinate extent of A. Moreover still, the third set of predetermined criteria preferably comprise, for the first of the text elements "A" and the second of the text elements "B": (1) If ($A_{top} \geq B_{bottom}$): FALSE; (2) If ($A_{top} < B_{bottom}$) AND ($B_{top} \geq A_{bottom}$): TRUE; (3) If ($A_{top} < B_{bottom}$) AND ($B_{top} < A_{bottom}$) AND ($A_{right} \leq B_{left}$): TRUE; (4); If ($A_{top} < B_{bottom}$) AND ($B_{top} < A_{bottom}$) AND ($A_{right} > B_{left}$) AND ($B_{right} \leq A_{left}$): FALSE; (5) If ($A_{top} < B_{bottom}$) AND ($B_{top}$<$A_{bottom}$) AND ($A_{right}$>$B_{left}$) AND ($B_{right}$>$A_{left}$) AND ($A_{left}$<$B_{left}$): TRUE; and (6) If ($A_{top}$<$B_{bottom}$) AND ($B_{top}$<$A_{bottom}$) AND ($A_{right}$>$B_{left}$) AND ($B_{right}$>$A_{left}$) AND ($A_{left}$≥$B_{left}$): FALSE, where $A_{top}$, $A_{bottom}$, $A_{left}$, $A_{right}$ are respectively a top, a bottom, a leftmost and a rightmost coordinate of A; and $B_{top}$, $B_{bottom}$, $B_{left}$, $B_{right}$ are respectively a top, a bottom, a leftmost and a rightmost coordinate of B. In select approaches, the method may involve identifying connected components of the set of text blocks.

In accordance with another illustrative aspect of the inventive concepts disclosed herein, a computer-implemented method for creating text columns from text blocks depicted within one or more document images includes: creating, from a plurality of text blocks, a set of one or more text columns based at least in part on evaluating the plurality of text blocks against one or more predetermined criteria; joining, from among the set of text columns, any nested columns and/or any overlapping columns based at least in part on evaluating connected component(s) thereof; splitting one or more columns within the set of text columns based at least in part on a predominant alignment thereof; adding, to the set of text columns, a new text column for each of any list block(s) that do not belong already to the set of text columns; designating one or more columns within the set of text columns as data text columns based at least in part on a presence of either: a data text element, a data text segment, a data text block, or any combination thereof, in the one or more columns within the set of text columns; in response to determining a column within of the set of text columns overlaps vertically with a data text column, designating the overlapping text column as a table column; and discarding, from the set of text columns, the data text columns and the table columns. The predetermined set of criteria may comprise, for a first text block "A" and a second text block "B" each in the plurality of text blocks: (1) an uppermost y-coordinate value of B is greater than or equal to a lowermost y-coordinate value of A; (2) Len ([$A_{left}$, $A_{right}$] ∩ [$B_{left}$, $B_{right}$])≥HITC×max($W_A$, $W_B$), wherein Alert is a leftmost x-coordinate of A, $A_{right}$ is a rightmost x-coordinates of A, $B_{left}$ is a leftmost x-coordinate of B, $B_{right}$ is a rightmost x-coordinates of B, Len is a length of an intersection of two intervals, HITC is a value of a Horizontal Intersection Threshold for Columns parameter, $W_A$ is a width of A, and $W_B$ is a width of B; (3) $B_{top}$ −$A_{bottom}$≤VDTC×$H_{avg}$, wherein $B_{top}$ is a top y-coordinate of B, $A_{bottom}$ is a bottom y-coordinate of A, VDTC is a value of a Vertical Distance Threshold for Columns parameter, and Have is an average height of text elements appearing in the one or more document images; and (4) A and B are not horizontally separated by any horizontal lines or text blocks. The method may also involve removing select first pairs of text blocks from the set of text blocks; where the select first pairs of text blocks initiate at a node of a directed edge graph representing one of the text blocks; and more than one edge of the directed edge graph initiates at said node of the directed edge graph. Additionally or alternatively, the method may involve removing select second pairs of text blocks from the set of text blocks; wherein the select second pairs of text blocks terminate at a node of a directed edge graph representing one of the text blocks; and wherein more than one edge of the directed edge graph terminates at said node of the directed edge graph. The method may also include defining connected components of the set of text columns; and/or identifying one or more maximal subcolumns within the set of text columns based at least in part on a predominant alignment of the plurality of text blocks. In some approaches, designating the overlapping text column as a table column may be performed in response to determining the overlapping text column and the data text column overlap by at least 50% of a vertical span thereof. In more approaches, the data text elements, the data text segments, and the data text blocks may each independently have one or more characteristics selected from the group consisting of: at least a predetermined percentage of text elements being numerical; having a predefined format; being associated with a predefined symbol or substring; and combinations thereof.

In further approaches, the inventive concepts include a computer-implemented method for segmenting graphical elements depicted within one or more document images, which involves: aligning some or all of a plurality of graphical lines depicted within the one or more document images; building a graph representing the aligned graphical lines; initializing a hierarchy representing one or more regions of the one or more document images, wherein the one or more regions are defined by the aligned graphical lines; detecting additional elements and/or structures of the initialized hierarchy; detecting uniform grids within the hierarchy; and aggregating and reconciling the hierarchy. Aligning the some or all of the plurality of graphical lines may include: identifying one or more one-dimensional clusters based on connected components of the some or all of the plurality of graphical lines; independently identifying one or more connected sub-components within the one or more one-dimensional clusters; sorting the some or all of the plurality of graphical lines based at least in part on x-coordinate values thereof and/or y-coordinate values thereof; joining overlapping ones of the plurality of graphical lines; and/or removing ones of the plurality of graphical lines that have one or more characteristics selected from the group consisting of: having a length less than a predetermined threshold; spanning an entire x-axis or an entire y-axis of the one or more document images; and combinations thereof. Preferably, the graph is an orthogonal, quad-edge graph. Moreover, detecting the additional elements and/or structures of the initialized hierarchy may comprise: finding a rectangular covering for the initialized hierarchy; searching for coverings within the initialized hierarchy; building the additional elements and/or structures into the initialized hierarchy; and merging child structures into the initialized hierarchy. Correspondingly, searching for the coverings within the initialized hierarchy may include detecting TEETH structures and embedding the TEETH structures into the initialized hierarchy. Aggregating and reconciling the hierarchy may comprise adding optical marks and text to the hierarchy, and the aggregated and reconciled hierarchy is preferably a single, tree-based data structure representing text, optical marks, and graphical lines depicted in the one or more document images.

According to further aspects of the presently described inventive concepts, a computer-implemented method for building a graph representing regions defined by graphical elements depicted within one or more document images includes: identifying, within an orthogonal, quad-edge graph representing horizontal lines and vertical lines present in an image of a document, a plurality of vertices and a plurality of connections between adjacent vertices; creating, within the orthogonal quad-edge graph, a plurality of connections between endpoints of each of the horizontal lines and endpoints of each of the vertical lines; building, within the orthogonal quad-edge graph, a set of quad edges having edge relations based on the plurality of vertices and the plurality of connections; creating a plurality of faces based on the set of quad edges; and determining a covering rectangle for some or all of the plurality of faces. Adjacent vertices are preferably characterized by being a closest pair of vertices located in either an upward, a downward, a leftward, or a rightward direction of one another. The method may also involve identifying intersections between some or all of the horizontal lines and some or all of the vertical lines. Furthermore, building the set of quad edges may involve creating directed edges and directional relationships therebetween. Preferably, creating the plurality of faces comprises creating a left face for each edge in the set of quad edges that does not already have a defined left face connecting all edges bounding said left face in a rectangular path. In addition, creating the plurality of faces may comprise defining a bounding path for each edge in the set of quad edges in a counter clockwise direction.

According to still yet further aspects of the presently described inventive concepts, computer-implemented method for detecting a hierarchy within a graph representing graphical lines depicted in one or more document images includes: finding a rectangular covering for the initialized hierarchy; searching for coverings within the initialized hierarchy; detecting and building additional elements and/or structures into the hierarchy; and merging child structures into the hierarchy. Finding the rectangular covering for the initialized hierarchy may involve extracting a rectangular covering for a given set of edges in the graph; where the extracting is based at least in part on a given starting rectangle; and the rectangular covering is contained within a maximum rectangle. Meanwhile, searching for the coverings within the initialized hierarchy may comprise building a covering hierarchy C for: a given set of inner edges of the graph $E^{inner}$; a starting bounding rectangle of the graph $R^i$, wherein the starting bounding rectangle delimits a plurality of inner edges and a plurality of bounding edges of a covering from edges external to the covering hierarchy C; and a maximum rectangle $R^{max}$. Detecting and building the additional elements and/or structures into the hierarchy may include: detecting a hierarchy for a given set of faces of the graph, wherein the given set of faces are within a given parental structure of the graph; and building the detected hierarchy into an initialized hierarchy, wherein the initialized hierarchy corresponds to an entirety of a page depicted in one of the one or more document images. The hierarchy preferably comprises a single, tree-based data structure representing the one or more regions of the one or more document images.

Additional features and advantages of the various aspects of the inventive concepts presented herein will become apparent to those having ordinary skill in the art upon a full review of the detailed descriptions provided below, in accompaniment with the several drawings. It shall be further appreciated that the inventive concepts presented herein are demonstrated by way of example rather than limitation, and may be combined in any suitable fashion, combination, permutation, etc. without departing from the scope of the inventive concepts unless expressly stated otherwise herein.

BRIEF DESCRIPTION OF THE DRAWINGS

The present disclosure includes or refers to various figures and appendices, or contents thereof. All information depicted in the figures and appendices is to be considered part of the application, without limitation, unless expressly stated otherwise.

FIGS. 2A-2C illustrate column headers and row headers, and "qualification" of certain column headers and/or row headers as column descriptors and/or row descriptors, respectively, according to several illustrative embodiments.

FIGS. 7A-7E show various exemplary illustrations of non-rectangular faces, according to different embodiments.

FIG. 10.5 is a flowchart of a method for automated transformation of information present in one or more document images into a textual representation, according to one approach.

FIG. 10C depicts a table including standalone dashes, which are commonly missed (equivalently, not recognized) using conventional character recognition techniques, according to one exemplary embodiment.

FIG. 10D shows one illustrative embodiment of a table including ellipses.

FIG. 10E depicts an exemplary textual element and corresponding unit/value symbol, according to one embodiment.

FIG. 11A illustrates an example of a document including multiple tables embedded within text, according to one embodiment.

FIG. 11.5 is a flowchart of a method for recognizing optical marks, according to one aspect.

FIG. 13.5 is a flowchart of a method for segmenting text, according to one aspect.

FIG. 15.5 is a flowchart of a method for performing image segmentation, according to one aspect.

FIG. 26 is an image of a page snippet including text elements and graphical elements, according to one exemplary embodiment.

FIG. 27 is an exemplary depiction of a data structure representing a hierarchy of elements in a document, according to one implementation.

FIG. 31 is a simplified schematic of a ROW node of a hierarchy, according to one illustrative implementation.

FIG. 32 is a simplified schematic of a COLUMN node of a hierarchy, according to one illustrative implementation.

Figure 1:
FIG. 1 depicts an image of a document including structured information and unstructured information, according to one embodiment.

Additional features and advantages of the various aspects of the inventive concepts presented herein will become apparent to those having ordinary skill in the art upon a full review of the detailed descriptions provided below, in accompaniment with the several drawings. It shall be further appreciated that the inventive concepts presented herein are demonstrated by way of example rather than limitation, and may be combined in any suitable fashion, combination, permutation, etc. without departing from the scope of the inventive concepts unless expressly stated otherwise herein.

DETAILED DESCRIPTION

The following description is made for the purpose of illustrating the general principles of the present invention and is not meant to limit the inventive concepts claimed herein unless expressly stated. Further, particular features described herein can be used in combination with other described features in each of the various possible combinations and permutations.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Definitions

Unless otherwise specifically defined herein, all terms are to be given their broadest reasonable interpretation including meanings implied from the specification as well as meanings understood by those skilled in the art and/or as defined in dictionaries, treatises, etc.

Various terms are defined, according to the inventors meaning thereof, throughout the present specification. The following list of definitions is not to be taken as an exclusive list of terms and corresponding definitions according to the intended meaning thereof, but an exemplary listing of terms and definitions to facilitate the skilled artisan's understanding of the presently disclosed inventive concepts.

It shall be understood that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "about", particularly when used to modify or define a quantitative value or range, shall be understood as encompassing the expressly stated value or range, ±10%. For instance, "about 1" shall be understood as encompassing all values in a range from 0.9 to 1.1 (inclusive). Similarly, "a value in a range from about 1 to about 10" shall be understood as encompassing all values in a range from 0.9 to 11 (inclusive).

Document

The term "Document" as utilized herein refers to any representation of, structured information, unstructured information, semi-structured information, or any other form of information, in any combination, in any human language and in any form suitable for review and comprehension by a human. "Documents" preferably include image(s) of physical documents, but it shall be appreciated that digital representations of information that are capable of being understood by a human being are also intended to be within the scope of "documents" as discussed herein. Exemplary types of documents include, without limitation, handwritten documents, clay tablets (e.g., depicting graphical languages such as hieroglyphics, cuneiform script, phonetic characters such as hiragana and katakana in modern Japanese, syntactic characters such as kanji in modern Japanese, etc.), digital documents, computer scripts (i.e., scripts written in a computing language, but not binary code or punch cards), peer-reviewed research documents, explanations of benefits documents, medical records, economic records and analyses, financial statements (such as bank statements, Securities and Exchange Commission (SEC) disclosures, etc.), tax documents, legal documents, hypertext markup language (HTML) documents, extended markup language (XML) documents, data structures (including but not limited to JavaScript Object Notation (JSON) format, or any other suitable format of data structure that may be understood by a properly educated and trained human), or any other suitable form of information represented in written form and in a human language, as would be understood by those having ordinary skill in the art upon reading the present descriptions. It shall be understood that Documents as described herein may, and often do, include textual information and/or graphical information, (e.g., graphs, charts, tables, pictures, logos, drawings, markup, etc.), which may include structured and/or unstructured information, according to various embodiments. Importantly, the instant inventive concepts are particularly useful in the context of images depicting textual information, which may include structured and/or unstructured information. Advantages of implementing the presently described inventive concepts are particularly apparent when working with documents that include structured information, as structured information is not readily recognized, extracted, and understood by computers in general, and specifically by state of the art LLMs.

Document Title

"Document Titles" as described herein refer broadly to a phrase or sentence generally describing the information presented in the document as a whole. Document Titles typically appear at the "beginning" of a document, which is determined according to the natural reading order of the language(s) in which information in the document is presented. For example, In most modern Western languages, including English, Romance languages, Germanic languages, Cyrillic, etc., text is presented in a top-to-bottom, left-to-right order, and a human reader inherently understands the document "begins" at the top-left corner of the document. Accordingly, Document Titles for documents presented in a modern Western language are typically found at the upper-most portion of the first page of the document, with the title possibly including some unique formatting, such as being center-aligned, presented in a larger, emphasized font (e.g., bold, italicized, underlined, uniquely colored, etc.) compared to text of the body of the document, etc. Of course, the foregoing example is just one possibility, and depending on the nature of the document, the Document Title may be found elsewhere within the document, or may not be expressly stated in the Document at all, but rather may be associated with the document in some form, such as in a filename of a digital document, a directory name of an archive including a plurality of images stored as separate files but understood as belonging to a single document, etc. as would be understood by those having ordinary skill in the art upon reading the present disclosure.

Structured Information

"Structured Information" shall be understood as referring to information that is presented within and/or defined by the manner in which textual information is rendered within a document, including by not limited to textual formatting (font, bold, italic, etc.), the position and relative positions of textual elements with respect to other textual elements and/or graphical elements such as graphical lines, shading, etc. as would be appreciated by those having ordinary skill in the art upon reading the present disclosures. For example, the meaning of a given textual element within a table, chart, figure, etc., is at least partially dependent upon its geometric location within the table. This geometric location (or position) is structured information that is not represented within the textual element itself, but rather derived from the geometric structure of the table. Understanding structured information therefore shall be appreciated as requiring the capacity to interpret physical organization of content presented within a document.

Unstructured Information

"Unstructured Information" as utilized herein refers to textual information that is conveyed in a manner that is not dependent upon structural, graphical, or geometrical context, and accordingly wherein no information would be lost by rendering the information as a one-dimensional stream of text. As referred to herein, "unstructured information" is to be understood as synonymous with "content", i.e., text only. An exemplary representation of unstructured information is a one-dimensional stream (or string) of text appearing in a document, where the stream only includes the actual text as shown on the document (possibly with recognition errors faithfully reproduced in the string). Unstructured information preferably excludes any description or other interpretation of the document, the text elements therein, and the graphical elements (if any) therein, and is limited to reproduction of actual text appearing in the document itself. However, in limited approaches, unstructured information may include confidence measures indicating possibility of errors in the identification of particular text elements.

Expert

The present application utilizes the term "Expert" to refer to an automated processing technique, module, component, routine, etc., or combination thereof, that is/are capable of producing information from an image, for example: optical character recognition (OCR), intelligent character recognition (ICR), image captioning, image classifiers, object detectors, object classifiers, optical mark recognition (OMR) engines, text segmentation engines, graphical segmentation engines, segment ordering techniques, Hierarchy Detection models, etc. In preferred implementations, experts are or include machine learning models, particularly neural networks trained to perform a given task and produce a corresponding result, which may be assembled in whole or in part with results produced by other experts included in the overall inventive document interpretation procedures described herein, according to various embodiments. In the context of document processing described herein, preferably the results generated by each expert include text, which facilitates assembly (e.g., ordering, merging, removal of redundancies, etc.) thereof into a coherent narrative to provide to a generative model for various uses. Of course, it should be understood that results generated by experts may include information other than text, optionally in combination with text, without limitation and without departing from the scope of the inventive concepts presented herein.

Intelligent Narrator

An "Intelligent Narrator" as referenced herein is an automated processing technique, module, component, routine, etc., or combination thereof, that is/are capable of accurately transforming structured and unstructured information present on an image into a textual representation, with minimal (ideally no) loss of information, including but not limited to the context within which text is presented on an image of a document, such as may be derived from graphical elements within the document, geometric arrangement of graphical and/or text elements within the document, syntax of the document, etc. as will be appreciated by those having ordinary skill in the art upon reading the present disclosure.

Narrative

As utilized herein, the term "Narrative" refers to a textual representation of an image, e.g., as produced by an Intelligent Narrator. In select approaches, narratives may optionally include graphical elements, but preferably all information represented within the document is represented in the narrative by textual descriptions. According to preferred embodiments, structured information within the document may be represented using syntax, particularly syntax of a structured language such as various computer scripting languages, including but not limited to HTML, XML, C, C++, Perl, Python, JavaScript, etc. as would be understood by a person having ordinary skill in the art upon reading the present disclosures. In one particularly preferred approach, the narrative is constructed according to JSON (JavaScript Object Notation), i.e., is or comprises a JSON object.

Field Schema

A "Field Schema" as utilized herein is a definition of the fields to be extracted from a document (via the process of Information Extraction), wherein the extracted fields are comprised of a field value and a corresponding field label that identifies the meaning of the field value, and wherein the field schema is defined according to natural language only. For example, a semantic field schema may be comprised of, for each field to be extracted, any combination of: (1) a textual field label that serves as a "name" or "identifier" for the field in question (e.g., "DOB"); and/or (2) a corresponding field description that describes in natural language the meaning of the field (e.g., "The birth date of the person who submitted this form"). Preferably, field schemas include both of the foregoing pieces of information.

Natural Reading Order

"Natural Reading Order"—An ordering of textual elements corresponding to the order in which an intelligent human being would read the textual elements of a document, taking into account the structural context within which the textual elements are rendered. This is frequently different from a naïve ordering based on lines of text. For example, if a text element "12345" is located immediately below another, underlined text element "Customer Identifier", it would be natural for a human being to read these elements as associated, e.g., "Customer Identifier 12345" even if there is other text immediately to the left of "12345", and/or to the right of "Customer Identifier". Similarly, if a document includes multiple proximate (typically adjacent) blocks of text, especially multiple blocks of text that are oriented in a direction different than the orientation of text as naturally read by an intelligent human being (such as multiple columns of text on a single page, multiple columns within a single cell of a table, etc. for languages naturally read in horizontal order), an intelligent human being would naturally understand that one block is to be read first (e.g., the left-most block for languages naturally read in left-to-right order) in its entirety, whereas a naive ordering would read the first line of each block, followed by the second line of each block, etc., ignoring the structural indication (typically whitespace) separating the different blocks. One example of such an arrangement of text blocks is shown in FIG. 1. A naive reading order, such as produced by conventional OCR, would read the adjacent columns of text line-by-line, ignoring the gap between the columns, and losing or confusing the intended meaning in the resulting text string. By contrast, an intelligent narrator as described herein would read the adjacent columns in the same manner as an intelligent human, i.e., read the entire first (left-most) column first, then read the entire second (right-adjacent) column, and so on (if there were more than two columns, such as in a newspaper or similarly formatted document). Of course, for languages arranged according to different conventions, such as vertical or right-to-left, an intelligent narrator as described herein will similarly interpret the structural information reflected in the document image and read the presented text according to the natural reading order that would be employed by an intelligent human familiar with the respective language.

Natural Language

"Natural Language" refers to any language spoken and/or written by human beings, presently or in the past (e.g., English, German, Russian, Greek (modern or ancient), Latin, Arabic, Japanese, Mandarin, etc.). "Natural language" shall also be understood as including coded languages, such as computer scripts written in any known computer language such as C, C++, Perl, Python, Extended Markup Language (XML), Hypertext Markup Language (HTML), JavaScript, etc. as would be understood by a person having ordinary skill in the art upon reading the present disclosure.

Prompt

The term "Prompt" as utilized herein refers to a textual input to a generative model such as a Large Language Model (LLM) that is provided for the purpose of eliciting a (e.g., textual and/or graphical) response from the generative model. In preferred implementations of the presently described inventive concepts, prompts include at least a task definition and a narrative describing the information presented in a document under consideration (including both structured and unstructured information).

Extraction

"Extraction" as referenced herein refers to the process of associating meaning to elements and/or features of an image, including but not limited to text elements and graphical elements, as defined below. The meaning may be associated with the element as a label, or any other suitable association. However, it shall be understood that "extraction" does not refer to conventional "recognition" techniques (such as OCR, ICR, etc.) that simply assign a character identity and/or coordinate position(s) to textual elements represented within an image. Extraction, as used herein, requires assigning at least some contextual meaning, such as the type of information represented by a textual element or group of textual elements, or an association between textual elements.

Page

A "page" is to be understood as referring to one or more depictions of a document. A "page" may include a single page, or multiple pages within a document. Preferably, each "page" is represented by a distinct image, and is associated with an identifier, label, or other suitable indicator of the appropriate position, order, etc. of the page within the document as a whole, such as a page number.

Table

The term "table" (or equivalently, "tabular data arrangement") as utilized herein is to be understood as referring to a collection of data, some or all of which is organized into a substantially two-dimensional layout including columns and rows. Tables are preferably rectangular, or include one or more rectangular portions, and comprise a plurality of rectangular "cells," "fields," etc. for storing data values. A "table" as described herein may be represented on a single page, or span multiple pages, without departing from the scope of the inventive concepts presented herein, though multi-page tables/tabular data arrangements may require unique considerations, as described in further detail hereinbelow. "Tables" as described herein may include "descriptors" such as a table title, table header, column header, row header, or other information describing a table (more preferably, describing the nature of data values included in at least a portion of the table and associated with the descriptor). As understood herein, "column descriptors" serve to "fully qualify" column headers in a table, and "row descriptors" similarly serve to "fully qualify" the row headers that follow the descriptor. Exemplary embodiments of column descriptors and row descriptors are shown in FIGS. 2A-2C, below, according to several implementations of the presently disclosed inventive concepts.

Figure 2A:
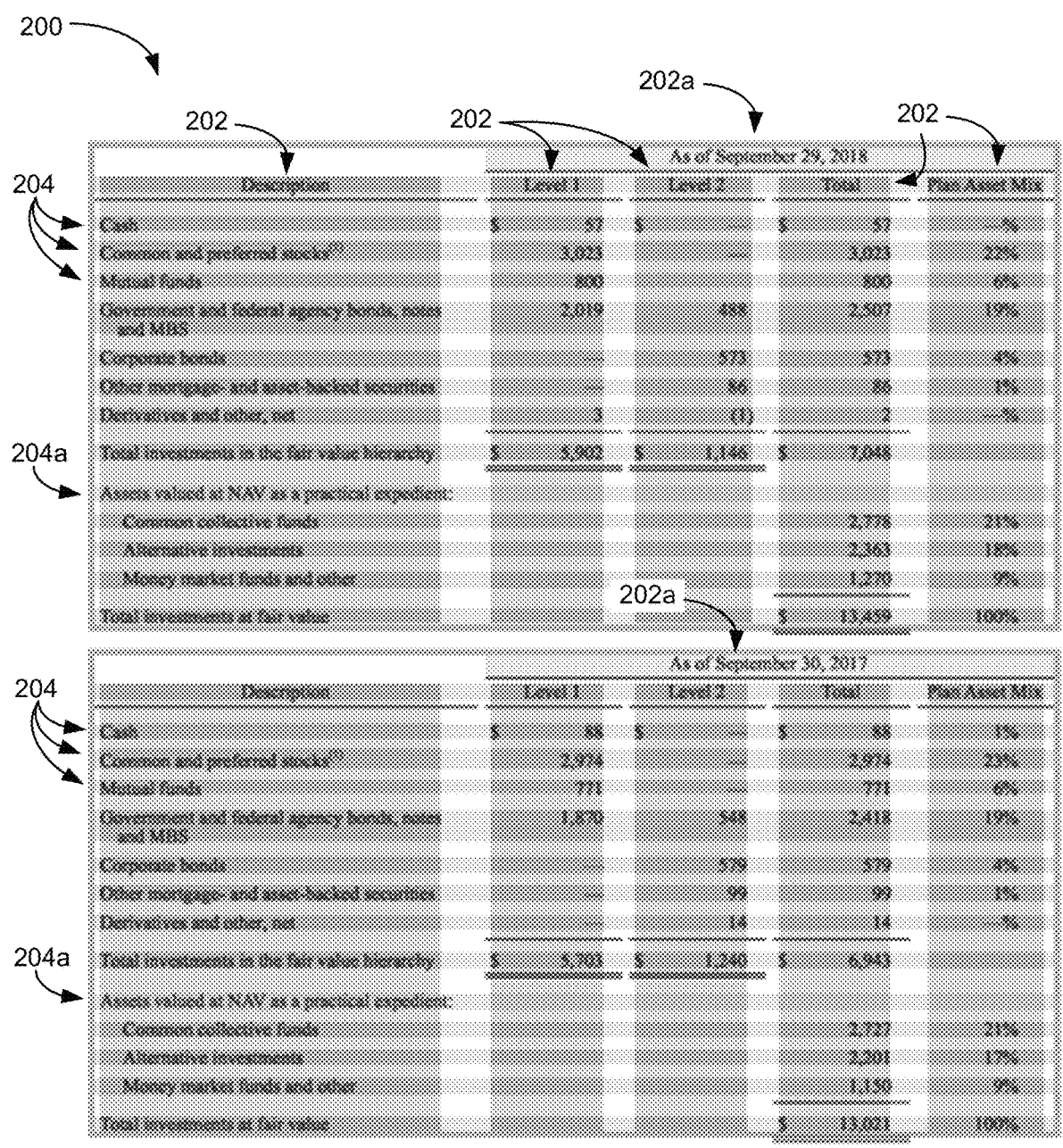

For instance, with reference to FIG. 2A, table 200 includes a plurality of column headers 202 that describe the data in each column, e.g., "Description," "Level 1," "Level 2," "Total," and "Plan Asset Mix.",", Table 200 also includes a plurality of row headers 204 that describe the data in each row, e.g., "Cash," "Common and preferred stocks," "Mutual Funds," etc. However, the headers 202, 204 by themselves do not fully describe the data in the corresponding columns and rows, respectively. Instead, in the context of the present disclosure, the "column descriptors" 202a "As of September 29, 2028" and "As of September 30, 2027" must also be considered in order to provide context and thereby to fully describe the column contents, and the "row descriptors" 204a "Assets valued at NAV as a practical expedient:" must also be considered in order to provide context to the row headers "Common collective funds", "Alternative investments" and "Money market funds and other", and to thereby fully describe the contents of these rows.

In the example of table 220, shown in FIG. 2B, column headers 222a, 222b ("Ending Account Value 6/30/28") taken alone, do not reflect the full context of the information depicted in the respective columns. These column headers 222a, 222b therefore require additional qualification to fully understand their context and meaning. The fully qualified header values for column headers 222a, 222b must also include the context provided by the column descriptors 224a and 224b, which reside above column headers 222a, 222b.

While other notations may be used without departing from the scope of the presently described inventive concepts, according to one embodiment (using C++ double colon notation e.g., as in a namespace), the fully qualified header values for column headers 222a and 222b are, respectively: "Actual (actual return after expenses)::Ending Account Value 6/30/18" and "Hypothetical (5% annual return before expenses)::Ending Account Value 6/30/18."

These values provide the full context for the corresponding data values in the fields of each column, and allow distinction therebetween.

Turning now to FIG. 2C, a similar situation exists with regard to row descriptors. Specifically, the row header value "Derivatives" appears in row headers 222a, 222b, 222c, and 222d. However, the value "Derivatives" has several different meanings, corresponding to the respective date, and categorization (assets or liabilities) for each entry, as provided by row descriptors. Accordingly, in this exemplary embodiment, the full qualification for these headers are: "December 31, 2017::Assets::Derivatives", "December 31, 2017::Liabilities::Derivatives", "December 25, 2016::Assets::Derivatives", and "December 25, 2016::Liabilities::Derivatives", respectively.

As demonstrated by the exemplary embodiments depicted in FIGS. 2A-2C, "full qualification" in the context of the present application refers to providing all information (e.g., context) necessary to understand the nature of data included in the corresponding portion of the table/data. Where the descriptive information in tables is capable of being represented as a tree structure, a "fully qualified" leaf node includes the name/label of the leaf node, and all nodes within a (preferably shortest) path leading to the root node. Taking city names as an example, while several cities may share a common name, each may be distinguished by qualifying information such as the state/province/etc. and/or country where the city is located. According to this example, three cities each named "Paris" may be fully qualified according to state/province and country as follows (again using "::" notation for convenience):

| City # | Qualification |
| --- | --- |
| City #1 | France::Paris |
| City #2 | United States::Idaho::Paris |
| City #3 | United States::Alabama::Paris |

While it is not possible to distinguish among the cities based on values in cells identifying the city name alone, once fully qualified each city may be identified uniquely, based at least in part on corresponding column descriptors and/or row descriptors, in preferred embodiments.

Grids and Non-Grids

Tables, as understood herein, are characterized either as "grids" (or equivalently as having a "grid-like structure"), or as "non-grids" (or again, equivalently, as having a "non-grid-like" structure). "Grids" are characterized by a substantially rectangular shape including X rows and Y columns, a single cell at each integer position of (X, Y), with each cell delineated by surrounding graphical lines. By contrast, "non-grids" encompass tables and table-like structures where not all cells are delineated by graphical lines—where there may be some, or no graphical lines present in the table. Moreover, "non-grids" are not limited to rectangular shape, or having a same number of cells in any two given row(s)/column(s).

(Units of) Tolerance

The present descriptions refer in several places to "tolerance" and/or "units of tolerance." These descriptions shall be understood as referring to a distance (i.e., distance within which the x- and/or y-position) between two different visible features that is the smallest effective distance represented within an image. In other words, all distances between visible features depicted in an image that are less than the defined "unit of tolerance" are considered equivalent (or within a given multiple of units of tolerance, e.g., all distances falling between two units of tolerance or three units of tolerance may be considered equivalent), depending on the particular application and as consistent with the present descriptions. In one exemplary embodiment, a "unit of tolerance" is established as one third of the average character width as observed across all OCR elements within the document under consideration. However, skilled artisans will appreciate that other values, particularly values based on analyzing statistics (especially geometric statistics) of elements and/or features (preferably textual elements) may be employed to measure/define units of tolerance without departing from the scope of the presently described inventive concepts.

Skilled artisans will further appreciate the critical features/and or advantages of using units of tolerance as a measure of distance include, but are not limited to: (1) different images of the same document but at different resolutions will be processed in the same way, and (2) small differences in the pixel coordinates of visual features that are intended to be considered as aligned (e.g., as may occur due to printing inconsistencies, misalignment during scanning, etc. as would be understood by a person having ordinary skill in the art upon reading the present disclosure) are correctly interpreted as being aligned and are not misconstrued as being misaligned. Herein, the smallest standardized unit of distance as defined above is equivalently identified as one unit of "tolerance".

Feature

The term "feature" as utilized herein shall be understood as including any visible/visually discernable aspect of an image, particularly a digital image, and more particularly a digital image of a document. In accordance with various exemplary embodiments of the presently described inventive concepts, "features" of images may include, without limitation, text elements, and/or graphical elements as defined hereinbelow as well as equivalents thereof that would be understood by a person having ordinary skill in the art upon reading the present disclosure.

Text Element

A "text element," (equivalently referred to herein as a "textual element", a "character recognition element," an "OCR element," etc.) is to be understood herein as comprising one or more connected components represented in digital image data and corresponding to one or more physical marking on a physical document, as recognized/identified using one or more character recognition techniques as disclosed herein, and any suitable equivalent(s) thereof that would be appreciated by a skilled artisan in the field of image analysis upon reading the present disclosure. In various approaches, text elements may be a string (which may include an empty string) of text represented within a document. Text elements preferably include characters, numbers, symbols, etc. according to various embodiments and as would be appreciated by those having ordinary skill in the art upon reading the instant disclosure. Text elements may also include, or be associated with, additional information such as information indicating different parts of a given text element, or different text elements entirely, are associated with one another in some way. For instance, text elements may include, or be associated with, information indicating keys and/or values of a set of key/value pairs, such as field names (keys) and field values (values). In addition to the connected component(s) per se, a "text element" may include, in various combinations and according to various embodiments, additional contextual information characterizing the connected component(s), including but not limited to: a predicted identity of connected component(s) (e.g., a character in one or more languages, a numeral, a symbol, etc., and combinations thereof); a confidence score associated with the predicted/identified identity character component(s) (which may be expressed according to any suitable measure known in the art); geometric information characterizing the connected component(s) (e.g., according to page number, position on the page (e.g., x-y coordinate of the upper-left corner of the text element), length, width, aspect ratio, thickness, number of connected component(s) included in the text element, etc. as would be appreciated by a skilled artisan upon reading the present disclosure); image characteristics corresponding to the connected component(s) and/or surrounding background pixel(s) (e.g., pixel intensity information, whether expressed according to bitonal (2-bit), grayscale (8-bit), RGB color (24-bit, 8-bits per color channel and optionally including a grayscale intensity value), or any other suitable convention for expressing/characterizing characteristics of pixels of digital image); and/or location information regarding the position of the character with respect to the image (preferably a partial or complete image of a document) from which the character was detected, e.g., (X, Y) coordinate(s) of pixel(s) considered part of the connected component(s), and/or any surrounding pixels (e.g., background pixels) included in a (preferably rectangular) region surrounding the connected component(s), e.g., as defined by a bounding box or other suitable technique/representation that would be understood by a skilled artisan upon reviewing the instant specification. In various embodiments, the additional contextual information may be associated with the connected component(s), e.g., as metadata, in a database, or in any other suitable manner as known in the art and would be appreciated upon reading the present disclosure. According to preferred embodiments, a text element includes at least: the connected component(s) and associated contextual information including but not limited to: the predicted identity/identities of the connected component(s); the location information corresponding to the connected component(s), the geometric characteristics of the connected component(s), and the image characteristics of the connected component(s), wherein the additional contextual information is associated with the connected component(s), e.g., as metadata.

Data

"Data", according to various implementations of the presently described inventive concepts, may be defined and distinguished from other textual elements according to criteria appropriate for the particular application (e.g., document type) to which the inventive concepts described herein are to be applied. For instance, data may be distinguished from other text elements based on the proportion of the text element that is numerical. Alternatively, data may be distinguished from other types of text elements based on being expressed in a certain format (e.g., a numerical date, a number having a decimal separating the final two characters from the remainder of the text element, a number fitting a particular mask or pattern, etc. as would be appreciated by those having ordinary skill in the art upon reading the present disclosure), etc. Further still, data may be distinguished from other types of text elements based on the text element including or being associated with a particular symbol or (sub) string corresponding to a particular unit, such as "$", "£", "¥", "° C.", "° F.", "meters", "cm", etc. as would be understood by those having ordinary skill in the art upon reading the present disclosure. Of course, the following indicia that a particular text element includes "data" as opposed to other types of text elements are provided merely by way of example, and any suitable equivalent or alternative thereof may be employed without departing from the scope of the instant descriptions.

According to several illustrative aspects, elements, segments, blocks, columns, or any other organizational structure referenced herein may be additionally or alternatively considered a "data" element, segment, block, column, etc. if the structure includes data as defined hereinabove. In different implementations, "data" elements, segments, blocks, columns, etc. may be considered a special type of text element, segment, block, column, etc., or the "data" label may replace the generic label (e.g., a text element is either a text element or a data element, rather than data elements being considered a special type of text elements).

Text Segment

A "Text Segment" as referenced herein is intended to indicate an ordered plurality of text elements that are associated with one another in the document. Text segments shall be understood as a particular, ordered, type or grouping of textual elements, and may include adjacent words, phrases, sentences, paragraphs, etc., but also may include associated key/value pairs, word(s) and associated symbols (such as units), values of a data arrangement and associated labels (such as row headers and associated values, column headers and associated values, axis labels and associated values within a graph), identifiers of the order of elements within the segments (e.g., sequential numerical identifiers), etc. as would be appreciated by those having ordinary skill in the art upon reviewing the descriptions and figures provided herewith.

Text Block

A "Text Block" as discussed herein refers to a combination of two or more text segments that meet particular geometric and/or visual criteria as discussed in greater detail hereinbelow with regard to "Text Segmentation: Joining Text Segments into Text Blocks". According to these descriptions, there are seven criteria or conditions which must be satisfied in order for a group of text segments to qualify as a "text block". Preferably, text segments are evaluated against these conditions in an iterative fashion until all text segments (or, in later iterations, text blocks) satisfying the conditions are joined into maximally encompassing text blocks, i.e., the final set of text blocks include the greatest possible extent(s) (preferably horizontal extent(s)) of the document where text segments are located. In a particularly preferred embodiment, the final set of text blocks include or correspond to lines of text ("text lines") appearing in the document. Accordingly, a "text block" is a rectangle on the page with known coordinates and a known text value. The text value can span across several text lines within this rectangle. The text value is interpreted as the text contained in the rectangle, read in the natural order of the language depicted in the document (or portion of the document).

Text Column

A "text column" is a rectangle on a page with known coordinates, encompassing one or several text blocks. Text columns are used to group blocks that are related to each other geometrically and/or semantically, as well as to ensure the semantically correct order of text blocks. Preferably, text columns are created after text blocks. Moreover, a "text column" as referred to herein is a combination of two or more text blocks that meet particular geometric and/or visual criteria as discussed in greater detail hereinbelow with reference to "Text Segmentation: Creating Text Columns". According to the illustrative implementation described therein, four conditions are evaluated to determine whether a given combination of two or more text blocks qualify as a "text column". Preferably, text blocks are evaluated against these conditions in an iterative manner until all qualifying text blocks (or, in later implementations, text columns) are joined into maximally encompassing text columns, i.e., the final set of text columns include the greatest possible extent(s) (preferably, at least vertical extent(s)) of the document where text blocks are located. In particularly preferred embodiments, the final set of text columns include or correspond to paragraphs, formatted columns (which may include multiple paragraphs, sections, etc., e.g., as represented in many newspapers, academic publications, etc.), or any other type of "text column" as would be understood by those having ordinary skill in the art upon reading the present disclosure.

Text Line

A "text line" as referenced herein shall be understood as including any grouping of textual elements arranged along a common axis of orientation and forming a single, contiguous line within an image, typically a substantially horizontal line.

Alignment

The presently described inventive concepts, in various aspects, utilize the concept of "alignment" to facilitate conversion of document images into textual representations.

In particular, the concepts of left-alignment, right-alignment, center alignment and weak center alignment are utilized in various evaluations, as described in greater detail below. It shall be understood that, in the context of these inventive concepts, two rectangles are considered to be left-aligned if the absolute value of the difference between their leftmost x-coordinates does not exceed two units of tolerance. Similarly, two rectangles are said to be right-aligned if the absolute value of the difference between their rightmost x-coordinates does not exceed two units of tolerance. Two rectangles are said to be center-aligned if the absolute value of the difference between the x-coordinates of their centers does not exceed two units of tolerance. Two rectangles are said to be weakly center-aligned, if the horizontal span of one rectangle is within the horizontal span of another rectangle, or vice versa. Alignment is also defined for any objects that have bounding rectangles associated to them. For example, a condition might involve left-alignment of two text elements, meaning that their respective bounding rectangles are left-aligned. The value of two units of tolerance as discussed with respect to alignment is chosen merely as one illustrative embodiment, and can be replaced with a different floating point coefficient (e.g., any value in a range from about one to about ten units of tolerance), in accordance with other embodiments based on the characteristics of the document(s) being analyzed and transformed, without departing from the scope of the inventive concepts presently disclosed.

Text Recognition

"Text Recognition" as referenced herein includes any known technique for identifying symbols, preferably characters of one or more languages, within image data. According to various embodiments, character recognition includes optical character recognition (OCR), but additionally or alternatively employing other known character recognition techniques, such as intelligent character recognition (ICR), graphics device interface (GDI), clustering-based recognition, feature extraction-based recognition, pattern matching-based recognition, techniques using neural networks, etc. as would be understood by a person having ordinary skill in the art upon reading the present descriptions. References to any type of character recognition, especially OCR, shall be understood as referring also to other suitable types of character recognition in the alternative (or in combination) as would be understood by a skilled artisan reviewing this disclosure.

Phrase

A "phrase" as referenced herein refers to a group of text elements (usually a group of words, numbers, and/or symbols) that reside on the same text line and that are closely spaced, such that a human reader would understand that the elements comprising the phrase are intended to be considered as a single unit. For instance, in various embodiments, phrases may include sentence fragments, sentences, lines of text or portions thereof, numerical values and corresponding unit symbols, etc. as would be understood by a person having ordinary skill in the art upon reading the present disclosure. The amount of space permitted between elements in a phrase may be set to correspond to known indicia of a separation between phrases, such as a maximum number of pixels, maximum number of character widths/ whitespaces, an average character width, as a fraction of character height, based on OCR characteristics (such as geometric characteristics of characters, of bounding boxes corresponding to characters, or any other suitable measure of distance), etc. in various embodiments and as would be appreciated by a person having ordinary skill in the art upon reading the present disclosure. In preferred approaches, especially where text is represented in a Unicode or monospace format, the amount of space permitted between elements is, according to one embodiment, one character width. Skilled artisans reading the present application will understand, in light of subsequent detailed disclosure, that certain embodiments of the presently described inventive embodiments may employ other definitions for the amount of space permitted between elements, e.g., as described hereinbelow regarding grouping of elements/sections.

Graphical Element

The term "Graphical Element" as utilized herein shall be understood as referring to any non-textual feature represented within a document. Graphical elements include, but are not limited to, lines, shapes, shading, patterns, logos, pictures, or any other marking or graphical characteristic of a document that is not text. Graphical elements are frequently present in the form of borders defining different sections of a document, intersecting lines defining tables or tabular data arrangements, figures, charts, graphs, cartoons, markup (other than built-in markup and formatting native to a particular language or font definition), such as handwritten strike-through, highlighting, underlining, arrows, markings indicating emphasis, etc. as would be understood by those having ordinary skill in the art upon reading the present disclosure.

Optical Marks

"Optical Marks" as referenced herein refers to a particular type of graphical element, and possibly textual element(s) associated therewith. Generally, "optical marks" may include, without limitation, any graphical selection mechanism or mechanisms enabling or facilitating a user interacting with a document to select or otherwise identify one or more from among a list of possible options (which may or may not be alternatives, may or may not be mutually exclusive, or may include combinations or subset(s) of the various listed options). Exemplary optical marks include, but are not limited to, checkboxes, radio buttons, highlighting, custom markup (such as hand-drawn or mouse-drawn circles, underlines, or other markings made by a human reading the document), etc. as would be understood by a person having ordinary skill in the art upon reviewing the instant disclosure. Moreover, as described in greater detail hereinbelow, optical marks may include various types of optical mark elements, which may be characterized by particular relationships therebetween.

OMR Group

Figure 3A:
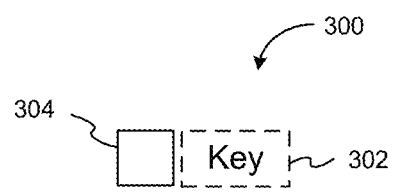
FIG. 3A is a simplified schematic of a Simple OMR Group, according to one embodiment.

As utilized herein, the term "Optical Mark Group" or "OMR Group" refers to a structured collection of OMR elements that have a geometric relationship to one another as depicted on the page. "Simple OMR Groups" are OMR Groups that consist of a single OMR Key 302 and a single corresponding OMR Selection 304, such as shown via Simple OMR Group 300 according to one embodiment in FIG. 3A, while "Composite OMR Groups" refers to OMR Groups that include a super-class OMR Key 316, and multiple OMR Keys 312a, 312b, 312c and corresponding OMR Selections 314a, 314b, 314c such as shown via Composite OMR Group 310, again according to an exemplary embodiment, in FIG. 3B.

OMR Key

Figure 3B:
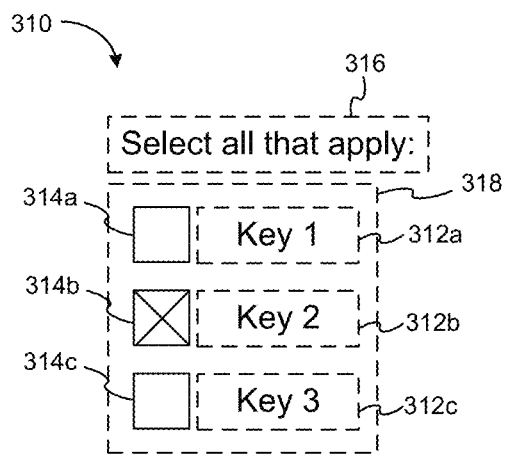
FIG. 3B shows a simplified drawing of a Composite OMR Group, according to another embodiment.

An "OMR Key" shall be understood to refer to a textual OMR element that directly relates to an OMR Selection (such as key 302 shown in FIG. 3A and keys 312a-312c as shown in FIG. 3B), or to an OMR Values that identifies multiple sub-OMR Groups (such as key 316 as shown in FIG. 3B).

OMR Values

As utilized herein, the term "OMR Values" shall be understood as referring to an OMR element that connects a putative OMR Key to multiple OMR Groups within a Composite OMR Group. For example, according to one illustrative scenario an exemplary OMR Values element 318 is shown in FIG. 3B.

OMR Selection

The term "OMR Selection" (or, equivalently, "OMR Status") refers to the status of an OMR element, which often, but not always, corresponds to a Boolean value representing "true" or "false". For instance a checkbox with no check mark therein (such as is the case for OMR Selection 314a associated with "Value 1" in FIG. 3B) is considered an "OMR not selected" type of OMR Selection, and may be associated with the meaning "false", while a checkbox with a check mark therein (such as is the case for the OMR Selection 314b in FIG. 3B) is considered an "OMR selected" type of OMR Selection, and may be associated with the meaning "true". Of course, in various implementations, particularly for radio buttons, the meaning intended by a given OMR Selection may be something other than "true" or "false", such as would be appreciated by those having ordinary skill in the art upon reading the present disclosure.

Hierarchy Initialization, Detection, Aggregation and Reconciliation Definitions The following definitions of plane graph, orthogonal quad-edge graph, quad-edge, inner edge, vertex, subgraph, path, path side (or "side of path"), path pattern, convex path, full path, minimum/maximum path, minimum/maximum full path, closed path, rectangular path, face, covering, closure, rectangular covering, rectangular closure, subgraph covering, structure, cell, row, column, nested structure, and arbitrary structure are to be understood in the context of Hierarchy Initialization, Detection, Aggregation and Reconciliation using graphical elements (particularly vertical and horizontal lines) appearing on images of documents, especially images of business documents. Accordingly, as one example, the term "structure" as defined hereinbelow is to be understood as applicable in the context of Hierarchy Initialization, Detection, Aggregation and Reconciliation, rather than defining "structured information" as set forth above. While the "structure(s)" identified via Hierarchy Initialization, Detection, Aggregation and Reconciliation may include or represent "structured information", they do not define "structured information" in accordance with the presently described inventive concepts.

Moreover, basic concepts are related to graph theory terms such as path, vertex, graph, and face. However, formalization should be understood only within the definitions presented herein. Terminology is introduced under the consideration of a graph on a plane formed by vertical and horizontal lines. The proposed definitions serve as the foundation for the operations and algorithms that can be developed to extract structures from an object, described as a graph, that represents structured information present in images of documents, particularly business documents.

Plane Graph

As utilized herein, and in the context of Hierarchy Initialization, Detection, Aggregation and Reconciliation, a "plane graph" or "planar embedding of a graph" is a graph drawn on a two-dimensional plane in such a way that its edges intersect only at their endpoints. In other words, it can be drawn in such a way that no edges cross each other.

Quad-Edge

Figure 4:
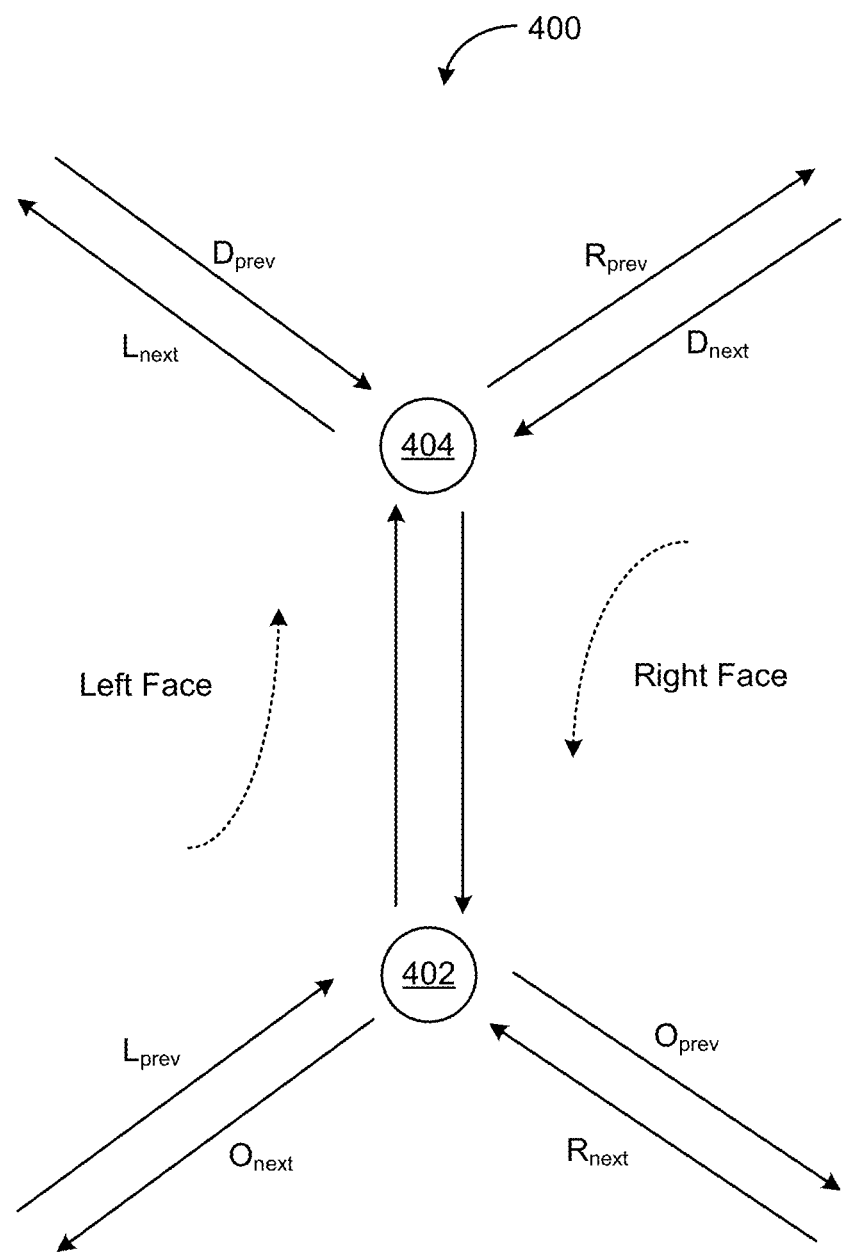
FIG. 4 is a simplified schematic of a Quad-Edge data structure, according to one implementation.

A "Quad Edge" is a directed edge (as indicated by the arrows on the various edges shown in FIG. 4) that connects two vertices 402, 404, such as shown in accordance with one embodiment in the simplified schematic of FIG. 4. In addition to linking vertices, the Quad-Edge structure also contains information about incident edges and adjacent faces. The fundamental idea behind the Quad-Edge structure is that a single edge sits between exactly two faces and two vertices. As each face is built, it is connected to all boundary edges. This information makes it possible to iterate over sub-regions formed by the graph.

Again referring to FIG. 4, associated with the exemplary quad-edge structure 400 are a plurality of edges, which respectively correspond to edges bounding the left and right faces associated with the quad-edge structure 400. Referenced quad-edges include a $L_{prev}$ edge that is a counter-clockwise previous edge for the left face of the edge incoming to origin vertex 402, a $L_{next}$ edge that is a counter-clockwise next edge for the left face of the edge outgoing from destination vertex 404, a $R_{prev}$ edge that is a counter-clockwise previous edge for the right face of the edge outgoing from destination vertex 404, a $R_{next}$ edge that is a counter-clockwise next edge for the right face of the edge ingoing to origin vertex 402, an $O_{prev}$ edge that is a counter-clockwise previous edge for the origin vertex of the edge outgoing from the origin vertex 402, an $O_{next}$ edge that is a counter-clockwise next edge for the origin vertex of the edge outgoing from the origin vertex 402, a $D_{prev}$ edge that is a counter-clockwise previous edge for the destination vertex of the edge outgoing from the destination vertex 404, and a $D_{next}$ edge that is a counter-clockwise next edge for the destination vertex of the edge outgoing from the destination vertex 404.

These edge labels are provided in accordance with a counter clockwise progression through the graph 400, and are merely illustrative. In other embodiments, different labels may be used without departing from the scope of the presently described inventive embodiments.

Moreover, since Orthogonal Quad-Edge Graphs are built from horizontal and vertical line segments, the graph has one of four directions with respect to a given origin vertex (vertex 402 in FIG. 4): bottom, right, top, or left. Moreover still, when traversing an Orthogonal Quad-Edge Graph, an edge may proceed according to only one of four possible directions: down, right, up, or left.

Orthogonal Quad-Edge Graph

As utilized herein, and in the context of Hierarchy Initialization, Detection, Aggregation and Reconciliation, an "Orthogonal Quad-Edge Graph" (or equivalently "Quad Edge Graph") is a Plane Graph with edges formed by horizontal and vertical line segments and represented by a Quad-Edge data structure G=(V, E) where V is a set of vertices, and E is a set of quad-edges. A simplified schematic of a quad-edge data structure 400 is shown in FIG. 4, according to one embodiment. As shown, Quad-Edge Structure consists of the directed edge from origin vertex 402 to destination vertex 404 and a corresponding symmetric edge from destination vertex 404 to origin vertex 402.

Inner Edge

As utilized herein, and in the context of Hierarchy Initialization, Detection, Aggregation and Reconciliation, an "inner edge" (or, equivalently, an "inner edge of a subgraph") is an edge of a subgraph that is not included in the bounding path of the subgraph.

Vertex

As utilized herein, and in the context of Hierarchy Initialization, Detection, Aggregation and Reconciliation, a "vertex" has coordinates (x, y) and references to its neighboring vertices in a graph in a counter-clockwise (CCW) order: bottom, right, top, left. The maximum vertex degree is 4 and could contain undefined neighbors (null pointers). Accordingly, neighbor vertices may only be located in a horizontal or vertical directions. An order of following may also apply according to the direction: e.g., a bottom vertex could not have a "top neighbor" that is located to the right, etc. as would be understood by those having ordinary skill in the art upon reading the present disclosure. In some approaches, a vertex could contain information about adjacent edges, such as information preserving respective directions.

Subgraph

As utilized herein, and in the context of Hierarchy Initialization, Detection, Aggregation and Reconciliation, a graph G'=(V', E') is a "subgraph" of graph G=(V, E) when it is formed from a subset of the vertices and edges of G: V'⊆V, E'⊆E. The vertex subset must include all endpoints of the edge subset, but may also include additional vertices, i.e., G'⊊G.

Path

As utilized herein, and in the context of Hierarchy Initialization, Detection, Aggregation and Reconciliation, a "path" P in a graph G is a subgraph of G that forms a finite or infinite sequence of directed edges which join a sequence of distinct vertices.

Convex Path

Figure 5:
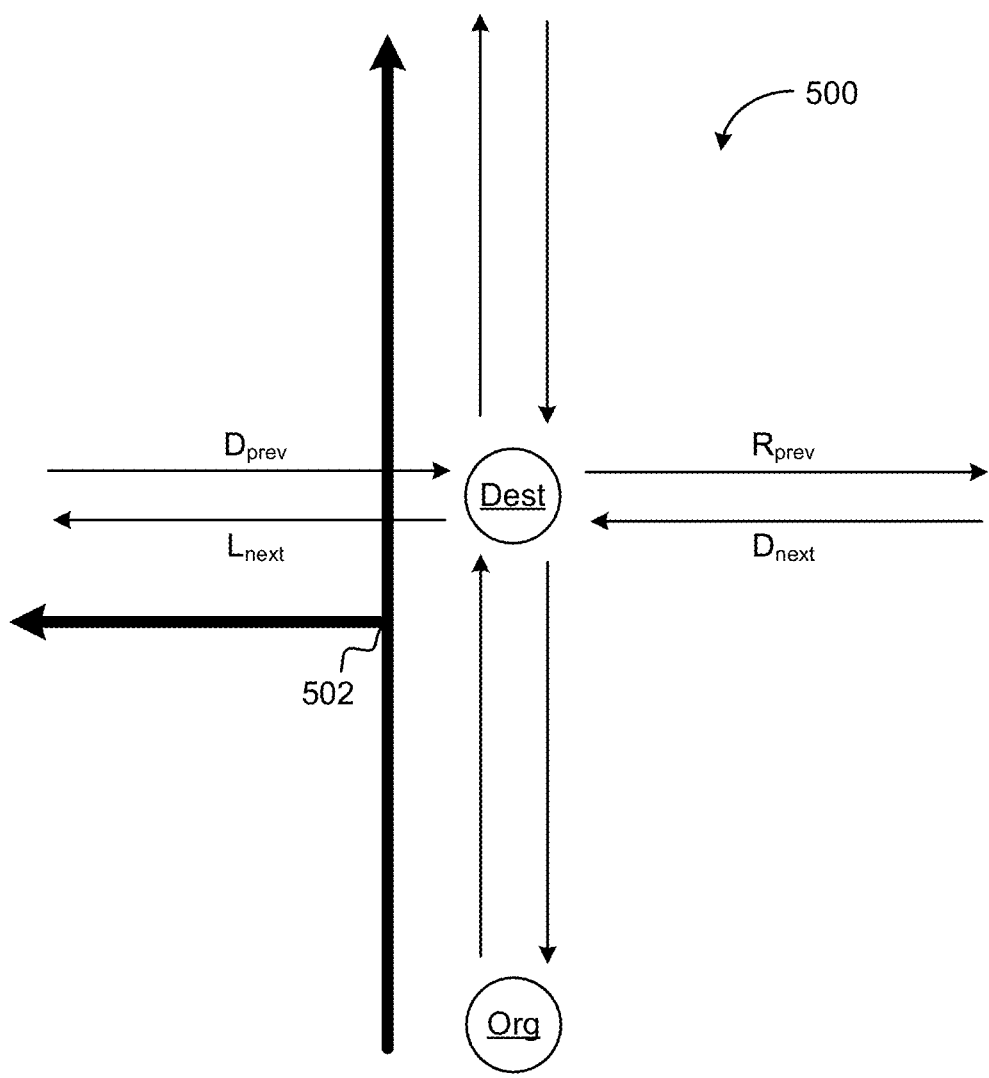
FIG. 5 depicts a simplified schematic of a convex path, according to one illustrative aspect.

As utilized herein, and in the context of Hierarchy Initialization, Detection, Aggregation and Reconciliation, a "convex path" is a path pattern that allows movement to the adjacent edge, either to the left or in the same direction, with respect to a destination vertex of the current quad-edge. An example of convex paths 502 with respect to a portion of a quad edge graph 500 including an origin vertex Org and a destination vertex Dest is shown according to the simplified schematic of FIG. 5, according to one illustrative implementation.

Side of a Path

As utilized herein, and in the context of Hierarchy Initialization, Detection, Aggregation and Reconciliation, a "side of a path" (or, equivalently, a "path side") is a sequence of edges with the same direction.

Path Pattern

As utilized herein, and in the context of Hierarchy Initialization, Detection, Aggregation and Reconciliation, a "path pattern" is a set of rules for constructing a path.

Full Path

As utilized herein, and in the context of Hierarchy Initialization, Detection, Aggregation and Reconciliation, a "full path" is a path that cannot be extended from either the beginning or end while maintaining the path pattern.

Min/Max Path

As utilized herein, and in the context of Hierarchy Initialization, Detection, Aggregation and Reconciliation, a "minimum/maximum path" (or, equivalently, "min/max path") is a path that contains minimum/maximum number of edges while maintaining the path pattern.

Min/Max Full Path

As utilized herein, and in the context of Hierarchy Initialization, Detection, Aggregation and Reconciliation, a "minimum/maximum full path" (or, equivalently, "min/max full path") is a full path with minimum/maximum number of edges within the path pattern.

Closed Path

As utilized herein, and in the context of Hierarchy Initialization, Detection, Aggregation and Reconciliation, a "closed path" is characterized by the end vertex pointing to the beginning vertex.

Rectangular Path

As utilized herein, and in the context of Hierarchy Initialization, Detection, Aggregation and Reconciliation, a "rectangular path" is a convex path that lies along the bound of some rectangle made by at least two orthogonal sides.

Bounding Path

As utilized herein, and in the context of Hierarchy Initialization, Detection, Aggregation and Reconciliation, a "bounding path" of a face f is a full path P⊆G so that face f is the left face for any edge in a path P. Moreover, the bounding path of subgraph G' is a path P satisfying $P=(V^P, E^P)|V^P \subseteq V'$, $V^{jP} \subseteq E'$ where P is full, and the right face $f_{right}^j=(V^j, E^j)$ of any edge $e_j^P$ in P is not connected to any non-boundary edge(s), i.e., $\forall e_j^P \in E^P : E^j \cap (E' \backslash E^P) = \emptyset$, and the inner edge of a subgraph is an edge that is not included into a bounding path of the subgraph. Moreover, the definition of a bounding path of a subgraph is equivalent to the definition of a bounding path of a face, where the face qualifies as a subgraph.

Face

As utilized herein, and in the context of Hierarchy Initialization, Detection, Aggregation and Reconciliation, the concept of a "face" f is modified from conventional Planar Graph Theory and adapted specifically to facilitate determining hierarchies based on vertical and horizontal graphical lines depicted in documents, particularly business documents. In this context, if G=(V, E) is a planar orthogonal graph, then G divides the plane into regions bounded by edges, which are called "faces." Accordingly, a "face" refers to a starting quad-edge that makes it possible to iterate over a region that is bound by a bounding path. The way in which areas and acceptable shapes are processed may vary according to different, preferably iterative, approaches, but as understood herein a "face" is defined by bounding paths, i.e., $f^j:P^j=(V^j, E^j)|V^j \subseteq V, E^j \subseteq E$.

Moreover, a face is considered "convex", "rectangular", or "closed", respectively, if it is bounded by a convex, rectangular, or closed path. For example, FIGS. 6A-6E show exemplary embodiments of rectangular faces, while FIGS. 7A-7E depict exemplary illustrations of non-rectangular faces. The faces shown in FIGS. 6A, 6B, and 6C each have four sides, and may be bounded by a convex, rectangular path. Accordingly, these faces are "rectangular" or "closed" in the context of the presently described inventive concepts. FIGS. 6D and 6E, by contrast, show faces that have only three sides, but still can be bounded by a convex, rectangular path, and are also "rectangular" or "closed". On the other hand, none of the faces shown in FIGS. 7A-7E can be bounded by a convex, rectangular path, and thus are "non-rectangular". Note the special case of FIG. 7C, which conceptually could be bounded by a rectangular path, but in accordance with the present definition, a rectangular face must have at least two edges that are bounded by a convex, rectangular path, e.g. as shown in FIG. 6E.

Figure 6A:
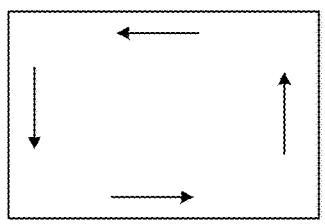
FIGS. 6A-6E show various exemplary illustrations of rectangular faces, according to different embodiments.
Figure 6B:
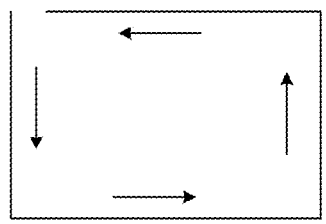
Figure 6C:
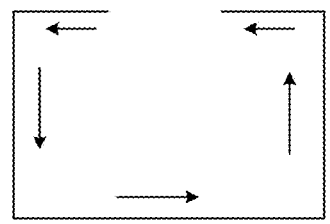
Figure 6D:
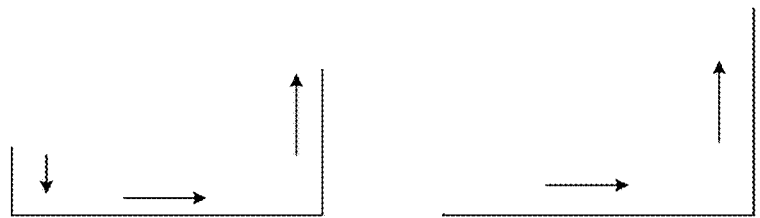
Figure 6E:
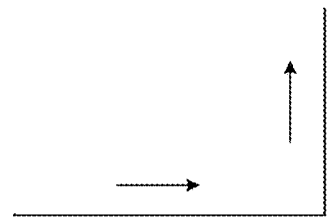

In accordance with the presently defined meaning of orthogonal quad-edge graph, if a convex face is "closed", then it has either four or six sides, e.g., as is the case for the faces shown in FIGS. 6A and 7E, respectively. Correspondingly, if a "convex face with four sides is closed, then the face is rectangular, and "non-convex" faces are non-rectangular.

Covering

As utilized herein, and in the context of Hierarchy Initialization, Detection, Aggregation and Reconciliation, a "covering" is a particular type of subgraph. Specifically, a subgraph $G^c$ is a covering of subgraph G' if: $G' \subseteq G^c$, and for any inner edge $e^j$ in $G^c$, its convex faces $f_{left}^j$, $f_{right}^j$ are subgraphs of $G^c$, i.e., $\forall e^j \in E^c \backslash E^p : f_{left}^j \subseteq G^c$, and $f_{right}^j \subseteq G^c$.

Consider a face f: $P=(V^p, E^p)$ as a subgraph $P=G' \in G$. By definition, the bounding path P of face f is full, and $(E' \backslash E^p)=(E^p \backslash E^p)=\emptyset$. Then, for any edge $e_j^p$ in P, the corresponding right face $f_{right}^j=(V^j, E^j): \forall e_j^p \in E^p : E^j \cap \emptyset$. Therefore, the bounding path of a face f is a bounding path of subgraph P.

Now, consider subgraph $G'=(V', E') \subseteq G$, subgraph $G^c=(V^c, E^c) \subseteq G$, and bounding path $P=(V^p, E^p)$ of $G^c$. Again, subgraph $G^c$ is a covering of subgraph G' if: $G' \subseteq G^c$, and for any inner edge $e^j$ in $G^c$, its convex faces $f_{left}^j$, $f_{right}^j$ are subgraphs of $G^c$, i.e., $\forall e^j \in E^c \backslash E^p : f_{left}^j \subseteq G^c$, and $f_{right}^j \subseteq G^c$.

Therefore, any face is a covering for itself.

Rectangular Covering

Figure 8A:
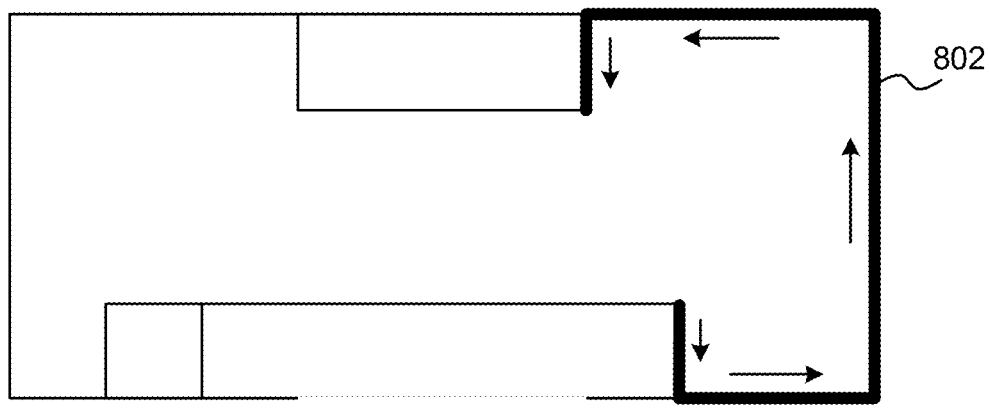
FIGS. 8A, 8B, and 8C respectively depict simplified drawings of a non-rectangular convex face, a non-rectangular covering candidate, and a rectangular covering, according to several exemplary implementations.
Figure 8B:
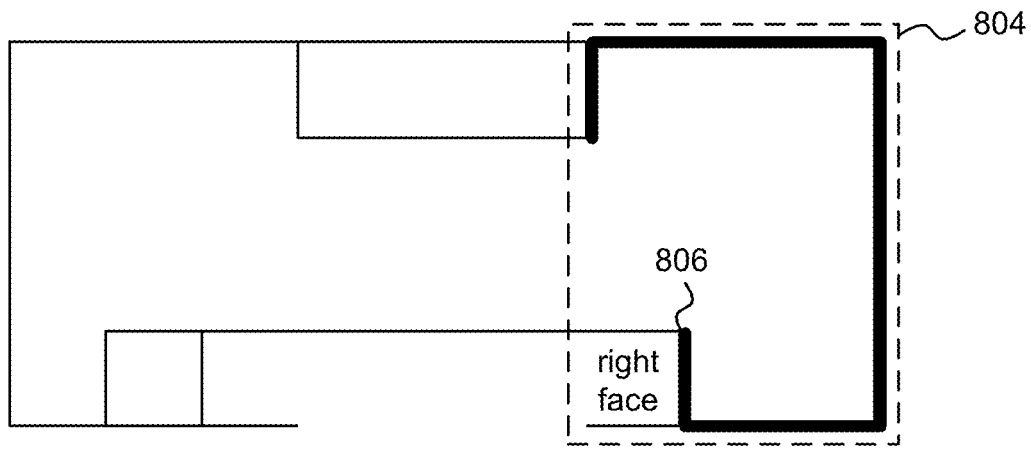
Figure 8C:
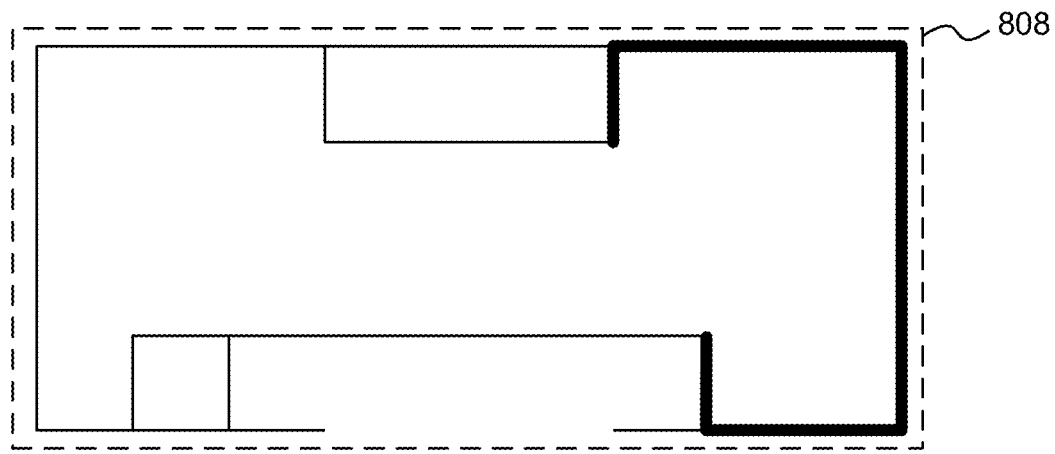

As utilized herein, and in the context of Hierarchy Initialization, Detection, Aggregation and Reconciliation, a "rectangular covering" is a covering that has rectangular bounding path. A simplified schematic comparing a non-rectangular convex face 802, a (non) rectangular covering candidate 804, and a rectangular covering 808 is shown in FIGS. 8A-8C. (Non) rectangular covering candidate 804 in FIG. 8B is not a "rectangular covering" because it contains an inner edge 806, whose right face is not contained in the (non) rectangular covering candidate 804. By comparison, FIG. 8C shows a proper rectangular covering 808 because both left and right faces of all inner edges are contained within the covering.

Closure

As utilized herein, and in the context of Hierarchy Initialization, Detection, Aggregation and Reconciliation, a "closure" of a subgraph is its covering with minimum area.

Rectangular Closure

As utilized herein, and in the context of Hierarchy Initialization, Detection, Aggregation and Reconciliation, a "rectangular closure" is a closure that has rectangular bounding path.

Figure 9A:
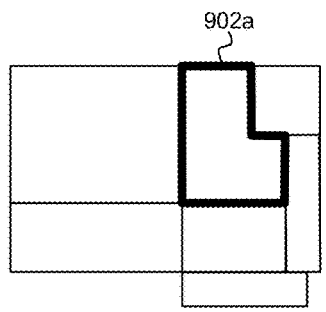
FIGS. 9A-9E are simplified schematics respectively depicting a subgraph G', a subgraph that is not a covering of G', a subgraph that is a covering of G', a rectangular covering of G', and a rectangular closure of G', according to several illustrative embodiments.
Figure 9B:
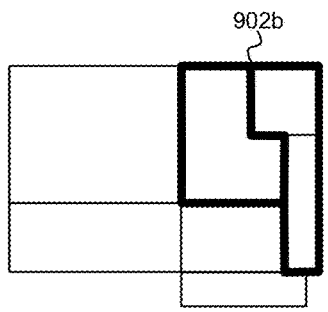
Figure 9C:
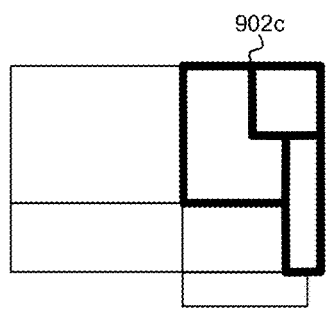
Figure 9D:
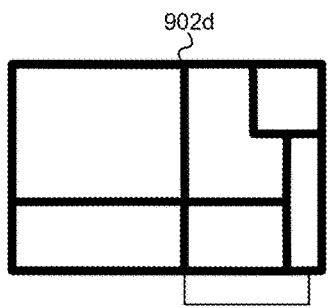
Figure 9E:
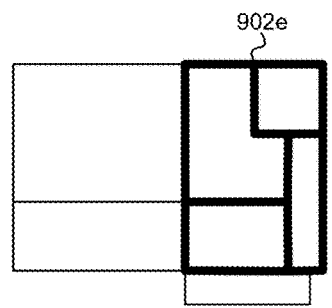

FIGS. 9A-9E are simplified schematics respectively depicting a plurality of subgraphs, particularly subgraph G' 902a, a subgraph 902b in FIG. 9B that is not a covering of G', a subgraph 902c in FIG. 9C that is a covering of G', a rectangular covering 902d of G' in FIG. 9D, and a rectangular closure 902e of G' in FIG. 9E.

Structure

As utilized herein, and in the context of Hierarchy Initialization, Detection, Aggregation and Reconciliation, a "structure" is understood as a subgraph G' in G built using an orthogonal quad-edge graph that has an explicitly extracted hierarchy, organized shape, and spatial relations between its parts (connected subgraphs). Similarly, "structure composition" (an analogue to object composition) is understood as an act or mechanism to combine simpler structures to build more complicated ones, or the structure resulting therefrom. According to various embodiments, structure composition may or may not follow specific rule(s) of composition.

Cell

As utilized herein, and in the context of Hierarchy Initialization, Detection, Aggregation and Reconciliation, a "cell" is a subgraph G' in G that contains one rectangular face and no non-rectangular faces.

Row

As utilized herein, and in the context of Hierarchy Initialization, Detection, Aggregation and Reconciliation, a "row" is a subgraph G' in G: a structure composition of other structures by a strict horizontal stacking.

Column

As utilized herein, and in the context of Hierarchy Initialization, Detection, Aggregation and Reconciliation, a "column" is a subgraph G' in G: a structure composition of other structures by a strict vertical stacking.

Nested Structure

As utilized herein, and in the context of Hierarchy Initialization, Detection, Aggregation and Reconciliation, a "nested structure" is a subgraph G' in G: a rectangular closure of a non-rectangular convex face, if such a closure exists.

Arbitrary Structure

As utilized herein, and in the context of Hierarchy Initialization, Detection, Aggregation and Reconciliation, an "arbitrary structure" is a subgraph G' in G that contains at least one non-rectangular convex face that has no rectangular closure.

Keeping the foregoing definitions in mind, the following description discloses several preferred implementations of systems, methods and computer program products for transforming information, particularly structured and semi-structured information, in combination with unstructured text, from a diverse set of documents, particularly business documents. Some or all of said information may be of interest for use in downstream applications.

Moreover, the presently described inventive embodiments are advantageously applicable, individually and in combination, to single-page and multi-page documents, though unique considerations/rules may be implemented in certain embodiments to facilitate single-page versus multi-page documents, as described in further detail hereinbelow.

Moreover still, it shall be appreciated that the presently described inventive concepts do not utilize or rely on "template matching" or associated techniques to accomplish the advantageous results disclosed herein.

General Embodiments

According to one general embodiment, a computer-implemented method for automated transformation of information present in one or more document images into a textual representation includes: hierarchically segmenting: a plurality of optical marks depicted in the one or more document images; a plurality of text elements depicted in the one or more document images; and a plurality of regions of the one or more document images, wherein the plurality of regions are defined by graphical lines depicted in the one or more document images; aggregating and reconciling the hierarchically segmented plurality of optical marks, the hierarchically segmented plurality of text elements, and the hierarchically segmented plurality of regions into a single hierarchy; and generating a textual narrative based on the single hierarchy.

According to another general implementation, a computer-implemented method for automated transformation of information present in one or more document images into a textual representation includes: interpreting, using an intelligent narrator, structured information and unstructured information present on one or more document images to generate a narrative representing the structured information and the unstructured information.

According to another general aspect, a computer-implemented method for recognizing optical mark (OMR) elements within one or more document images includes: identifying a plurality of optical marks based at least in part on a plurality of graphical lines depicted within the one or more document images; determining a status of the plurality of optical marks; building an optical mark element hierarchy based at least in part on the plurality of optical marks; and ordering the plurality of optical marks.

In yet another general approach, a computer-implemented method for building a hierarchy of optical mark (OMR) elements depicted within one or more document images, the method comprising: identifying a parent optical mark and one or more child optical marks belonging to the parent optical mark; determining whether the parent optical mark has only one child optical mark or more than one child optical mark; in response to determining the parent optical mark has only one child optical mark, adding the one child optical mark to a definition of the parent optical mark; in response to determining the parent optical mark has more than one child optical mark: determining a bounding box area of each of the more than one child optical mark; and adding at least one of the more than one child optical mark to the definition of the parent optical mark; and determining whether any other of the one or more child optical marks are spatially located within a bounding box of the one child optical mark added to the definition of the parent optical mark or the at least one of the more than one child optical mark added to the definition of the parent optical mark; and in response to determining any other of the one or more child optical marks are spatially located within the bounding box of the one child optical mark added to the definition of the parent optical mark or the at least one of the more than one child optical mark added to the definition of the parent optical mark, adding the other of the one or more child optical marks as sub-children optical marks of the one child optical mark added to the definition of the parent optical mark or the at least one of the more than one child optical mark added to the definition of the parent optical mark.

According to still yet another general approach, a computer-implemented method for ordering optical mark (OMR) elements includes determining a y-coordinate value of a central vertical point for each of one or more child optical mark elements of a given parent optical mark element; grouping some or all of the one or more child mark elements into at least one line of child optical mark elements based at least in part on the determined y-coordinate value(s) thereof; determining an x-coordinate value of a central horizontal point for each of the one or more child optical mark elements of the given parent optical mark element; and ordering some or all of the one or more child optical mark elements based at least in part on the determined x-coordinate value(s) and y-coordinate value(s) thereof.

In accordance with further general aspects of the presently described inventive concepts, a computer-implemented method for segmenting text depicted within one or more document images includes: identifying a plurality of text elements within the one or more document images; building a plurality of text segments based at least in part on the plurality of text elements; building a plurality of text blocks based at least in part on the plurality of text segments; and building one or more text columns based at least in part on the plurality of text blocks.

According to additional general approaches, a computer-implemented method for creating text blocks from text elements depicted within one or more document images includes: building one or more text segments from some or all of the text elements that satisfy a first set of predetermined criteria; joining some or all of the one or more text segments into a set of one or more joined text blocks based at least in part on evaluating the one or more text segments against a second set of predetermined criteria and add the set of one or more joined text blocks to a set of text blocks; joining two or more overlapping text blocks within the set of text blocks; and ordering the set of text blocks based at least in part on evaluating the set of text blocks against a third set of predetermined criteria.

In accordance with another general illustrative aspect of the inventive concepts disclosed herein, a computer-implemented method for creating text columns from text blocks depicted within one or more document images includes: creating, from a plurality of text blocks, a set of one or more text columns based at least in part on evaluating the plurality of text blocks against one or more predetermined criteria; joining, from among the set of text columns, any nested columns and/or any overlapping columns based at least in part on evaluating connected component(s) thereof; splitting one or more columns within the set of text columns based at least in part on a predominant alignment thereof; adding, to the set of text columns, a new text column for each of any list block(s) that do not belong already to the set of text columns; designating one or more columns within the set of text columns as data text columns based at least in part on a presence of either: a data text element, a data text segment, a data text block, or any combination thereof, in the one or more columns within the set of text columns; in response to determining a column within of the set of text columns overlaps vertically with a data text column, designating the overlapping text column as a table column; and discarding, from the set of text columns, the data text columns and the table columns.

In further general approaches, the inventive concepts include a computer-implemented method for segmenting graphical elements depicted within one or more document images, which involves: aligning some or all of a plurality of graphical lines depicted within the one or more document images; building a graph representing the aligned graphical lines; initializing a hierarchy representing one or more regions of the one or more document images, wherein the one or more regions are defined by the aligned graphical lines; detecting additional elements and/or structures of the initialized hierarchy; detecting uniform grids within the hierarchy; and aggregating and reconciling the hierarchy.

According to further general aspects of the presently described inventive concepts, a computer-implemented method for building a graph representing regions defined by graphical elements depicted within one or more document images includes: identifying, within an orthogonal, quad-edge graph representing horizontal lines and vertical lines present in an image of a document, a plurality of vertices and a plurality of connections between adjacent vertices; creating, within the orthogonal quad-edge graph, a plurality of connections between endpoints of each of the horizontal lines and endpoints of each of the vertical lines; building, within the orthogonal quad-edge graph, a set of quad edges having edge relations based on the plurality of vertices and the plurality of connections; creating a plurality of faces based on the set of quad edges; and determining a covering rectangle for some or all of the plurality of faces.

According to still yet further general aspects of the presently described inventive concepts, computer-implemented method for detecting a hierarchy within a graph representing graphical lines depicted in one or more document images includes: finding a rectangular covering for the initialized hierarchy; searching for coverings within the initialized hierarchy; detecting and building additional elements and/or structures into the hierarchy; and merging child structures into the hierarchy.

Detailed Descriptions of the Various Embodiments and Aspects of the Invention, with Reference to the Drawings The presently described inventive concepts principally relate to processing images, and particularly images of documents, to create a data structure that is more suitable as input to extraction models, generative models, large language models (LLMs), and the like. In particular, the inventive concepts presented herein facilitate such models' ability to understand structured information and context that is inherently understood by humans, such as relationships between different pieces of information presented within the document as indicated by geometric arrangement of content, by the presence of graphical elements (particularly graphical lines), by symbols (such as units) associated with content, etc. as would be understood by a person having ordinary skill in the art upon reading the present disclosure.

Overview

According to one illustrative approach, automated transformation of information present in one or more document images into a textual representation may be performed in accordance with a method 1050 as shown in FIG. 10.5. The method 1050 may be implemented in any suitable manner, and may be employed in combination with any other processes and/or aspects thereof as described herein without limitation, unless otherwise expressly indicated. Moreover, method 1050 may be implemented in any suitable environment or form, such as a set of computer program instructions configured to cause a computer (or components thereof, such as a processor, etc.) to perform the steps of method 1050.

As shown in FIG. 10.5, method 1050 includes operation 1052, where a plurality of optical marks depicted in the one or more document images; a plurality of text elements depicted in the one or more document images; and a plurality of regions defined by graphical lines depicted in the one or more document images are hierarchically segmented, e.g., using techniques as described in greater detail hereinbelow.

In operation 1054 of method 1050, the hierarchically segmented plurality of optical marks, the hierarchically segmented plurality of text elements, and the hierarchically segmented plurality of regions are aggregated and reconciled into a single hierarchy Moreover, operation 1056 of method 1050 involves generating a textual narrative based on the single hierarchy.

The algorithm (including all various features, aspects, embodiments, implementations, etc. as described herein in any suitable combination that would be appreciated by those having ordinary skill in the art upon reading the present disclosure) generally includes receiving input. The input includes: (a) one or more images of a document; (b) identification of text elements and/or features (especially graphical elements) recognized within the one or more images of the document using one or more recognition engines (e.g., OCR, ICR, etc.); and (c) additional information generated by the one or more recognition engines (e.g., recognition statistics such as confidence measures, geometric information about recognized characters, font type, etc.; putative associations between elements such as "key/value" pairs or other equivalent associations; element tags; element labels; element types (including, e.g., types of objects detected and/or classified within the image), and/or any suitable combination or equivalent of the foregoing that would be appreciated by those having ordinary skill in the art upon reading the present disclosure. In some approaches, the "additional information" may be optional, though in preferred embodiments at least some additional information is present in the input provided to the algorithm.

Armed with the foregoing input, the algorithm processes the same to generate a prompt suitable for providing to a generative model as input, e.g., as a query or to accompany a query. The prompt preferably is self sufficient to obtain an intelligible (and ideally accurate) response from the generative model, and therefore preferably includes a task definition and a narrative. The task definition may vary according to the generative model and nature of the inquiry under investigation, but generally identifies the type of task or result the user wishes to be performed by/to obtain from the generative model. According to various exemplary implementations, task definitions may direct the generative model (or other downstream engine, application, API, etc.) to summarize different aspects of (especially large, complex) documents, such as to summarize copious financial data describing an entity's performance over a given period of time, to identify information relevant to troubleshooting a particular problem that is described by various data within an error log, to diagnose a medical condition based on extensive medical records for a given patient, to produce a single graphic such as a chart, figure, etc. that summarizes different data presented in a corpus of academic research papers, etc. as would be appreciated by those having ordinary skill in the art upon reading the present disclosure. In more implementations, a task definition may direct the generative model (or other downstream engine, application, API, etc.) to extract information from a document, including particular types of information, while potentially ignoring or omitting other types of information from the document. For example, information extraction may involve extracting financial information, textual information, numerical information, biographic information, graphical information, etc. as would be appreciated by skilled artisans upon reading the present descriptions. In still more implementations, a task definition may direct a generative model (or other downstream engine, application, API, etc.) to classify a document or a portion thereof as a particular type of document (or portion thereof), such as a medical document, a financial document, a legal document, a business document, an explanation of benefits document, an invoice, a purchase order, a shipping manifesto, a table, a figure, a graph, a chart, a picture, a logo, a section of text, etc., as would be understood by those having ordinary skill in the art upon reading the present disclosure.

Again, it should be understood that the particular form and content of the task definition will vary according to, among other aspects, the generative model being utilized to analyze the available relevant information; and the nature of the inquiry of interest. The particular structure, content, etc. of the task definition is beyond the scope of the present disclosures, and crafting an appropriate task definition shall be considered a function that is well within the ability of those having ordinary skill in the art of prompt engineering upon reading the present disclosure. However, it shall be further understood that the various functions described in further detail hereinbelow that are involved in comprehending all information represented within the input document image(s), and generating a narrative on the basis thereof, are inventive in nature rather than routine, and should be considered part of the scope of the invention as presently described. These functions include, but are not limited to, optical mark detection and various aspects thereof, image preprocessing and various aspects thereof, text segmentation and various aspects thereof, image segmentation and various aspects thereof, hierarchy and relationship determination, ordering, merging, etc. as described in greater detail hereinbelow.

Similarly, processing the input described hereinabove to generate the prompt generally includes: (1) Preprocessing; (2) OMR; (3) Text Segmentation; (4) Image Segmentation; (5) Hierarchy Detection; (6) Hierarchy Aggregation and Reconciliation; (7) Narrative Generation; and (8) Page Aggregation. These procedures may be performed in any suitable order as would be understood by a person The following descriptions provide detail regarding each aspect of the overall algorithm.

Preprocessing

According to various embodiments of the presently described inventive concepts, preprocessing preferably employs image processing techniques, such as line detection to detect graphical lines (preferably, line detection is performed on an image of the document with recognized characters omitted/removed therefrom, leaving an image substantially devoid of text). In accordance with various embodiments of the presently disclosed inventive concepts, preprocessing may additionally or alternatively include: box detection, grid detection, bar and/or stack detection, rectangle detection, line delineation, character recognition, and layout analysis. Box detection, grid detection, and bar/stack detection are particularly suitable for documents including tables. The foregoing suboperations may be performed in any suitable combination or permutation, depending on the nature of the document to be processed, and/or may be performed in any suitable manner or order as described herein, or as would be understood by a person having ordinary skill in the art upon reading the present disclosure. In various embodiments some or all of the foregoing preprocessing suboperations may be omitted without departing from the scope of the inventive concepts presented herein.

Line Detection

In one exemplary approach, pre-processing line detection seeks to identify a set of substantially perpendicular lines, preferably (at least partially) intersecting perpendicular lines, oriented substantially horizontal and vertical with respect to the page/image (although skewed/diagonally oriented lines, and/or lines deviating slightly from strict perpendicularity may appear in images of documents due to imaging artifacts, document (mis) alignment, etc. as would be understood by a person having ordinary skill in the art upon reading the present disclosure). In some approaches, lines deviating from substantial perpendicularity and/or horizontal/vertical orientation (e.g., by ten degrees or more) may be ignored for the purpose of transforming information represented in image form into a textual representation.

A preferred approach to line detection proceeds substantially as follows, using horizontal orientation as an exemplar. Vertically oriented lines may be detected using a substantially similar method, on a rotated image. Accordingly, skilled artisans will appreciate that line detection may be performed equivalently on horizontal or vertical lines, in any order, depending on the orientation of the source image subject to detection.

In particularly preferred approaches, source image(s) are analyzed to identify and remove recognized (e.g., OCR'ed) text therefrom, e.g., as described herein, according to several exemplary embodiments. Removing recognized text is preferably performed such that new "lines" on the image are not created.

For instance, each recognized element has a corresponding position on the page, preferably defined by pixel coordinates which in turn define a rectangle. Removing recognized text without creating new lines includes "painting over" the recognized rectangles in a gray-scale image. "Painting" all rectangle with one color causes the rectangle to appear faint, undesirably leading to potential erroneous detection of lines at the rectangle sides. To avoid such erroneous detection, in preferred approaches "painting" the rectangle includes using an average color of the four projections to the rectangle's boundary.

The boundary is preferably defined by the smallest rectangle containing the recognized element's rectangle. Normally, the boundary pixels are of background color, with slight variations. Sometimes, a boundary pixel can be part of the recognized element's text (e.g., part of the connected component recognized via character recognition). Therefore, if a projection has a significantly different color value, e.g., a color value exhibiting a difference in intensity value of at least about 10 units in a given color channel relative to a the most frequent boundary color (again, preferably in at least the given color channel), the color value is replaced with the most frequent boundary color when computing the average, in preferred approaches.

Having painted over text in the gray image, the gray image is binarized, and horizontal lines are preferably detected within the binarized version of the gray image. Most preferably, the binarization technique employed cleanly removes the text without creating new line artifacts, in large part because of the way rectangles were "painted over" as described herein.

Line detection according to the various embodiments described herein may employ one or more known techniques, such as erosion and/or dilation, image processing techniques known in the art.

According to one embodiment, such new and specific implementation includes using multiple, preferably two kernels, one large and one small. The large kernel is used to apply erosion to the source image and identify candidate rows that may include horizontal lines. Additionally, a custom padding process is employed to build horizontal rows from pixels distributed across neighboring rows (growing the row boundary to include such distributed pixels, and optionally pixels therebetween). Erosion and dilation may subsequently be applied, e.g., in combination via a "close" operation, and preferably using the small kernel to reinforce the horizontal rows created thus far. Further, erosion and dilation operations are preferably applied using the large kernel to eliminate "junk" lines (typically caused by scanning artifacts) and rectify detected line segments.

Preferably, the foregoing set of operations yields vertical and horizontal lines from the image. Therein, small gaps are detected and removed where multiple found lines exist for a given point (x, y) or stretch (e.g., a plurality of consecutive/adjacent pixels having a common x (vertical stretch) or y (horizontal stretch) value, particularly where the small gaps are smaller than a configurable, predefined percentage (e.g., 1%, 5%, 10%, in various embodiments) of the page height (for vertical stretches) or width (for horizontal stretches). Gaps larger that the predefined minimum page height/width threshold(s) are preferably tolerated for gaps where vertical and horizontal lines cross (which often indicate/correspond to a vertex in a grid).

As noted hereinabove, sometimes graphical lines intersect with text (e.g., via close underlining, strikethrough, handwritten annotations, etc. as would be understood by a person having ordinary skill in the art reading the present disclosure). Such intersections are particularly problematic for the detection of graphical lines and of text as individual elements of an image, especially for words that contain letters that have a "stem" that extrudes below the word baseline, e.g., "j,p,q" etc. Often the underline (e.g., as in a hyperlink) intersects the character stem. Frequently neither the line, nor the character, are identified using conventional image processing and/or character recognition techniques.

Accordingly, in such embodiments it is advantageous to perform a repre-detection analysis to determine where a part of a graphical line could be lost due to removal of the intersecting/intersected text. Preferably, particularly for recognized elements that contain characters with descending stems, the repre-detection analysis includes inspecting each recognized text element for the presence of a graphical line that spans the entire width of the element and is located within the bottom portion of the element rectangle, as follows: (1) creating a binary image corresponding to the element rectangle, (2) inspecting each row of pixels in the bottom third of the resulting binary image, (3) identifying the presence of a graphical line where all pixels in a given row of the image correspond to the image foreground color (e.g., black), and (4) if one or more graphical lines is detected adjust the bottom of the element rectangle upward such that the new rectangle omits the highest graphical line detected, and (5) use the newly updated rectangle for the purpose of removing text, as described hereinabove with respect to "painting over" lines and/or characters.

Preferably, the repre-detection analysis also includes identifying gaps in what would otherwise be continuous horizontal or vertical lines, and where such a gap exists in the location previously occupied by recognized text (as defined, e.g., by the rectangle associated with a word or a phrase produced as part of the character recognition process) restoring the line within the corresponding text element rectangle.

In accordance with illustrative embodiments, restoring a line generally refers to recreating/drawing a connecting/intersecting/missing part of a line as represented within a binary image. For instance, consider two-line segments with a gap in between, the gap being or corresponding to one or more pixels previously representing a character or other connected component in the binary image. In one approach, line restoration includes noting the location (e.g., (x, y) pixel coordinate(s)) of endpoint(s) of one line, and the end point(s) of the other line (preferably the $(x_1, y_1)$ of an endpoint of the first line and the $(x_2, y_2)$ of an endpoint of the second line), where a gap exists between these points, and drawing (e.g., in/on the image) on the image a straight line that connects them. Most preferably, this drawn portion will be or correspond to a purely horizontal line (i.e., with constant y) or purely vertical line (i.e., with constant x) but slight deviations from strict vertical/horizontal orientation are also to be understood as within the scope of the presently described inventive concepts, in various embodiments.

Notably, scanning artifacts that create "garbage" horizontal and/or vertical lines are removed from consideration and not subjected to further processing. Specifically, in preferred embodiments a detected graphical line will be discarded and removed from further consideration if any of the following conditions apply: (1) a horizontal or vertical line intersects any edge of the page (left, right, top, bottom) within one standard unit of tolerance, (2) if not determined to be part of a grid (as described herein below) a vertical line lies within the leftmost or rightmost 5% of the page width (i.e., within a left or right margin of the page).

The horizontal and vertical lines detected herein are preferably used to detect higher-level graphical elements, including but not limited to boxes, bars, stacks, and delineating lines, e.g., as described in greater detail hereinbelow.

Having identified graphical lines, an image where these lines are removed may be generated and stored. Using the "no lines" version of the image, wherein preferably all lines are removed, and only detected characters remain, prevents graphical lines from being confused with the pixels that constitute characters. As such, this "no lines" image is particularly suitable for performing operations related to fixing character recognition errors and/or involving direct pixel inspection, such as described in greater detail herein with respect to "Error Detection and Correction" and "Filtering."

Effective Rectangle Detection

The effective rectangle of an OCR element is defined as the rectangle of the element that has been extended horizontally to correspond to the width of a graphical line that underlines the element, if any. The use of effective rectangles when defining the width of columns (i.e., according to the contained elements) more accurately reflects the intended horizontal extent of the column than if the literal OCR rectangles were used for this purpose, and allows for more appropriately incorporating into the column other elements that reside within this horizontal extent.

Accordingly, particularly when the bounding rectangle of the OCR element is centered horizontally with respect to the underlining graphical line, the horizontal extent (i.e., left and right boundaries) of the OCR element is replaced by the horizontal extent of the underlining graphical line in all subsequent processing related to transforming information represented in image form into a textual representation.

As referenced throughout the present disclosure, it shall be understood that extents, if extended, remain extended for all subsequent processing operations, unless expressly stated otherwise.

Line Delineation

The concept of a delineating line is that certain, especially horizontal, lines are important and convey special (often contextual) meaning for structured information such as tables, charts, figures, grids, etc. For example, delineating lines often: delineate one or more text line(s) above from text line(s) below, e.g., as in underlined column headers; and/or indicate the horizontal extent of something, typically a column. For example, as shown in FIG. 10B, table 1010 may be considered to include three delineating lines 1012, 1014, and 1016, each of which spans the horizontal extent of the region 1018 (to the right of the row labels and accompanying ellipses).

The uppermost delineating line 1012 delineates the header region 1018a ("Units", "Weighted-Average Grant-Date Fair Value") from the data region 1018b, while the delineating lines 1014 and 1016 respectively delineate the upper and lower boundaries of the last row (bottommost delineating line 1016 also defines the bottom of the table). Each delineating line may include, and preferably consists of, one or more sublines (lines having the same or similar y-value, e.g., where the difference in y-value is less than one standard unit of tolerance, as described herein below). Accordingly, "sublines" may appear as or similar to "long dashes" in a dashed line, in various embodiments.

Of course, in other scenarios, delineating lines may be exemplified by underline formatting within a form, axes and/or tick-marks on charts, legends on figures, etc. as would be understood by those having ordinary skill in the art upon reading the present disclosure.

Coordinate values of delineating lines may provide important contextual information about the corresponding table/tabular data arrangement, such as the boundary/boundaries of the table and/or portions thereof (especially where graphical lines of a table do not form a full grid).

The y-values of delineating lines (i.e., and of all sublines, with some tolerance) may be important. For instance, again with reference to FIG. 10B, the top or uppermost delineating line indicates the y-boundary between the data and the header(s) of the table; the middle delineating line defines a y-boundary between the last two rows of the table, and the bottommost delineating line define the lower y-boundary of the last row (and of the table itself).

The x-values of delineating lines (and particularly of the left and right endpoints of the associated sublines) may also be important. For instance, x-values may indicate the corresponding x-value boundary or boundaries of columns. Additionally, or alternatively, x-values may define "implied vertical lines" as described in greater detail elsewhere herein.

In essence, delineating lines may form a "partial" grid. In preferred embodiments, delineating lines satisfy the following objective criteria: (1) the lines must not be narrower than the width of the smallest text element on the page in question; (2) the lines must not overlap and/or be located partially or wholly within an excluded region; (3) the lines should (a) not be or include any part of a "box" or "grid", (b) should be located immediately adjacent to (i.e., next to) a text element, and (c) should not have any intervening graphical element(s) located therebetween; and (4) the lines are preferably positioned vertically adjacent to at least one text element.

In addition, sublines of a given delineating line may be, and preferably are, grouped to form a single associated delineating line. Criteria for such grouping may include subline(s): sharing y-values that are within one standard unit of tolerance, having a leftmost value defined by a leftmost point on a leftmost one of the grouped sublines, and/or having a rightmost value defined by a rightmost point of a rightmost one of the grouped sublines.

Character Recognition

In various approaches, preprocessing includes performing character recognition, preferably optical character recognition (OCR), but additionally or alternatively employing other known character recognition techniques, such as intelligent character recognition (ICR), graphics device interface (GDI), clustering-based recognition, feature extraction-based recognition, pattern matching-based recognition, techniques using neural networks, etc. as would be understood by a person having ordinary skill in the art upon reading the present descriptions.

Statistical Analysis

Regardless of the specific technique employed, character recognition is preferably accompanied by a set or series of analyses, including statistical analysis of the recognized character(s) geometric characteristics, such as mean, median, mode, measures of character height, width, aspect ratio, etc., and/or distance measures, preferably distance measures independent of image resolution (e.g., pixel units). These statistics are preferably used in subsequent steps to refine the content of the page, as described below in further detail according to various exemplary embodiments of the presently described inventive concepts.

Distance Measures

In particular, in order to effectively accomplish transforming information represented in image form into a textual representation, it is often necessary to evaluate the horizontal and/or vertical alignment of two different visible features as rendered on a page image (e.g., OCR elements, graphical lines, or any other visually discernable feature that may appear in an image, particularly an image of a document, as would be appreciated by persons having ordinary skill in the art upon reading the present disclosure) and to similarly measure the distance between the x- and/or y-coordinates, respectively, of such visible features. Preferably, this is accomplished in a manner that is independent of image resolution, by establishing units of distance that do not rely on an absolute number of pixels, such as units of tolerance as defined hereinabove.

More preferably, units of tolerance as defined hereinabove may be employed as the units of distance that do not rely on absolute number of pixels. In a particularly preferred embodiment, a unit of tolerance may be established as one third of the average character width as observed across all OCR elements within the document under consideration. Of course, those having ordinary skill in the art will appreciate, upon reading the present disclosure, that other units of distance that are independent of absolute number of pixels may be employed without departing from the scope of the inventive concepts described herein. Similarly, other values, which in turn may be based on other characteristics (particularly geometric characteristics) of recognized text elements depicted in an image may be used as units of measure independent of absolute number of pixels.

Error Detection and Correction

To further to refine the content of the page and facilitate detection and extraction, in one approach statistics such as average character height and width may be used to detect and/or fix OCR errors on the analyzed page(s). For instance, rectangles of OCR elements that are invalid, and/or that extend beyond at least one page boundary may be removed/omitted from further analysis.

Based on these statistics, words appearing on the page that are over-joined may be identified and split, over-split words may be joined, and missing characters (e.g., punctuation marks, dashes, ellipses, spaces, etc.) may be filled in/fixed, text elements may be joined into segments, blocks, columns, etc. as described in further detail hereinbelow.

Figure 10A:
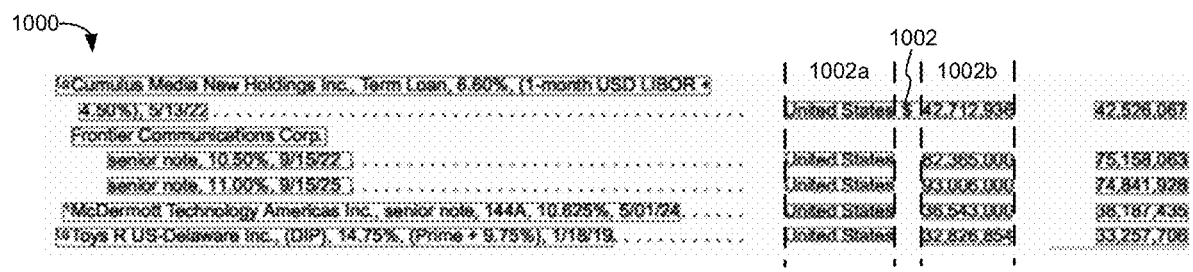
FIGS. 10A-10B depict exemplary tabular data arrangements that each respectively include a plurality of distinct textual elements, at least one of which is erroneously combined with an adjacent textual element, according to some illustrative embodiments.
Figure 10B:
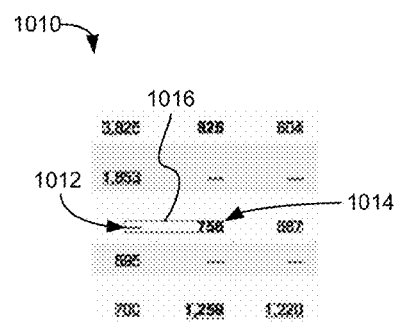

With reference to splitting over-joined words, in various embodiments character recognition yields text elements, such as element 1002 ("United States $42,712,936"), as shown in FIG. 10A, where text elements recognized by OCR are indicated by rectangular bounding boxes. In reality, element 1002 includes two distinct values: the value "Unites States" actually belongs column 1002a of table 1000, while and the dollar amount belongs to an adjacent column 1002b. Such "combined" or "agglomerated" elements often complicate correct column detection since they can span multiple columns.

Accordingly, the embodiments described herein may include detecting one or more predefined indicators, such as currency symbols (e.g., $, €, etc.), percent symbols, unit indicators (e.g., "lbs.", "No.", etc.), or any other suitable label/indicator associated with text value(s).

Such indicators preferably are identified in association with the internal portion of a text element. If so, the element is considered a candidate for splitting. If an adjacent value to the left and/or right of the symbol (in this case "United States" on the left) also appears on neighboring lines as a separate element, this is taken as indicative of a potentially mistaken split based on character recognition results. Where such neighboring indicators are found, it may be advantageous to split the element, where the resulting "new" elements each form individual columns.

While splitting over-joined words in some embodiments addresses problems caused by presence of certain symbols, in other embodiments dashes or other placeholder values present in tables may lead to over-joining. For instance, dashes are commonly used in tables as a placeholder (e.g., to indicate the value is zero and/or not applicable). These characters are frequently problematic for OCR and can be joined to other words. This causes problems for table processing since the mistakenly joined word can cross columns. For example, in FIG. 10B dash 1012 is mistakenly attached to the horizontally adjacent text element 1014 (value "756"), causing two distinct text elements to be erroneously considered a single element 1016.

Such conflation of elements is a frequent occurrence for dashes. For instance, if an OCR element starts with a dash, the position of individual characters within the OCR rectangle (according to pixels on the image) may be characterized by a large horizontal distance between the dash and the next/adjacent character to the right of the dash. If this distance is significantly larger than the average distance between characters in the page, the element is preferably split between the dash and the adjacent character(s), creating two elements, one a dash, and the other the remaining characters that followed the dash in the mistakenly conflated single character recognition element. Notably, this process also advantageously determines (via explicit search) the correct height of new OCR rectangles from the image, as well as the left and right edges of the resulting two elements.

With continuing reference to dashes, character recognition also often misses stand-alone dashes. For example, in table 1020 shown in FIG. 10C, there are a total of fifteen dashes, but when an image of table 1020 is subjected to conventional OCR, only four of the dashes are properly identified. In practice, OCR and other conventional character recognition techniques tend to omit/exclude/ignore/miss dashes that are located within a small distance (e.g., 1-4 units of tolerance) of other graphical lines, particularly commonly oriented graphical lines. Similarly, conventional character recognition techniques struggle to detect dashes characterized by a substantial length (e.g., at least two character widths, at least three character widths, or more, in various embodiments). Without wishing to be bound to any particular theory, the inventors postulate conventional character recognition engines may be configured to avoid interpreting graphical lines as textual elements, with the resulting consequence that "line-like" textual elements such as dashes are detected with less accuracy and fidelity compared to other types of textual elements.

Since the dashes in fact are entries, e.g., particularly in table(s) and other data arrangements (e.g., indicating a "null" value) and thereby facilitate correctly detecting columns and rows, identifying the missed dashes can provide significant advantage with respect to identifying columns, rows, and/or cells, again, particularly of tables and/or forms. From one or more exemplary dashes, one can determine a range of suitable dimensions for dashes. Therefore, in some embodiments it is advantageous to look for horizontal lines on the source image where the bounding rectangle matches these known dimensions, and if such lines are found, to create an OCR element with a value of a dash.

Ellipses are commonly used in documents to indicate rows, such as for a table of contents. These tend to confuse character recognition algorithms, and are often joined with tokens, especially on the right side of the ellipsis. This joining may become problematic where the incorrectly joined OCR element spans a portion of a document that includes multiple columns.

Accordingly, preferred embodiments of error detection and correction include detecting ellipses (e.g., using regular expressions), determining whether one or more text elements follow (e.g., are immediately adjacent in the proper text-orientation direction), and if so, splitting the ellipsis and adjacent text into individual OCR elements based on average character width, which is used to estimate the adjacent character/word length. In this sense, the term "ellipsis" refers to a sequence of two or more adjacent dot characters.

In more embodiments, ellipses may be missed by character recognition, and undesirably excluded from/ignored in subsequently analyzing the document/page. For example, in table 1030 as shown in FIG. 10D there are many ellipses, but all are missed by conventional character recognition engines. However, since ellipses can help to correctly detect columns and rows (and in particular often serve to define the row boundaries), e.g., as described hereinabove, it is advantageous to search for the missed dots and ellipses, and ensure such characters/symbols are included in subsequent analyses, as appropriate.

The methodology for addressing missed ellipses, in one approach, is similar to finding dashes—i.e., identify groupings of foreground pixels on the image that satisfy the dimensions of a dot (preferably where both the height and width of bounding box of the connected component in question are no less than 10% of the average character height and no more than 20% of the average character height), sort the found dots by vertical coordinate, and group found dots having the same (or similar, e.g., within a threshold of one standard unit of tolerance, according to various embodiments) vertical coordinate. The width of the ellipsis is preferably taken to be the longest streak of dots exhibiting a substantially constant interval between the dots. Groups of dots may be evaluated, e.g., for length, and those groups satisfying a minimum length criterion may be retained as elements of the table/tabular data arrangement.

With continuing reference to exemplary embodiments of error detection and correction, another text-based artifact occurring in the scope of table detection is the existence of over-split words, undesirably creating multiple elements where a single element truly is present. In particular, over-split words are often indicated by being associated with a corresponding symbol, e.g., a currency value, unit of measure, percent symbol, etc. that is located a substantial distance, e.g., several character width(s) or more, away from the associated (adjacent) word, but substantially aligned in vertical position, such as element 1042 and corresponding currency symbol 1044 as shown in FIG. 10E.

In accordance with various embodiments of the presently disclosed inventive concepts, joining such over-split words into a single element advantageously results in more reliable determination of column width (e.g., where the dollar sign and/or elements otherwise located the above dollar sign might not be included within the column and/or might be construed as part of a separate column). Locating characters and associated symbols is preferably performed using a pattern matching approach, in some embodiments.

In preferred embodiments, over-split words, symbols, ellipses, dots, dashes, etc. are located based on analyzing a "no lines" version of the digital image, which may be generated as described hereinabove with respect to line detection.

Filtering

Filtering is another preferred aspect of the inventive character recognition-based techniques described herein. In general, according to the present disclosure filtering may include/involve removing junk characters, vertically oriented characters, and/or large text. Filtering these elements advantageously improves accuracy of subsequent analyses and ultimately transforming information represented in image form into a textual representation.

In preferred approaches, filtering may include removing: (1) elements that overlap, in whole or in part, with a boundary of a page/subpage; (2) elements that entirely contain other element(s); (3) "tiny" elements, i.e., elements characterized by an area less than about 0.5 W×0.5 W (where W is an average width of characters appearing in a same image as the "tiny" elements); and/or (4) "large" text, i.e., characters having a height greater than about twice an average height of characters appearing in a same image as the "large" text.

Grouping

Character recognition also preferably includes grouping recognized characters, more preferably grouping characters into words, grouping words into lines of text, and/or grouping words into phrases, depending on the type of character recognition employed and corresponding output (e.g., where character recognition outputs recognized words, grouping characters into words may not be necessary).

As defined hereinabove, a "phrase" refers to a group of elements (usually a group of words, numbers, and/or symbols) that reside on the same text line and that are closely spaced, such that a human reader would understand that the elements comprising the phrase are intended to be considered as a single unit. Grouping of words into phrases is preferably accomplished by considering each text line separately and determining an average character width within the text line in question.

In one embodiment, phrases may be identified by moving from left to right within the text line in question (or equivalently from right to left, without departing from the scope of the inventive concepts presented herein, e.g., as would be appreciated by a skilled artisan as suitable for right to left languages such as Arabic), grouping OCR elements until one or more criteria are satisfied that identify that the present position within the text line represents a boundary between groups (i.e., the present position in the text line corresponds to the end of one group and the beginning of a different group), and continuing along the text line until the end of the text line is encountered.

Preferably, the criteria used to identify boundaries between phrases includes the presence of a large gap between adjacent words, where the width of the gap is greater than 1.5 times the average character width for the line in question, and/or the width of the gap is greater than 1.5 times the average height of the elements to the left and right of the gap, excluding consideration of punctuation elements such as dash, dot, comma, etc.

Even where the size of the gap between words is small, the criteria used to identify boundaries between phrases preferably include: (1) the presence of a vertical graphical line in the gap between words, (2) determination that the element on the left of the gap is or ends with an ellipsis (as determined by the presence of two or more consecutive dots) while the element on the right is not an ellipsis, (3) determination that the element to the left of the gap and/or the element to the right of the gap correspond to known "data" elements that commonly occur singly in columns of a table (e.g., currencies, percentages, numerical amounts, etc. as would be appreciated by a skilled artisan), (4) the location in question within the text line lies within and "unclosed" parentheses or bracket, i.e., where an "open" parentheses or bracket lies to the left of the location without a corresponding "close" parentheses or bracket that is also to the left of the location in question, (5) the elements to the left and right of the gap exhibit a difference in height that is greater than 50% relative to the height of the smaller element, indicating a significant change in font size.

According to several embodiments, phrases may be considered (and referred to herein) as individual "OCR elements" for subsequent processing. Using phrases as individual elements is advantageous in the context of table/tabular data detection and extraction since the intention of the writer in writing closely spaced words is that the words should be considered by the reader as a single unit, and accordingly, column boundaries within tables should not be established that cross the horizontal extent of a phrase. In practice, the vast majority of tables are limited to a single phrase per cell.

Of course, in various embodiments, grouping of characters into words, and/or of words into phrases, may be performed using appropriate, conventional character recognition techniques, as would be appreciated by a skilled artisan upon reading the present disclosure.

Regardless of the manner of grouping characters/words, in preferred embodiments "phrases" (also expressed, in various approaches, as "N-grams") are employed as the "unit" of character recognition for other operations relying on characters as a source of information.

Characterization of Values

Recognized characters may be further analyzed, e.g., to assign contextual meaning to certain characters, to assign character values (e.g., OCR, ICR, GDI, etc. values), etc. in order to provide additional information (especially contextual information) about the nature of the information stored in documents. In particularly preferred embodiments, such characterization of values involves evaluating recognized characters using pattern recognition techniques/tools, such as regular expressions and associated heuristics, e.g., any one or more heuristics as described hereinabove regarding splitting over-joined words.

In preferred embodiments, the characterization analysis includes identification of information types that are commonly present in documents, including but not limited to information such as, units, phone numbers, dates, years, currency amounts, numerical values, percentages, symbols that are used to indicate that no value (null value) is available and/or applicable for a particular cell in a table (e.g., "-", "n/a", etc., and optionally any associated units), alphanumeric identifiers (e.g., "123-AB-78-X7"), key-value pairs (e.g., "NAME: JOE SMITH"), etc. It is then frequently beneficial for the purpose of transforming information represented in image form into a textual representation to consider OCR elements in terms of the type of information that the literal value represents (e.g., currency amount) rather than the literal value (e.g., $413.12).

The characterization analysis may further identify generic patterns within text, including but not limited to identifying classes of characters such as "uppercase alphabetic," "numeric," "lowercase alphanumeric," "symbol," "other," etc. as would be understood by a person having ordinary skill in the art upon reading the present disclosure. According to one example, a string of characters "aa0.0A" may be assigned a generic pattern such as "lowercase alphabetic-lowercase alphabetic-numeric-other-numeric-uppercase alphabetic." In different approaches, case sensitivity may or may not be an aspect of the generic patterns employed.

As will be further understood by skilled artisans, since columns generally include values of a same/similar type, meanings and patterns are often consistent within columns, e.g., all values having the same units, formatting, character sets, etc.

Layout Analysis—Zone Identification and Exclusion

With continuing reference to table detection, in one embodiment, pre-processing preferably includes identifying one or more zones within images of the page/document, most preferably including at least zones that do not correspond to tables or tabular data. Such zones occur most frequently in table-like structures, such as numbered lists (e.g., footnotes), bullet lists, key-value lists, lines for page headers, footers, etc. Zone identification may additionally or alternatively include identifying other features such as borders, page numbers, text regions, text columns (e.g., for pages arranged in "newspaper column" format).

Identifying Enumerated Lists

Enumerated lists can often be misidentified by automated extraction techniques, due the aligned nature of such lists. In particular, such lists are frequently comprised of two columns of aligned of text, where the first column represents the enumerating value (e.g., "1, 2, 3, . . . ", or "(1), (2), (3), . . . " or "(a), (b), (c), . . . ", or many other equivalent sequential representations, as would be appreciated by a skilled artisan upon reading the present disclosure), and a second column that contains information associated with the enumerating value. In spite of the layout with which such lists are often rendered, they do not constitute a table and should not be identified as such by automated extraction techniques. Additionally, such lists are often present as footnotes that serve to explain selected items in a document, are located in close proximity to the bottom of the page, and should not be misconstrued as comprising another portion of the page, such as a table, graph, figure, etc. Avoiding these undesirable outcomes is preferably accomplished by detecting the locations and boundaries of enumerated lists and excluding the identified regions from consideration during other analyses, such as preprocessing and/or optical mark recognition.

Specifically, it is advantageous to consider all text lines within a given page and identify those text lines that begin with an enumerating value, as described above, where such enumerations can take the form of either numerals or single alphabetic characters, and may or may not be written using parentheses or brackets (e.g., "(1)", 1)", "[1]", etc.), and may or may not contain a trailing period (e.g., "1.", "1).", etc.). Subsequently, from among these enumerated text lines, sets of enumerated text lines are preferably formulated as list candidates, where within a given set the enumerating value is sequential and ascending in order. For example, valid sequences include 1-2-3, a-b-c, 7-8-9, etc., while invalid sequences would include e.g., 1-e-3, 1-3-4, 9-6-2, etc. To be included within a candidate set, it is not necessary for the text lines in question to be strictly adjacent, i.e., the text lines can be separated by one or more non-enumerated text lines (e.g., as would be the case in lists where the "data" associated with one or more enumerated values is multiple text lines in length). However, in formulating the candidate sets all consecutive enumerated text lines must be considered.

For each such candidate set, it is advantageous to evaluate whether the enumerated text lines within the set indeed identify a list. In preferred embodiments, if the percentage of text lines that contain greater than 3 phrases is greater than 80% of the number of text lines within the set, there is a high likelihood that the enumeration in question is a portion of another feature of the page, such as a table, and should not be identified as a list.

To further evaluate whether a candidate set of enumerated text lines corresponds to a list, the following criteria are preferably employed: (1) the enumerated text lines should be left-aligned, (2) the (un-enumerated) text lines, if any, that occur between the enumerated text lines should be left-aligned with respect to each other, but not necessarily with respect to the enumerated text lines, and (3) if the (un-enumerated) text lines, if any, that occur between the enumerated text lines are comprised of more than one phrase, the gap between phrases should not be aligned with the gap that follows the enumerating value of the enumerated text lines.

Lastly, it is advantageous to consider whether the text lines that follow the last enumerated text line, if any, are also part of the list, according to the following criteria: (1) the height of the trailing text line(s) must be consistent with the height of other text lines previously identified as included within the list (i.e., indicating the same font size), (2) the vertical distance to the trailing text line(s) must be consistent with single-spacing, i.e., with a vertical separation of no more than a given fraction (preferably half) the height of the text lines in question, and (3) the trailing text line(s) must be commonly (preferably left) aligned with other (un-enumerated) text lines, if any, that occur between the enumerated text lines.

If all of these criteria are met, the area occupied by the group of (now strictly consecutive) text lines should be identified as a list, and this region should be excluded from consideration during table detection and extraction.

Identifying Bulleted Lists

Identifying bulleted lists preferably occurs in a manner substantially similar to the identification of enumerated lists, with the following differences.

First, rather than identifying text lines that begin with an enumerating value, text lines are identified that begin with a character commonly used as a "bullet" indicator in bullet lists (e.g., variations of characters that represent dots, dashes, asterisks, etc.). Second, rather than formulating candidate sets based on sequentially increasing enumerating values, the candidate sets are formulated such that the distance between neighboring text lines within a given set cannot exceed 15% of the height of the page in question.

Evaluation of whether a candidate set of bullet text lines should be identified as a list, and appending of trailing text lines both preferably use the same methodology as used for detection of enumerated lists.

Identifying Key-Value Lists

Key-value lists are another construct that is frequently misidentified as tables by automated table detection and extraction techniques, due to the structured layout frequently associated with such lists. In particular, a key value list is frequently comprised of aligned key-value pairs, where each key-value pair is comprised of a "key" followed by an associated "value", with the key and value being separated by a colon (e.g., "Purchase Order: 123456"). Such key-value lists are frequently rendered on the page such that the keys and/or values are aligned and can therefore easily be mis-identified as columns, e.g., of a table, figure, chart, etc. Avoiding these undesirable outcomes is preferably accomplished by detecting the locations and boundaries of key-value lists and optionally excluding the identified regions from consideration during other evaluations.

Specifically, it is advantageous to consider all text lines within a given page and identify those text lines that contain one or more key-value pairs, regardless of the location of the key-value pair(s) within the text line. Subsequently, the identified text lines are inspected for sets of neighboring key-value pairs that comprise a key-value list, where the criteria for identification of a list includes: (1) the key-value pairs are either left-aligned or are aligned about the colon that separates keys from values, and (2) neighboring key-value pairs within the list are not separated by a vertical distance of greater than 1.5 times the average height of the text lines in question. If these criteria are met, the minimal bounding rectangle of the identified key-value pairs should be identified as a list.

Identifying Subpages

As one aspect of layout analysis, it is useful to identify regions wherein a given page is effectively split into two separate subpages that are situated side-by-side, and to subsequently perform table detection and extraction separately on each identified subpage. Many documents have this layout on some or all pages, and these printed columns (e.g., "newspaper columns") are problematic in part because the printed information is presented in a form similar to, or indeed as, structured information. As will be understood by those having ordinary skill in the art, structured information is easily misinterpreted using automated/computerized techniques.

Figure 11B:
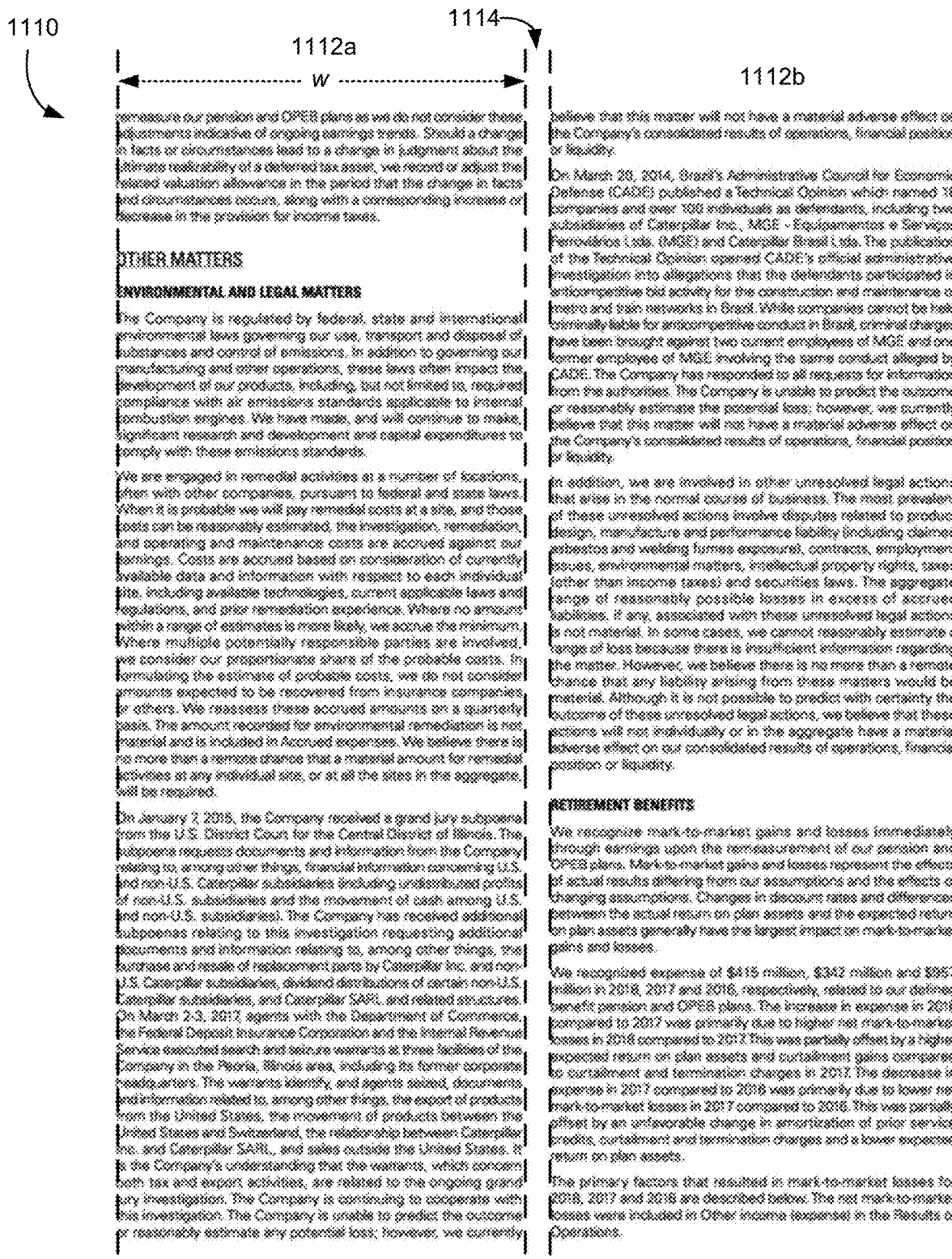
FIG. 11B depicts an exemplary multi-column document, according to one approach.

For example, with reference to the exemplary multi-column document 1110 shown in FIG. 11B, this is due, in part, to the fact that small gaps, e.g., gap 1114, extending along a vertical axis of the page may appear very similar to, and thus be confused with, the whitespace gaps that separate columns, e.g. in a table, graph, chart, etc. As such, absent subpage identification as described herein, conventional detection and extraction algorithms frequently and erroneously extend a graphical element's width to include horizontally adjacent portion(s) of the same page.

Figure 11C:
FIG. 11C shows a multi-column document including an embedded table, with emphasis on various gaps and margins defining text regions of the document, according to one embodiment.

For example, in page 1120 as shown in FIG. 11C, it is very easy (but prevented by the presently described inventive concepts, particularly subpage detection and use thereof) to mistakenly extend the table 1124 (emphasized by a bounding box) into the leftmost adjacent text column 1122, especially since some of the text elements in text column 1122 align vertically with the rows of table 1124. However, gaps 1126 within a column should not cause separation of columns, or creation of additional columns, particularly where the vertically adjacent text on either side of the gap 1126 is vertically aligned (i.e., along the x axis, according to a top-down, left-to-right natural reading order).

To address the foregoing problems with conventional detection approaches, in an exemplary embodiment, subpage detection may be performed and include one or more of the following operations.

Subpage detection preferably includes a preliminary analysis to determine whether a vertical graphical line is present that both: (1) spans the vertical extent of the page, and (2) has an x-coordinate that is located in the center of the page, within a tolerance of the average text height on the page in question. If such a vertical line is present, it is reasonable to conclude that this text line delineates two subpages, and no further consideration is necessary.

If a separating vertical graphical line is not present, subpage detection preferably proceeds wherein printed columns (e.g., 1112a, 1112b in FIG. 11B) are identified in a manner analogous to finding columns within a document. Specifically, within such printed column the text elements (preferably produced by character recognition analysis and/or grouping as described herein) such as words, N-grams, phrases, etc., as well as any horizontal graphical lines that are present on the page, align in the sense that they form a single column that does not intersect (horizontally) with other column(s) on the same page, resulting in one or more whitespace gaps e.g., as in gap 1114 in FIG. 11B.

To verify suspected subpages comply with this structure, in one embodiment a validation process may be employed, ensuring (or at least substantially increasing the likelihood) that no two columns of a page are conflated. In preferred embodiments, candidate subpages are inspected to verify that: (1) subpages on the same page are approximately equal in width, and (2) a majority of the text lines on the page contain at least one element located within each subpage region.

Since documents depicted in accordance with multi-column page layouts are typically constrained to a single column (at least with respect to width), pages are preferably broken into subpages, and subpages are subsequently processed separately in substantially the same manner as individual pages, which significantly improves precision of various techniques described herein.

Identifying Textual Zones

It is a non-trivial task to identify text segments in a document full of data, particularly where text is represented in substantially block-like format, as is typical to many documents. Accordingly, illustrative embodiments of the presently disclosed inventive concepts include detecting textual zones.

In one approach, detecting textual zones includes identifying areas within a document, preferably within a single subpage, that are occupied by text. Even when there is only a single subpage for a given page, detecting text zones per se helps distinguish surrounding text from text belonging to a document, e.g., text present near or on the top and/or bottom borders of graphical elements. For example, FIG. 11A shows a typical situation where tables 1102, 1104 are embedded within text on a page 1100. Text zone detection preferably includes the following steps, all within the context of a single subpage.

It is particularly helpful to determine a left margin for text zones corresponding to those text lines that do not form the first line of a paragraph (which are often characterized by indentation, and thus are not left-aligned with other text lines in the paragraph). This may be accomplished by identifying candidate text lines that satisfy the following criteria, thereby indicating a significant likelihood that the text line lies within a text block: (1) the text line is greater in length than 70% of the subpage width, (2) the text line does not have any gap between adjacent phrases that is larger than a predefined horizontal gap threshold value, e.g., 5 times the average character width, (3) the text line does not include more than one element corresponding to predetermined types of elements commonly found in particular types of documents (e.g., currencies, percentages, etc.), and (4) the text line does not intersect any vertical graphical lines. After the set of such candidate text lines has been identified, the left margin of text zones on the subpage may be selected as the leftmost boundary among the candidate text lines, provided that at least two such text lines have this same left boundary.

Next, all text lines that satisfy the "candidate text line" criteria (set forth above), and that are substantially left-aligned (e.g., within one standard unit of tolerance) with the established left margin for text zones, may be identified as lying within a text zone. In most instances, such text lines will correspond to the interior text lines within a paragraph (e.g., generally excluding the first line of the paragraph, which is typically indented, and potentially excluding the last line of the paragraph, which is frequently short).

Next, the text lines that have been identified as lying within a text zone may be analyzed in order to determine a right margin for text zones, wherein the right margin is identified as the right-most extent of the text lines in question, but only if more than half of such text lines are substantially right-aligned with this value (e.g., within one standard unit of tolerance).

Additionally, in some embodiments text detection includes evaluating paragraphs to determine whether, and if so to what degree, the first text line of paragraphs are consistently indented. Accordingly, each text line that is immediately above one or more text lines that have been identified as lying within a text zone may be inspected in order to determine a paragraph indentation level. The paragraph indentation level may be taken to be the most frequent indentation among such lines, provided that the most frequent indentation is not more than 10 average character widths to the right of the left margin of text zones.

Having established these values, additional text lines may be identified as lying within a text zone, if the text line in question satisfies the "candidate text line" criteria (set forth above), and the text line is either (1) substantially left-aligned (e.g., within one standard unit of tolerance) with the paragraph indentation level, or is (2) substantially right-aligned (e.g., within one standard unit of tolerance) with the text zone right margin. This methodology may effectively serve to identify the first line of each paragraph.

Next, the last line of each paragraph may be identified according to the following criteria: (1) the text line is immediately below a line of text previously identified as lying within a text zone, (2) the text line satisfies the "candidate text line" criteria (set forth above) but excluding the minimum length requirement, and (3) the text line is substantially left-aligned (e.g., within one standard unit of tolerance) with the left margin of text zones.

In addition, the text lines that have been identified as lying within a text zone may be inspected, and a distinct text zone established for each group of consecutive such text lines.

Notably, even where one of the foregoing criteria (excepting indentation level) is not satisfied, suspected text zones may be designated where the indentation level is consistent with other indentation(s) present in the subpage. Suspected text zones are preferably subject to additional analysis to verify/refute "text zone" status/designation.

Optical Mark Recognition (OMR)

Optical Marks such as radio buttons, checkboxes, etc. often function within documents as part of key-value pairs, where the optical mark is the value (typically "true" or "false"), and the associated text caption serves as the key. The inability of conventional recognition techniques such as OCR to recognize and correctly interpret these optical marks limits the completeness and accuracy of the data fed into extraction models, generative models, LLMs, etc., Addressing this is important for unlocking the full analytical power of such models in intelligent decision-making system. For example, if on a form there are two checkboxes-one for Male, one for Female-then the graphical information that indicates which checkbox is selected is preferably translated into text in order to accurately convey information (according to this example, information about gender).

For instance, in accordance with one illustrative embodiment, recognizing optical marks depicted within one or more document images may be performed in accordance with a method 1150 as shown in FIG. 11.5. The method 1150 may be implemented in any suitable manner, and may be employed in combination with any other processes and/or aspects thereof as described herein without limitation, unless otherwise expressly indicated. Moreover, method 1150 may be implemented in any suitable environment or form, such as a set of computer program instructions configured to cause a computer (or components thereof, such as a processor, etc.) to perform the steps of method 1150.

As shown in FIG. 11.5, method 1150 includes operation 1152, where a plurality of optical marks within the one or more document images are identified. The identification is based at least in part on graphical lines depicted in the one or more document images.

In operation 1154 of method 1150, a status of the plurality of optical marks is determined.

Moreover, operation 1156 of method 1150 involves building an optical mark element hierarchy based at least in part on the plurality of optical marks.

Operation 1158 of method 1150 includes ordering the plurality of optical marks.

Additional details of optical mark recognition, according to various embodiments, are described in greater detail hereinbelow. It shall be understood that any permutation, combination, etc. of the following features, operations, embodiments, implementation, etc. may be used in the context of text segmentation generally, without departing from the scope of the presently described inventive concepts, unless expressly stated otherwise herein.

Detection Using Visual Object Detection

Optical marks such as checkboxes, radio buttons, etc. can be detected using visual object detection techniques, e.g., where a visual model (such as a neural network) is trained to detect the location of the optical mark itself, the corresponding textual caption, groupings thereof, or preferably all such locations.

According to select implementations, this method includes the utilization of an advanced object detection and image analysis techniques (e.g., neural networks). This approach enables the precise identification of optical marks in documents, distinguishing them from other graphical elements, and accurately associating each optical mark with its corresponding textual caption. As demonstrated with reference to an exemplary implementation below, there may be various steps in this process.

Training the Model

According to one illustrative implementation, the initial step of visual object detection involves training machine learning models on a comprehensive dataset of labeled documents. The labels in this dataset preferably include: the optical mark itself, the text associated with the optical mark, and the relationship between these elements, which may be referred to by any suitable label describing the relationship.

For example, in one approach the relationship may be labeled as a "group". According to the exemplary approach, one aspect of training includes identifying one or more of several types of related OMR elements or "groups". Preferably, types of related OMR elements include, but are not limited to, OMR Group, OMR Values, OMR Key, and OMR Selection which are defined above. Additionally, it should be noted that OMR Group preferably, but not necessarily, includes the subtypes Simple OMR Group and Composite OMR Group, while OMR Selection includes subtypes OMR Selected and OMR Not Selected, again as defined hereinabove.

Application of the Model

The resolution of document images is adjusted to match the resolution parameters identified during the model's training phase. The trained model is then applied to the preprocessed image. The model not only detects individual optical marks and textual elements but also identifies appropriate relationships (e.g., groups), where each identified relationship preferably includes an optical mark and any directly associated text. In general, optical marks may be understood as a group represented by a small hierarchy, for example a set of optical marks and associated text such as:

"Favorite lunch foods (check all that apply):"

[x] Pizza [ ] Ice Cream

[ ] Spinach [x] Tacos

This small hierarchy includes "conventional" key/value pairs (e.g. pizza=true) as well as a top-level caption "Favorite lunch foods", which may be considered a key for the entire group of following optical marks (checkboxes) and associated text. Of course, the foregoing is a simplified example, and this kind of relationship can extend to multiple levels in more complex real-world scenarios. The presently described inventive concepts involve post-processing the results from a Vision Model (which are typically uncorrelated) in order to establish relationships and build small hierarchies where they exist within documents.

Detection Using Line Detection and Heuristics

According to certain approaches, image processing may be performed separately for OMR (i.e. as opposed to processing for purposes of line detection and hierarchical segmentation) in order to intentionally over-generate lines for OMR. Since the lines will be filtered later, it is preferable to over generate lines rather than to under generate. Filtering helps avoid false positive line detection, while over-generation avoids false negatives. Accordingly, it is unnecessary to remove detected OCR prior to line detection, since many optical marks are detected as a character by OCR (e.g., "O", "D", etc.). This also tends to over generate detected lines (e.g., detecting parts of characters as lines), but filtering as described herein resolves issues that may be otherwise associated with over generation, advantageously.

Binarization

Document images are first converted to grayscale, then smoothed with Gaussian blur to reduce noise. Following the smoothing, images undergo adaptive threshold binarization.

Line Detection

This process refers to, and involves, detecting both horizontal and vertical lines.

The binary image undergoes iterative dilation followed by erosion to enhance the visibility of structural features like lines. Connected components are identified in the processed image. These are analyzed to differentiate between horizontal and vertical lines, which are instrumental in delineating the layout and potential locations of optical marks.

Additional details of line detection, according to various implementations, are described herein above with reference to "preprocessing", and may be employed in any combination or permutation for purposes of OMR without departing from the scope of the presently described inventive concepts.

Finding Horizontal Line Pairs

The algorithm searches for pairs of horizontal lines that could frame the top and bottom edges of an optical mark. It calculates the region of interest between these lines and adjacent vertical lines to isolate potential optical mark areas. Candidate horizontal lines for the top and bottom of an optical mark are filtered according to the approximate expected size of optical marks, where the expected size range is determined according to the average character width (i.e. candidate optical marks cannot be very large or very small relative to average character size).

Vertical Line Identification

For each candidate pair or horizontal lines, we look for corresponding vertical lines that form the left and right sides of an optical mark, within the expected region of interest.

Within each region of interest, the method includes searching for vertical lines defining the left and right borders of optical marks. This involves finding left and right vertical lines that are not too close together to avoid detecting non-optical mark elements that have similar lengths. According to one exemplary embodiment, this process entails calculating the minimum checkbox widths based on the average width of text elements, preferably characters, depicted on the page and a configurable threshold parameter referred to herein as "MinCheckboxSizeFactor". In one implementation determined experimentally to be particularly well suited for business documents, the MinCheckboxSizeFactor parameter may have a default value of 0.8. In preferred approaches, adjacent left and right vertical lines are considered "too close together" if the distance therebetween them is less than 70% of the MinCheckboxSizeFactor parameter.

Analysis for Optical Mark Validation

According to preferred approaches, optical marks are validated to ensure that the dimensions of the detected optical marks fall within expected height and width ranges. Furthermore, as part of validation, potential optical marks may be cross-referenced with OCR data to exclude areas where text significantly overlaps with the optical mark (e.g., within the middle of a word), likely indicating a false positive.

Optical Mark Status Determination

For each validated optical mark candidate, the algorithm calculates the dimensions and evaluates a status thereof (selected or not selected). In one approach, determining selection status involves analyzing the pixels density of the optical mark. Pixel densities above a predetermined threshold correspond to "selected" status, and pixel densities below the predetermined threshold correspond to "not selected" status. The predetermined threshold pixel density may be set according to known characteristics of the type of mark used to indicate "selected" status (e.g., a check mark, an "X", a dot, a filled in circle, etc. as would be appreciated by those having ordinary skill in the art upon reading the present disclosure), and/or may be based on whether optical marks are manually designated, e.g., by a human using a writing implement such as a pencil, pen, marker, etc. (which create marks having unique characteristics including but not limited to width of the mark) or digitally designated, e.g. by clicking a region of a digital document, according to various approaches. In one exemplary approach, a default predetermined threshold pixel density of about 30% may be utilized to discriminate "selected" from "not selected" optical marks. Of course, as will be appreciated by those having ordinary skill in the art upon reading the present disclosure, other values, e.g., in a range from about 10% to about 50%, including any value therebetween, may be utilized for the pixel density threshold, e.g., depending on the type of mark and/or manner in which marks are created as described above, in various approaches.

Detection Using a Combined Approach

Ideally, multiple methods for optical mark detection (machine learning, image processing with heuristics) are combined, yielding an improved result with respect to both accuracy and confidence. For instance, to affirm the presence of an optical mark within the same region of interest, a comparison of the coordinates and dimensions of optical marks detected by both methods is conducted.

In this way, heuristic results may be used to support and validate, refine, and augment vision-based detections (e.g., by a neural network). The heuristics can also utilize additional document context and/or patterns—for example whether the optical marks are all approximately the same size, whether they establish an expected geometrical pattern (e.g., list, grid), etc.

Building OMR Element Hierarchy

Generally speaking the results of conventional OMR do not contain hierarchy information. Therefore, a method for constructing a hierarchy of detected optimal marks and textual elements is among the inventive concepts presently described.

Figure 12:
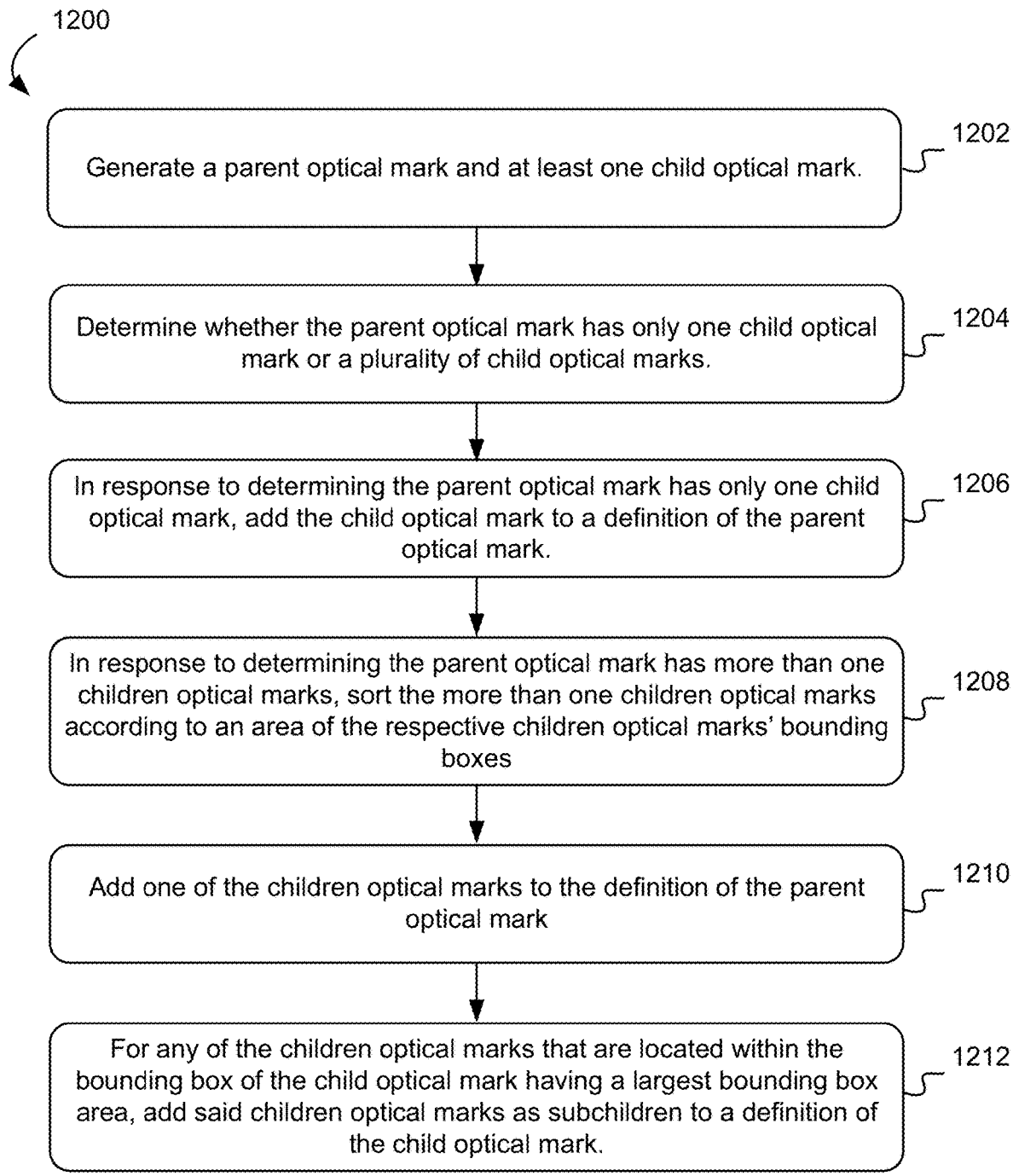
FIG. 12 depicts a simplified flowchart of a method for building a hierarchy of optical marks and associated text elements, according to one implementation.

For instance, according to one illustrative implementation, a method 1200 for building a hierarchy of optical marks and associated text elements from graphical elements and text elements depicted on a page of a document, particularly a business document, is shown in FIG. 12. The method 1200 may be implemented in any suitable manner, and may be employed in combination with any other processes and/or aspects thereof as described herein without limitation, unless otherwise expressly indicated. Moreover, method 1200 may be implemented in any suitable environment or form, such as a set of computer program instructions configured to cause a computer (or components thereof, such as a processor, etc.) to perform the steps of method 1200.

In operation 1202, a parent optical mark and a list of child optimal marks is generated, received, provided, etc. to the algorithm. The initial parent optical mark is taken to be an OMR Group corresponding to the region of the entire page. The initial child optical marks are taken to be those (unrelated) optical marks that were identified using Vision Object Detection, Line Detection and Heuristics, and/or preferably a Combined Approach, as described hereinabove. In subsequent recursive iterations of the algorithms these inputs will be computed for a particular OMR Element under consideration.

Operation 1204 involves determining whether the parent has only one child.

In response to determining the parent has only one child, operation 1206 involves directly adding the child to the definition of the parent.

In response to determining the parent has more than one child, operation 1208 includes evaluating the children optical marks according to bounding box area. Preferably, the child with the largest bounding box area is identified. Additionally or alternatively, children may be sorted according to bounding box area, and various children (including the child having the largest bounding box area) may be identified according to predefined criteria and/or statistical analyses.

With continuing reference to method 1200, operation 1210 involves adding at least one child optical mark (e.g., the child with the largest bounding box area, smallest bounding box area, etc.) to the parent optical mark under consideration, then optionally removing this child or children from further consideration for that parent optical mark.

In operation 1212, method 1200 includes (preferably for each parent respectively), identifying all children that are spatially within the bounding box of the at least one child added to the parent as identified in operations 1206 and/or 1208, and designating these as "sub-children" to the largest child.

In preferred approaches, the foregoing steps are repeated in a recursive manner for each identified sub-child, sub-sub-child, etc. to build deeper levels of hierarchy within each set of recognized optical marks. This hierarchy is preferably reflected within the narrative, e.g., using syntax, as described in greater detail hereinbelow with reference to Narrative Generation.

Following completion of the OMR Element Hierarchy based on bounding boxes as described hereinabove, the resulting hierarchy is evaluated for validity based on the specific types of OMR Elements and the relationships that have been established by the hierarchy. First, elements of type OMR Key or OMR Selection must be children of an element of type OMR Group, and any OMR Key or OMR Selection that does not meet this validation criterion is removed from the hierarchy. Second, elements of type OMR Key or OMR Selection must not have child elements (i.e. these types of elements must correspond to terminal nodes, or "leaves" in the hierarchy tree), and any OMR Key or OMR Selection that has child elements will have those child elements removed from the hierarchy.

Ordering OMR Elements

Figure 13:
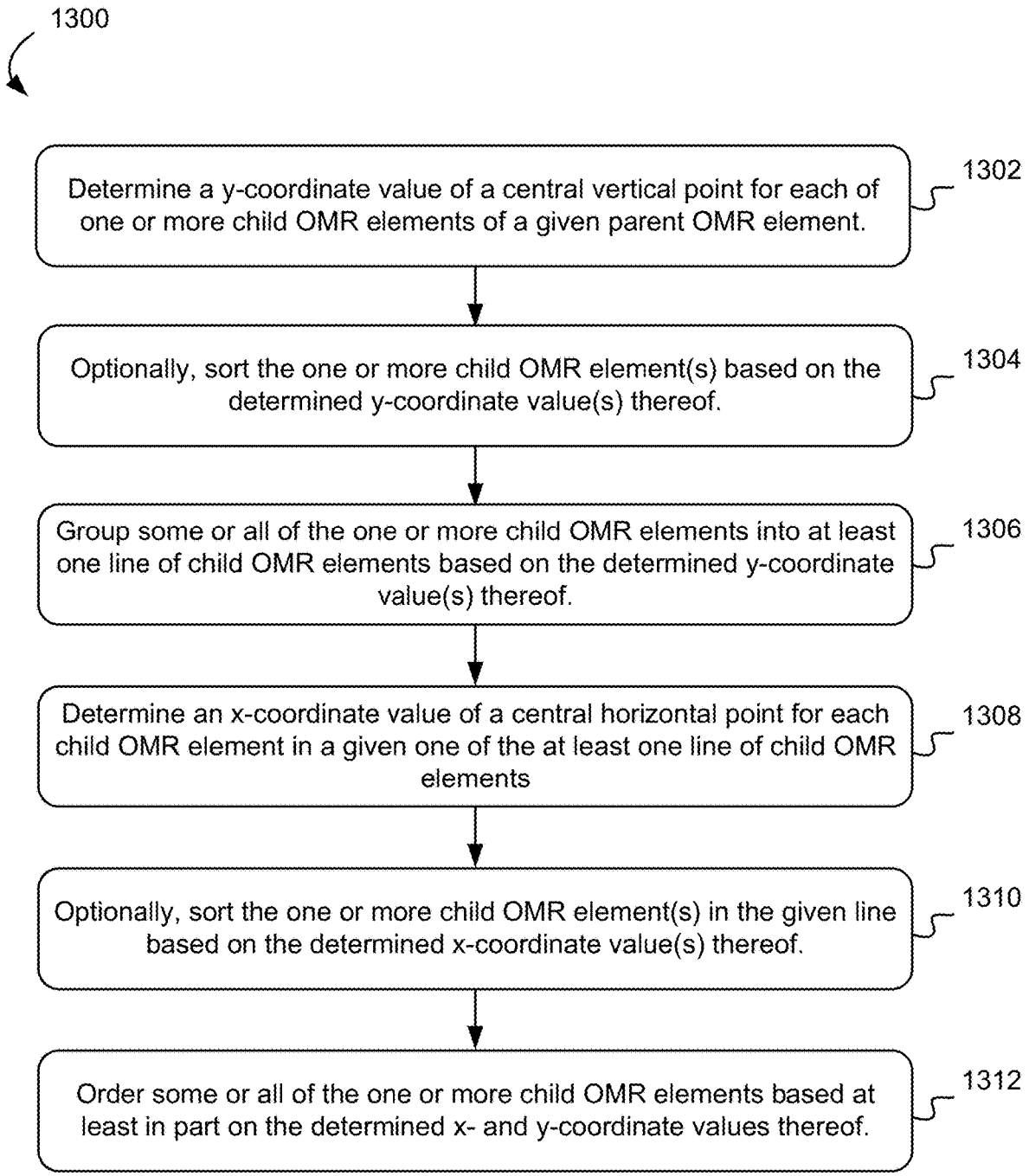
FIG. 13 depicts a simplified flowchart of a method for ordering OMR elements, according to one implementation.

In accordance with one illustrative implementation, a method 1300 for ordering OMR elements depicted on a page of a document, particularly a business document, is shown in FIG. 13. The method 1300 may be implemented in any suitable manner, and may be employed in combination with any other processes and/or aspects thereof as described herein without limitation, unless otherwise expressly indicated. Moreover, method 1300 may be implemented in any suitable environment or form, such as a set of computer program instructions configured to cause a computer (or components thereof, such as a processor, etc.) to perform the steps of method 1300.

In addition to determining the appropriate hierarchy of OMR elements, OMR recognition as described herein preferably includes an OMR ordering procedure 1300, which is implemented to arrange child OMR elements based at least in part on their spatial arrangement. Preferably, OMR ordering procedure 1300 involves performing at least the following operations for each parent OMR element respectively.

According to one implementation, OMR ordering procedure 1300 involves operation 1302, where the y-coordinates of the center of each child OMR element of each respective parent OMR element are determined.

Optionally, but preferably, in operation 1304, child OMR elements are sorted, e.g. in ascending or descending order, based on the determined y-coordinates.

Operation 1306 of method 1300 involves grouping the child OMR elements into lines based at least in part on their respective y-coordinates. Preferably, child OMR elements having a center point with the same y-coordinate value, or a y-coordinate value within a threshold range (such as +3 pixels, according to one approach) are grouped. Skilled artisans will appreciate that operation 1306 is intended to define "lines" of child OMR elements, or equivalently to identify child OMR elements that belong to the same "text line" of a document, and the particular threshold implemented for performing operation 1306 may vary according to the document type, the requisite precision of OMR generally, or any other suitable factor, in various approaches.

With continuing reference to method 1300, operation 1308 involves determining, within each line of child OMR elements identified in operation 1306, the x-coordinates of the child OMR elements. The x-coordinates, in various embodiments, may refer to the range of x-coordinates that the child OMR element spans (e.g., $x_l=15$, $x_r=67$), to the x-coordinate of a central horizontal point of the child OMR element (which may be calculated, e.g., by determining the mean of the leftmost and rightmost x-coordinates of the child OMR element), or any other suitable indication of the horizontal position of the child OMR element within the document.

In operation 1310, again optionally but preferably, child OMR elements belonging to the same line of child OMR elements (again, as determined in operation 1306) are sorted according to the x-coordinate calculated in operation 1308.

In operation 1312, method 1300 involves ordering child OMR elements based at least in part on the sorted x and y coordinates.

Again, in preferred approaches, the foregoing operations may be performed recursively to all children of each parent OMR element, until a full ordering of OMR elements within the document is determined. This ordering is preferably reflected within the narrative, e.g., using syntax, as described in greater detail hereinbelow with reference to Narrative Generation.

Textual Translation-Insert/Replace Corresponding Text

Following optical mark detection, a textual element is assigned to each detected optical mark location. The textual element is either inserted (if no optical mark was recognized by OCR) or replaced (if optical mark was recognized by OCR, e.g., as the character "O"). This allows the inserted text to be grouped meaningfully with other nearby text in order to accurately convey the intended meaning of the graphical information.

The textual value indicates the selection status of the optical mark, e.g., "[selected]" or "[not selected]" may be used. Accordingly, in this step, the text is generated based on image content such that information is not lost. In other words, when a human reading the image encounters an optical mark, the human would read either "selected" or "not selected" after identifying the optical mark and the selection status. For example, a human might read "male selected", "female not selected" where "male" and "female" are textual elements on the page that are in proximity to optical marks.

According to preferred embodiments, grouping of the "optical mark text" (selected, not selected) with the literal text of the corresponding caption can happen in two possible ways:

First, if the associated caption text is unknown, then grouping is performed in due course (e.g., during phrase creation, block creation, etc.) based on the location of the inserted words on the page and the proximity of the inserted words to other text, e.g., other text elements on the same text line.

Second, if the associated caption text is known (e.g., from Visual Object Detection) this text may be grouped directly with the corresponding "optical mark text", e.g., based on explicit detection of the "group" label that was applied in object detection.

Text Segmentation

General Concepts

Introduction

According to select implementations, the inventive algorithm presented herein continues with segmentation of text elements represented in the document. Preferably, such segmentation involves building text blocks and text columns. As skilled artisans will appreciate upon a review of the following descriptions, text segmentation can be used to create page representations using different algorithms. For example, text blocks and text columns may be used by the Intelligent Narrator to create, wholly or in part, the narrative (i.e., the descriptive textual representation of the document or a portion thereof).

The following operations are described with reference to several illustrative parameters that are used to objectively determine whether select elements, particularly text elements, may or should be "grouped" into a higher-level structure such as a text segment, text block, and/or text column, each as defined hereinabove. In some approaches, all stated criteria are evaluated collectively (in any sequence or order), and elements, segments, blocks, columns, etc. satisfying all of the evaluated criteria are appropriately defined according to the class whose criteria are satisfied. In other approaches, criteria may be evaluated sequentially (though not necessarily in the order presented in the exemplary embodiments described below), and upon any condition failing to be satisfied, the evaluation may cease with a conclusion that the element, etc. under evaluation does not fit the definition of the class associated with said conditions. In still more approaches, criteria may be evaluated sequentially (again, not necessarily in the order presented in the exemplary embodiments described below), and even upon a given criterion not being satisfied, the evaluation may continue until a threshold number of criteria are not satisfied, or until the final criterion is evaluated and determined not to be satisfied, upon which the element, etc. under evaluation is determined to not fit the definition of the class associated with said conditions. In further embodiments, any combination of the above evaluation techniques may be utilized without departing from the scope of the presently described inventive concepts.

Moreover, according to various implementations, some evaluations may involve iterating over image(s) multiple times in order to maximize the defined structure of the document, i.e., to ensure all appropriate elements, segments, blocks, columns, etc. include or encompass the appropriate range, span, extent, etc. of the document as a whole (including possibly encompassing portions of multiple pages or multiple pages in their entirety, in select approaches) as would be subjectively understood by a human reader.

For instance, in accordance with one illustrative embodiment, segmenting text depicted within one or more document images may be performed in accordance with a method 1350 as shown in FIG. 13.5. The method 1350 may be implemented in any suitable manner, and may be employed in combination with any other processes and/or aspects thereof as described herein without limitation, unless otherwise expressly indicated. Moreover, method 1350 may be implemented in any suitable environment or form, such as a set of computer program instructions configured to cause a computer (or components thereof, such as a processor, etc.) to perform the steps of method 1350.

As shown in FIG. 13.5, method 1350 includes operation 1352, where a plurality of text elements within the one or more document images are identified.

In operation 1354 of method 1350, a plurality of text segments are built based at least in part on the plurality of text elements.

Moreover, operation 1356 of method 1350 involves building a plurality of text blocks based at least in part on the plurality of text segments.

Operation 1358 of method 1350 includes building one or more text columns based at least in part on the plurality of text blocks.

Additional details of text segmentation, according to various embodiments, are described in greater detail hereinbelow. It shall be understood that any permutation, combination, etc. of the following features, operations, embodiments, implementation, etc. may be used in the context of text segmentation generally, without departing from the scope of the presently described inventive concepts, unless expressly stated otherwise herein.

Input for Text Block Creation

The initial information for building text blocks and text columns includes: a) Text elements (which may be produced by an OCR process, but may also come from other sources, in various embodiments); b) Horizontal and vertical lines, which are preferably detected as part of preprocessing as described hereinabove; c) the output of OMR (described separately above), which may be represented as special set of text elements, and used to exclude such elements from "text segmentation" per se; d) the output of relationship (e.g., key-value) detection, which may be represented as a collection of related objects such as key-value objects, OMR objects, text element/graphical element relationships, or any other suitable type of relationship as described herein and as would be understood by those having ordinary skill in the art upon reading the present disclosure. Moreover, preferably each object includes location information (such as coordinates defining a rectangle including the object and associated text, such as key rectangle, key text, value rectangle, and value text). A relationship object may represent a pair such as a key-value pair represented on the page, for example a pair consisting of a key (caption, such as "Name") and a value corresponding to this key (such as "John") according to one embodiment. This pair could be depicted as e.g. "Name: John". Of course, relationships other than key-value pairs may be indicated and utilized without departing from the scope of the inventive concepts presented herein. In addition to inputs a)-d) above, preferably text block creation input includes e) the output of list detection, such as described herein above with reference to Layout Analysis. Preferably, this information is represented as a collection of rectangles, each of which bounds a list such as a numbered or bulleted list. In some approaches, list detection is performed before text block creation, although this is not necessarily the case in accordance with all embodiments of the presently described inventive concepts.

Parameters

As contemplated herein, the text blocks and text columns creation processes are controlled by at least one set of parameters, which are preferably selected from among the following. The optimal values of these parameters may be determined empirically, e.g., based on representative documents. According to select implementations, some parameters may have a floating-point value, while others may have a binary value (e.g., either true or false). In particular, parameters "Containing Percentage", "Vertical Element Threshold", "Vertical Distance Threshold", "Horizontal Intersection Threshold", "Vertical Distance Threshold for Columns", "Horizontal Intersection Threshold for Columns", and "Horizontal Distance Threshold" preferably have floating point values, while parameters "Join Overlapping Text Blocks", and "Join Nested and/or Overlapping Columns" have binary (or, ternary, in the case of the Join Nested and/or Overlapping Columns parameter) values, according to a preferred embodiment.

The following descriptions set forth, among other characteristics, certain geometric relationships between text and/or graphical elements, such as a first element "A" being above, below, to the left, or to the right of a second element "B". It shall be understood that these exemplary descriptions are provided with reference to a two-dimensional image representing a document. The image is characterized by an x, y-coordinate system where x=0, y=0 corresponds to the top left corner of the document image, and values of x increase in the rightward direction while values of y increase in the downward direction. Skilled artisans will appreciate that, according to different embodiments, different coordinate systems (e.g., where x=0, y=0 corresponds to an upper right corner of the document image, and values of x increase in the leftward direction while values of y increase in the downward direction, or where x=0, y=0 corresponds to the bottom left corner of the document image, and values of x increase in the rightward direction while values of y increase in the upward direction, where x=0, y=0 corresponds to the center of the image, etc.) may be utilized without departing from the scope of the inventive concepts presented herein. For example, the particular coordinate system used may be determined based on the natural reading order of the language represented in the document.

In the various alternative embodiments, the geometric relationships and expressions described to evaluate such relationships may be adjusted according to the coordinate system, and appropriate conclusions may be reached. Preferably, this is accomplished by changing the condition definitions. For example, the definition of condition "A is to the right of B" may be changed from "B's right coordinate is less than A's left coordinate" to "B's right coordinate is greater than A's left coordinate" for the situation when x=0, y=0 corresponds to the top right corner rather than the top left corner, etc. Similar adjustments may be made for other geometric relationships described herein.

Similarly, while various conditions are evaluated using pixels as the chosen measure of distance, according to various approaches other suitable distance measures that would be appreciated by those having ordinary skill in the art upon reading the instant disclosure may be utilized without departing from the scope of the inventive concepts described herein.

Containing Percentage

When two rectangles intersect, the first of them contains certain fraction of the area of the second. Specifically, if S1 is the area of intersection and S2 is the area of the second rectangle, then the fraction in question is the number S1/S2.

In several situations, it is important to evaluate whether this fraction exceeds certain threshold. In present embodiment, the same threshold is used in several such situations. The parameter Containing Percentage specifies this threshold.

For example, one such situation occurs in the context of building related blocks (described in greater detail herein-below with reference to "Creating Related Blocks"). Whether or not certain text element belongs to the "geometrical neighborhood" of a key-value pair is possibly determined by comparing the fraction of this text element's rectangle belonging to the joined key-value-rectangle to the value of the "Containing Percentage" parameter.

Another such situation occurs in the context of joining overlapping text blocks (described in greater detail herein-below with reference to "Removing Overlapping Text Blocks"). In one approach, blocks are joined if the fraction of a first of the blocks that is contained within a second of the blocks is greater than or equal to the value of the "Containing Percentage" parameter In a preferred implementation, particularly in the context of business documents, a suitable default value for this parameter is about 0.3.

Vertical Element Threshold

According to one embodiment, this parameter is used to identify vertical text elements, i.e., text elements characterized by a bounding rectangle height being distinctly larger than its width, as determined by evaluating the bounding rectangle dimensions against the predefined threshold. If the height:width ratio is greater than or equal to the product of the value of this parameter and a value in a range from about 2.0 to about 8.0 (depending on the text value of the text element), the text element is considered a vertical element. For example, in a preferred implementation, particularly in the context of business documents, a suitable default value for this parameter is about 1.75. Consequently, the height:width ratio is compared to a value from about 3.5 to about 14, depending on the text value of the text element.

Vertical Distance Threshold (VDT)

According to one embodiment, this parameter is used to join text segments into text blocks, as described in greater detail hereinbelow with reference to the section entitled "Join Text Segments into Text Blocks". In particular, when evaluating whether text segments "A" and "B" are "sufficiently close vertically" (condition 4 as described in Join Text Segments into Text Blocks), the following expression may be utilized:

$$A_{top} - B_{bottom} \leq VDT \times H_{avg} \quad \text{(Eqn. 1)}$$

where $A_{top}$ is the top coordinate of A, $B_{bottom}$ is the bottom coordinate of B, VDT is the value of the Vertical Distance Threshold parameter, and Have is the average height of a text element in the document. Equation 1 is preferably utilized in a context where A is at least weakly below B, i.e. $B_{top} \leq A_{top}$.

That is, evaluating whether text segments "A" and "B" are "sufficiently close vertically" preferably involves determining whether the vertical distance (in pixels) between the top of the lower segment (e.g., A) and the bottom of the upper segment (e.g., B) exceeds the product of the vertical distance threshold parameter's value and the average height (in pixels) of text elements in the document. If so, then preferably segments A and B remain distinct text blocks (i.e., are not joined). Otherwise, segments A and B may be joined into a single text block, particularly if satisfying all conditions described herein with regard to "Join Text Segments Into Text Blocks". While pixels are presented as an exemplary measure of distance, in other implementations different distance measures may be employed without departing from the scope of the inventive concepts described herein.

In one implementation, particularly in the context of business documents, a suitable default value for this parameter is about 0.6.

Horizontal Intersection Threshold (HIT)

According to one embodiment, this parameter is used to determine whether to join text segments into text blocks, as described in greater detail hereinbelow in the section entitled "Join Text Segments into Text Blocks". In particular, when evaluating condition 3 (i.e., whether A and B sufficiently intersect horizontally), the following expression may be employed:

$$Len([A_{left}, A_{right}] \cap [B_{left}, B_{right}]) \geq HIT \times W \quad \text{(Eqn. 2)}$$

where $A_{left}$ and $A_{right}$ are the leftmost and the rightmost coordinates of A, $B_{left}$ and $B_{right}$ are the leftmost and the rightmost coordinates of B, Len is the length of the intersection of two intervals, HIT is the value of the Horizontal Intersection Threshold parameter, and W is the width of the document.

In other words, "sufficient horizontal intersection" between adjacent text segments may be considered present where the length (in pixels) of the horizontal intersection between the two segments is greater than or equal to the product of Horizontal Intersection Threshold parameter's value and the width of the document (again, in pixels, but in various approaches other suitable measures may be used without departing from the scope of the inventive concepts presented herein).

In a preferred implementation, particularly in the context of business documents, a suitable default value for this parameter is about 0.007.

Vertical Distance Threshold for Columns (VDTC)

According to one embodiment, this parameter is used to determine whether to join text blocks into columns, as described in greater detail hereinbelow with reference the section entitled "Creating Text Columns". In particular, when evaluating condition 3 (i.e., whether A and B are "close enough" vertically), the following expression may be implemented:

$$A_{top} - B_{bottom} \leq VDTC \times H_{avg} \quad \text{(Eqn. 3)}$$

where $A_{top}$ is the top coordinate of A, $B_{bottom}$ is the bottom coordinate of B, VDTC is the value of the Vertical Distance Threshold for Columns parameter and Have is the average height of a text element in the document. It is assumed that A is below B.

That is, text blocks A and B may be considered vertically "close enough" upon determining that the distance (in pixels) between the top of the lower block (e.g., A) and the bottom of the upper block (e.g., B) does not exceed the product of the Vertical Distance Threshold for Columns parameter's value and the average height (in pixels) of text elements in the document. Again, while pixels are presented as an exemplary distance measure, according to various approaches other distance measures may be utilized without departing from the scope of the inventive concepts described herein.

In a preferred implementation, particularly in the context of business documents, a suitable default value for this parameter is 5.0.

Horizontal Intersection Threshold for Columns (HITC)

According to one embodiment, this parameter is used to determine whether to join text blocks into text columns, as described in greater detail hereinbelow regarding "Creating Text Columns". In particular, when evaluating whether text blocks A and B overlap horizontally, (condition 2), the following expression may be utilized:

$$Len([A_{left}, A_{right}] \cap [B_{left}, B_{right}]) \geq HITC \times \max(W_A, W_B) \quad \text{(Eqn. 4)}$$

where $A_{left}$ and $A_{right}$ are the leftmost and the rightmost x-coordinates of A, $B_{left}$ and $B_{right}$ are the leftmost and the rightmost coordinates of B, Len is the length of the intersection of two intervals, HITC is the value of the Horizontal Intersection Threshold for Columns parameter, and $W_A$ and $W_B$ are the widths of A and B, respectively.

That is, text blocks A and B may be considered to overlap horizontally if the length (in pixels) of an intersection of the horizontal spans of the two blocks is greater or equal to the product of the value of the Horizontal Intersection Threshold for Columns parameter and the width of the wider one of the two blocks (which is preferably measured in pixels, but may be expressed according to other suitable measurements in various embodiments).

In a preferred implementation, particularly in the context of business documents, a suitable default value for this parameter is 0.1.

Horizontal Distance Threshold (HDT)

According to one embodiment, this parameter is used to determine whether to create segments from individual text elements, such as described in greater detail hereinbelow with reference to "Build Text Segments". In particular, the following expression may be utilized to determine whether the two text elements A and B are sufficiently close horizontally:

$$B_{left} - A_{right} \le HDT \times CW_{avg} \qquad \text{(Eqn. 5)}$$

where $B_{left}$ is the leftmost coordinate of B, $A_{right}$ is the rightmost coordinate of A, HDT is the value of the Horizontal Distance Threshold parameter, and $CW_{avg}$ is the average character width in the document. It is assumed that B is weakly to the right of A, i.e. $A_{left} \le B_{left}$.

That is, text elements A and B may be considered sufficiently close horizontally if the difference between the leftmost coordinate of B and the rightmost coordinate of A is less than or equal to the product of the value of the Horizontal Distance Threshold parameter and the average character width of characters appearing in the document.

While select approaches may measure such distances in units of pixels, it shall be understood that other distance measures may be utilized without departing from the scope of the presently described inventive concepts. Moreover, in a preferred implementation, particularly in the context of business documents, a suitable default value for this parameter is 3.0.

Join Overlapping Text Blocks

According to one embodiment, this parameter controls whether the process "Joining Overlapping Text Blocks", as described hereinbelow with reference to creating text blocks, is performed. In particular, if this parameter is designated with a value of "true", then upon determining two text blocks overlap, such text blocks may be removed from the defined set of text blocks, and replaced with a newly defined single joined text block.

Preferably, particularly in the context of business documents, the default value for this parameter is "true".

Join Nested and/or Overlapping Columns

According to one embodiment, this parameter controls whether nested and/or overlapping columns are joined, as described in greater detail hereinbelow with reference to "Join Nested and/or Overlapping Columns".

Notably, according to various implementations, "nested" columns alone (i.e. columns completely encompassing other column(s)), "overlapping" columns (i.e., columns that partially overlap along both the x and y axes) alone, or both "nested" and "overlapping" columns may be joined, without departing from the scope of the presently described inventive concepts. Accordingly, this parameter is referred to hereinabove as having a "ternary" value, which preferably is selected from among "join nested columns", "join overlapping columns", and "join nested columns and overlapping columns".

According to one approach, which advantageously avoids loss of information during the pruning of nested columns, nested columns and/or overlapping columns may be obviated by joining such pairs with an edge in the graph, and finding connected components of the resulting graph, then building a joined column out of all columns in the connected component.

Nested columns may be identified, according to one approach, by determining whether a rectangle bounding a first column A fully encompasses a rectangle bounding a second column B, e.g., by determining that: (1) the leftmost x-coordinate of the rectangle bounding A is less than or equal to the leftmost x-coordinate of the rectangle bounding B; (2) the rightmost x-coordinate of the rectangle bounding A is greater than or equal to the rightmost x-coordinate of the rectangle bounding B; (3) the uppermost y-coordinate of the rectangle bounding A is less than or equal to the uppermost y-coordinate of the rectangle bounding B; and (4) the lowermost y-coordinate of the rectangle bounding A is greater than or equal to the lowermost y-coordinate of the rectangle bounding B. In other words, the left side of A is at the same level as, or to the left of, the left side of B; the right side of A is at the same level as, or to the right of, the right side of B; the top side of A is at the same level as, or above, the top side of B; and the bottom side of A is at the same level as, or below, the bottom side of B.

Overlapping columns may be identified, according to an exemplary implementation, by the intersection area and the threshold defined by the "Containing Percentage" parameter.

Preferably, particularly in the context of business documents, the default value for this parameter is "join nested columns".

The following descriptions set forth exemplary ways in which the foregoing parameters may be used to evaluate whether text elements satisfy various sets of conditions in order to determine whether or not such text elements are to be joined into higher level text structures for purposes of building a hierarchy of text elements, such as text blocks and text columns. It shall be understood that the inventive concepts presented herein therefore include implementing and performing methods, processes, algorithms, etc. in accordance with the logic, equations, and formal expressions detailed hereinbelow. The steps, operations, etc. of these methods, processes, algorithms, etc. may be performed in any order unless otherwise expressly stated herein, and may be combined in any suitable manner that would be appreciated by those having ordinary skill in the art upon reading the present disclosure.

Creating Text Blocks

Figure 14:
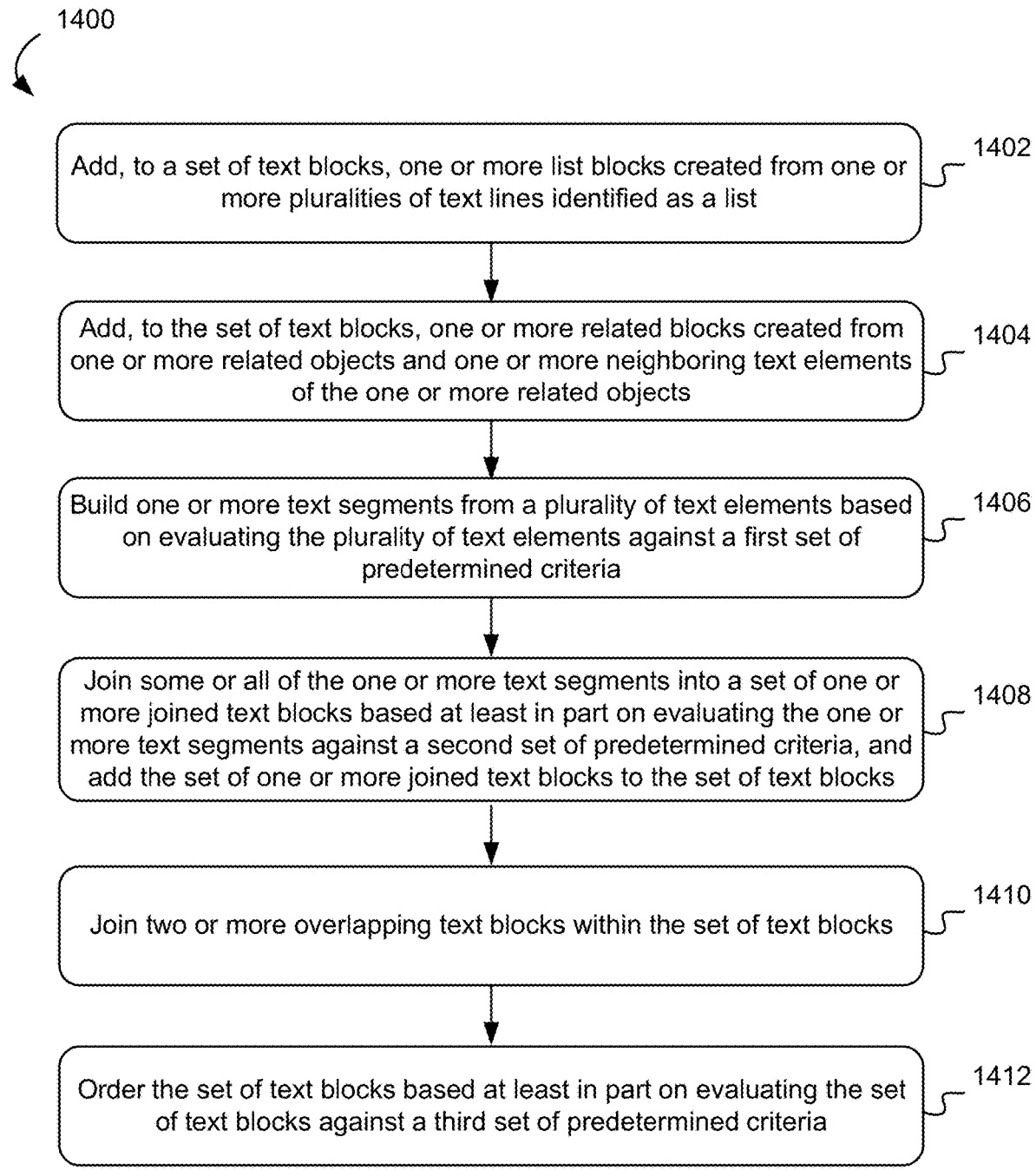
FIG. 14 depicts a simplified flowchart of a method for creating text blocks, according to one implementation.

In accordance with one illustrative implementation, a method 1400 for creating text blocks from text elements depicted on a page of a document, particularly a business document, is shown in FIG. 14. The method 1400 may be implemented in any suitable manner, and may be employed in combination with any other processes and/or aspects thereof as described herein without limitation, unless otherwise expressly indicated. Moreover, method 1400 may be implemented in any suitable environment or form, such as a set of computer program instructions configured to cause a computer (or components thereof, such as a processor, etc.) to perform the steps of method 1400.

According to preferred implementations, text blocks creation generally involves: (1) creating list blocks; (2) creating related blocks (e.g., key-value blocks); (3) building text segments; (4) joining text segments into text blocks; (5) joining overlapping text blocks; and (6) ordering of text blocks.

Accordingly, in one implementation a method 1400 for creating text blocks involves operation 1402, where list blocks are created, i.e., added to a set of text blocks.

Method 1404 also includes operation 1404, where related blocks are added to the set of text blocks. As understood herein, related blocks are created from the related objects and their neighboring text elements by performing certain operations on the related objects and the neighboring text elements as described in greater detail hereinbelow.

In operation 1406 of method 1400, text segments are built, e.g., from a plurality of text elements and based at least in part on evaluating the plurality of text elements against a first set of predetermined criteria, as described in greater detail hereinbelow.

Moreover, operation 1408 of method 1400 includes joining text segments into joined text blocks. Joining of text blocks is preferably based at least in part on evaluating the one or more text segments against a second set of predetermined criteria, and add the joined text blocks to the set of text blocks.

Overlapping text blocks within the set of text blocks are preferably joined in accordance with operation 1410 of method 1400.

Having created text segments, joining text segments into text blocks, and joining overlapping text blocks, in one implementation method 1400 involves ordering the set of text blocks in operation 1412. The ordering may be performed, at least in part, based on results of evaluating the text blocks against a third set of predetermined criteria, as described in greater detail hereinbelow.

Skilled artisans will appreciate that in select implementations, not all of the above operations need be performed in order to create text blocks. However, particularly in the context of transforming images of business documents into textual representations thereof, the inventors have determined experimentally that the preferred embodiment of creating text blocks per method 1400 involves all of the foregoing operations, which may include, utilize, implement, etc. any combination, permutation, etc. of the following details, conditions, formal logic, equations, etc. without departing from the scope of the presently described inventive concepts.

Create List Blocks

With reference to operation 1402 of method 1400, and according to one illustrative implementation, text block creation preferably involves creating blocks of textual elements, which may be based in whole or in part on the output of list detection, as described in greater detail hereinabove with respect to Layout Analysis-Zone Identification. For instance, for each numbered or bulleted list, a text block may be, and preferably is created. The bounding rectangle of the text block is defined as the list's rectangle, and this new block's value may be obtained by sorting the text elements overlapping this rectangle and joining their text value using certain formatting such as separators. The text blocks obtained at this step are referred to as "list blocks".

Create Related Blocks

With continuing reference to exemplary method 1400, in one approach operation 1404 involves creating blocks from related (e.g., key-value) objects described above. According to this approach, the blocks created at this step may be called related blocks.

The preferred starting point of a related block creation is a related object, such as a key-value object. To create a related block, the following operations and criteria may be performed and/or evaluated. While the instant description contemplates performing all operations and evaluating all criteria, optionally in a specific order, according to other implementations certain operations, evaluations, and/or criteria may be omitted. Correspondingly, in select implementations additional or alternative operations, evaluations, and/ or criteria may be utilized for creation of related blocks.

Again referring to preferred implementations, creating related blocks may involve joining the related elements of the block, such as the key and value rectangles of a key-value object. Regardless of the particular type of object and joining technique, the result of this operation is preferably a single rectangle defining a region of a page encompassing the related elements thereof.

Furthermore, creating related blocks may include identifying some or all text elements in the geometrical neighborhood of the joined rectangle. According to various approaches, a "geometrical neighborhood" includes a region of a given image within a threshold distance of the joined rectangle. For instance, a predefined number of pixels, text lines, average character widths, average character heights, average word spacings, average text line heights, etc. as would be understood by skilled artisans upon reading the present disclosure may define the geometrical neighborhood.

According to other implementations, the geometrical neighborhood may include all text elements immediately adjacent to the joined rectangle in one or more given directions (e.g., up, down, left, right). In the latter case, a threshold maximum "neighboring" distance may be utilized to avoid creating relationships between blocks that are not within a practically reasonable distance of one another, and this maximum "neighboring" distance may be defined according to any measure described immediately herein, or any other suitable equivalent thereof that would be appreciated by those having ordinary skill in the art upon reading the instant disclosure. For example, in one approach a text element is in the "geometrical neighborhood" if the fraction of its area belonging to the joined rectangle is greater or equal to the value of the Containing Percentage parameter.

With continuing reference to creation of related blocks, the algorithm preferably includes classifying related elements as belonging to a particular subset using special criteria and/or parameters as described herein. Advantageously, this approach preserves the correct text ordering in the final value of the text block (e.g., all "key text" comes before all "value text"). While the instant description refers to key-value relationships, skilled artisans will appreciate that other types of relationships (e.g. as represented by various different types of optical marks, or arrangements of text such as in tables) are included within the scope of the inventive concepts presented herein.

Creating related blocks also preferably includes ordering the subsets (most preferably separately) according to the natural reading order of the language the elements are represented in.

According to one implementation, the ordered values of the text elements in one or more of the subsets (e.g., the key subset, value subset, etc.) may be joined to obtain the effective text of the subset of joined blocks as a whole.

Further still, the effective text of various subsets may be joined and optionally but preferably formatted using separators and other formatting elements, such as syntax.

Yet further still, the location information (e.g., bounding rectangles) of the text elements in the appropriate subset(s) may be joined to obtain location information for the newly created text block's rectangle.

Using this process, it is possible to obtain the block rectangles and the related block values in a manner that preserves the structured information represented within the document, which may accordingly be reproduced in the narrative, e.g., using syntax, separators, etc. as would be understood by those having ordinary skill in the art upon reading the present disclosure.

Build Text Segments

Method 1400 may, and preferably does, also include building text segments in operation 1406. Building text segments is preferably performed as an initial step in identifying additional text blocks based on the geometry of words on the page. For instance, according to one approach, a text segment includes several text elements that form a part of a text line. Text segments may be built by organizing text elements, e.g., into a graph, according to illustrative implementations. Of course, other organizational structure may be utilized without departing from the scope of the presently described inventive concepts.

Proceeding according to the graph example, all text elements are considered as vertices, and text elements A and B are joined with an edge if the following conditions are satisfied: (1) B is weakly to the right of A (i.e., B's leftmost x-coordinate is greater or equal to A's leftmost x-coordinate); (2) B is at the same "level" as A (i.e., the common vertical span of A and B (the length of the intersection of the vertical span of A and vertical span of B) is greater or equal to half of B's height); (3) A and B are not separated by any vertical line(s) (i.e., there is no vertical line v with the following properties: A is to the left of v; B is to the right of v; the vertical span of v covers more than half of A's vertical span; the vertical span of v covers more than half of B's vertical span); and (4) the horizontal distance between the two text elements A and B is less than the product of the value of the Horizontal Distance Threshold parameter and the average character width of text elements appearing in the document. This evaluation may, and preferably is, performed and repeated iteratively until all appropriate pairs of text elements are joined.

After all such pairs A and B are joined, the connected components thereof (e.g., within the resulting graph) are identified, and utilized to define various text segments within the document. Text elements belonging to one connected component are preferably joined into a single text segment. At later steps, text segments may be joined and redefined as text blocks under appropriate circumstances, such as described below according to one illustrative implementation.

Join Text Segments into Text Blocks

Accordingly, in one approach text segmentation to create text blocks in accordance with method 1400 involves, per operation 1408, identifying one or more groups of text segments that will become the text blocks. Preferably, this is accomplished by organizing text segments into graphs. Similar to the procedure described above regarding building text segments from text elements, two given text segments A and B may be joined (e.g., with an edge, according to embodiments in which the document is represented by a graph) if certain conditions are satisfied.

According to a first condition, (condition 1) B should be weakly below A, which may be determined based on evaluating whether the uppermost y-coordinate of B is greater than or equal to the uppermost y-coordinate of A. If so, B is considered "weakly below" A, otherwise condition 1 does not hold.

The second condition (condition 2) requires that A and B are either left-aligned or center-aligned.

According to the third condition (condition 3) A and B should sufficiently intersect horizontally, which may be evaluated using Equation 2, above, thus using the Horizontal Intersection Threshold parameter.

In other words, condition 3 may be evaluated by determining whether the length (in pixels) of the intersection of the horizontal spans of the two segments is greater than or equal to the product of the Horizontal Intersection Threshold parameter's value and the width of the document (e.g., in pixels). According to one illustrative implementation, a suitable default value for the Horizontal Intersection Threshold parameter is about 0.007.

Condition 4 requires that A and B are sufficiently close vertically, which may be determined by evaluating an expression such as $$B_{top} - A_{bottom} \leq VDT \times H_{avg} \qquad (\text{Eqn. 6})$$

where $B_{top}$ is the top coordinate of B, $A_{bottom}$ is the bottom coordinate of A, VDT is the value of the Vertical Distance Threshold parameter, and Have is the average height of text elements in the document.

Put another way, evaluating condition 4 includes determining whether the distance (e.g., in pixels) between the top of the lower segment and the bottom of the upper segment exceeds the product of the Vertical Distance Threshold parameter's value and the average height (in pixels) of text elements identified in the document. As detailed above, and according to one exemplary implementation, a suitable default value for the Vertical Distance Threshold Parameter is about 0.6.

According to a fifth condition of text blocks (condition 5), A and B should not be separated by any horizontal lines or already discovered text blocks (such as related text blocks) present in the space therebetween (i.e. no horizontal line or text block intersecting this space exist in the document image), such as is the case for text segments appearing in vertically adjacent cells of a table having horizontal gridlines, vertically adjacent fields of a form where fields are bounded by a visible rectangle or by horizontal line separators, etc. as would be understood by those having ordinary skill in the art upon reading the present disclosure. In some embodiments, condition 5 may be evaluated according to a predefined tolerance value to help resolve borderline cases.

According to one approach, per condition 6, neither A nor B should qualify as a "small text segment", where small text segments are understood as text segments that: contain only two or fewer text elements, and each text element contains at most one non-punctuation character. Of course, "small text elements" may be defined differently according to different implementations without departing from the scope of the inventive concepts presented herein. The objective of this evaluation is to avoid using text segments that are too small to contain significant amounts of text data in order to create text blocks from text segments. The amount of text data that is considered "significant" may vary according to the document type, the intended use of the generated textual representation of the document, etc. as would be understood by those having ordinary skill in the art upon reading the present disclosure.

Finally, according to the present embodiment, condition 7 requires that A and B have comparable heights, which may be considered true when the value of the y-coordinate extent of A is at most twice the value of the y-coordinate extent of B, and vice versa. Of course, "comparable height" may be defined differently according to different implementations without departing from the scope of the inventive concepts presented herein. The difference in height that is considered "comparable" may vary according to the document type, the intended use of the generated textual representation of the document, etc. as would be understood by those having ordinary skill in the art upon reading the present disclosure.

After all such pairs A and B are joined, connected components are identified within the resulting combination (which may be represented, e.g., by a graph). According to preferred implementations, these connected components define the text blocks. The corresponding bounding rectangles are preferably joined to obtain the overall text block's rectangle. Even more preferably, the bounding rectangles may be labeled using certain formatting such as predefined separators or other syntax to clearly delineate the corresponding value (e.g., text). For example, in one approach, the text block's text value is obtained by joining the text values of the corresponding text segments, e.g., using syntax, or any other suitable approach as would be appreciated by those having ordinary skill in the art upon reading the instant descriptions.

However, optionally and according to some approaches, if the resulting text block would be multi-line, i.e. its text value, if broken into text lines, occupies more than one line of text, and if the resulting block would consist mostly of data text elements and segments (see details below), then this text block is not created. Instead, each text element that would belong to such aa text block becomes a separate text block.

Distinguishing "data" text elements, text lines, text blocks, etc. from generic "text" elements, text lines, text blocks, text columns, etc. is described in greater detail hereinbelow, but generally involves identifying text elements, text segments, text blocks, etc. that contain mostly numerical data as opposed to (generally alphabetic, or prose) text, e.g., numbers, dates, phone numbers, various types of identifiers (customer number, social security number, tax ID, etc.), financial information, etc. as would be understood by those having ordinary skill in the art upon reading the present disclosure.

Joining Overlapping Text Blocks

In combination with text block and text segment creation, to avoid over generating either type of related structure, text blocks substantially overlapping other text blocks are joined into one in operation 1410 of method 1400. According to one approach, which advantageously avoids loss of information during the pruning of overlapping text blocks, overlaps may be obviated by joining such pairs with an edge and finding connected components (e.g., of a graph), then creating a joined text block from each connected component. In preferred approaches, this joining operation is performed if the Join Overlapping Text Blocks parameter has a value of "TRUE". The new text block's rectangle can be obtained as the union of the rectangles of the text blocks in the connected component, while the new text block's text value is obtained by joining and sorting the text values of the same text blocks.

In order to determine whether two blocks overlap substantially, according to one implementation the Containing Percentage parameter may be used, e.g., as described above.

Ordering of Text Blocks

At step 1412 of method 1400, the text blocks are preferably ordered. To do so, the presently disclosed inventive concepts introduce a new definition of "natural less" relations between two given rectangles A and B. Expressed in Boolean terms, a natural less relationship exists between rectangles A and B under the following circumstances.

If $(A_{top} \geq B_{bottom})$: FALSE (7A)

If $(A_{top} < B_{bottom})$ AND $(B_{top} \geq A_{bottom})$: TRUE (7B)

If $(A_{top} < B_{bottom})$ AND $(B_{top} < A_{bottom})$ AND $(A_{right} \leq B_{left})$: TRUE (7C)

If $(A_{top} < B_{bottom})$ AND $(B_{top} < A_{bottom})$ AND $(A_{right} > B_{left})$ AND $(B_{right} \leq A_{left})$: FALSE (7D)

If $(A_{top} < B_{bottom})$ AND $(B_{top} < A_{bottom})$ AND $(A_{right} > B_{left})$ AND $(B_{right} > A_{left})$ AND $(A_{left} < B_{left})$: TRUE (7E)

If $(A_{top} < B_{bottom})$ AND $(B_{top} < A_{bottom})$ AND $(A_{right} > B_{left})$ AND $(B_{right} > A_{left})$ AND $(A_{left} \geq B_{left})$: FALSE (7F)

where $A_{top}$, $A_{bottom}$, $A_{left}$, $A_{right}$ are respectively the top, bottom, leftmost and rightmost coordinates of A; $B_{top}$, $B_{bottom}$, $B_{left}$, $B_{right}$ are respectively the top, bottom, leftmost and rightmost coordinates of B; FALSE means that the relationship does not exist; and TRUE means the relationship exists. Notably, the conditions above cover all possible cases, regardless of the values of the coordinates.

In more plain expression, and assuming a natural reading order of top-to-bottom and left-to-right (per most Western written languages) a natural less relationship is defined by the following set of positive and negative criteria: 1) If the y-coordinate value of the upper side of the first rectangle is greater than or equal to the y-coordinate value of the bottom side of the second rectangle, i.e., the top of the first rectangle is below the bottom of the second rectangle, then the "natural less" relationship does not hold; 2) If the criterium 1 is not satisfied, but the y-coordinate value of the upper side of the second rectangle is greater than or equal to the y-coordinate value of the bottom side of the first rectangle, i.e., the top of the second rectangle is below the bottom of the first rectangle, then the "natural less" relationship holds; 3) If the criteria 1 and 2 are not satisfied, but the x-coordinate value of the right side of the first rectangle is less than or equal to the x-coordinate value of the left side of the second rectangle, i.e., the right side of the first rectangle is to the left of the left side of the second rectangle, then the "natural less" relationship holds; 4) If the criteria 1, 2 and 3 are not satisfied, but the x-coordinate value of the right side of the second rectangle is less than or equal to the x-coordinate value of the left side of the first rectangle, i.e., the right side of the second rectangle is to the left of the left side of the first rectangle, then the "natural less" relationship does not hold; 5) If the criteria 1, 2, 3 and 4 are not satisfied, but the x-coordinate value of the left side of the first rectangle is less than the x-coordinate value of the left side of the second rectangle, i.e., the left side of the first rectangle is strictly to the left of the left side of the second rectangle, then the "natural less" relationship holds; 6) If the conditions 1, 2, 3, 4, 5 are not satisfied, then the "natural less" relationship does not hold.

Notably, this ordering takes into account both vertical and horizontal position.

Those having ordinary skill in the art will appreciate that the exemplary coordinate systems and/or geometric relationships defined above correspond to a typical Western language natural reading order, and the criteria defined thereby may be modified to accommodate for different natural reading orders, without departing from the scope of the presently described inventive concepts. Similarly, the order and/or manner of evaluating the foregoing criteria may be modified as described hereinabove, or in any other suitable manner that would be appreciated by those having ordinary skill in the art upon reading the present disclosure. For example, criteria may be evaluated simultaneously, sequentially, or according to any defined order, and a given text element, segment, block, etc. may be determined to satisfy, or not satisfy, the definition of the class being evaluated in any suitable manner described herein, or according to any combination and/or equivalent(s) thereof that would be appreciated by skilled artisans upon reading the present descriptions.

Creating Text Columns

Figure 15:
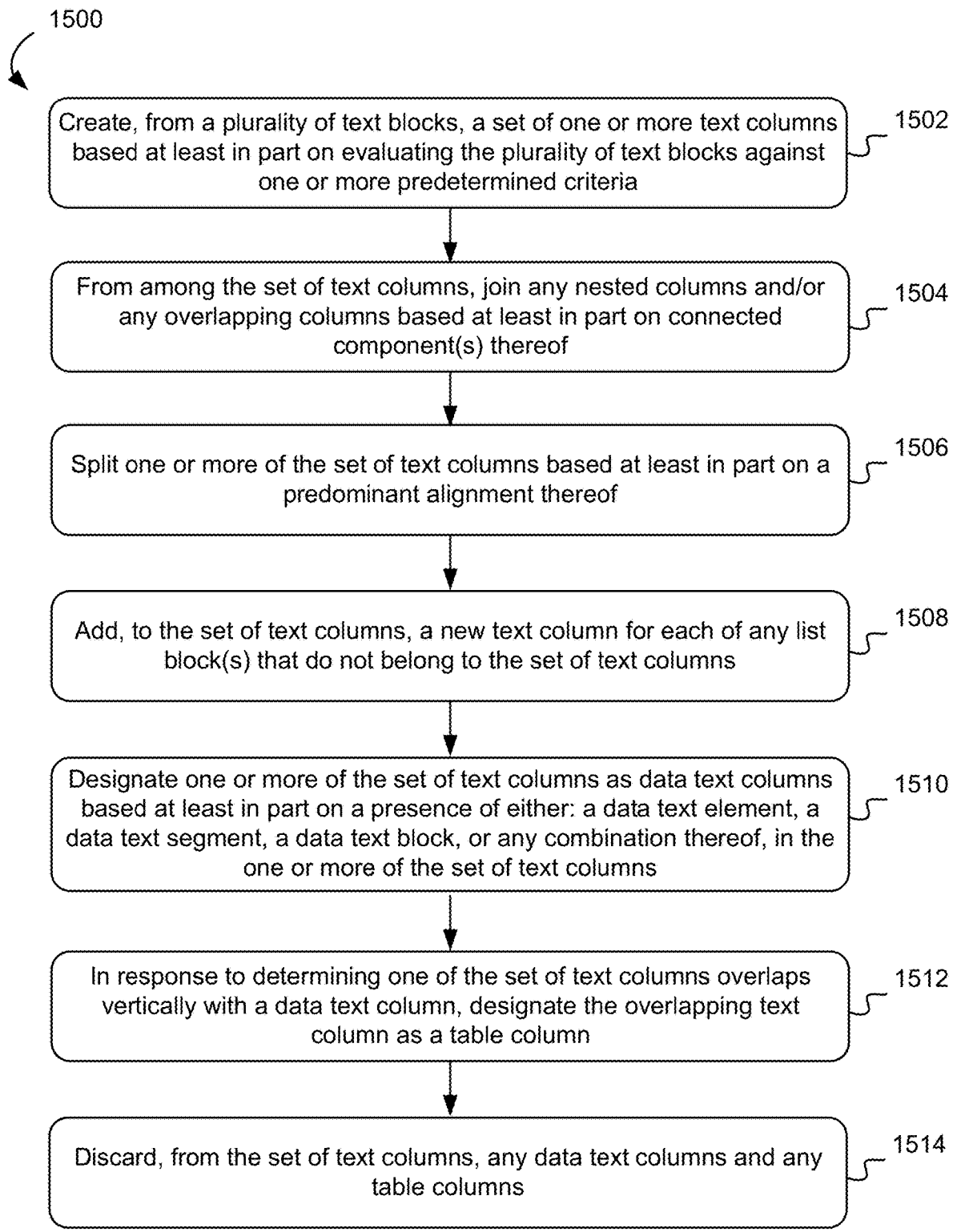
FIG. 15 depicts a simplified flowchart of a method for creating text columns, according to one implementation.

In accordance with one illustrative implementation, a method 1500 for creating text columns from text blocks depicted on a page of a document, particularly a business document, is shown in FIG. 15. The method 1500 may be implemented in any suitable manner, and may be employed in combination with any other processes and/or aspects thereof as described herein without limitation, unless otherwise expressly indicated. Moreover, method 1500 may be implemented in any suitable environment or form, such as a set of computer program instructions configured to cause a computer (or components thereof, such as a processor, etc.) to perform the steps of method 1500.

In like manner as described above regarding text block creation with reference to FIG. 14 and method 1400, in preferred approaches text segmentation in accordance with the presently described inventive concepts includes creating text columns, e.g. via a method 1500 such as shown in FIG. 15. At a high level, method 1500 involves operations 1502-1514, described in greater detail hereinbelow, and summarized presently.

In operation 1502, method 1500 involves creating text columns.

Operation 1504 of method 1500 includes joining nested and/or overlapping columns.

Moreover, columns satisfying certain criteria set forth in greater detail below are split in accordance with operation 1506 of method 1500.

With continuing reference to method 1500, in operation 1508, unused list blocks are added to the group of created text columns (as columns).

In operations 1510 and 1512, respectively, data columns and table columns are identified within the set of candidate text columns, and either or both are removed in operation 1514 of method 1500.

Skilled artisans will appreciate that in select implementations, not all of the above operations need be performed in order to create text columns. However, particularly in the context of transforming images of business documents into textual representations thereof, the inventors have determined experimentally that the preferred embodiment of creating text columns per method 1500 involves all of the foregoing operations, which may include, utilize, implement, etc. any combination, permutation, etc. of the following details, conditions, formal logic, equations, etc. without departing from the scope of the presently described inventive concepts.

Create Text Columns

Having defined text blocks, the algorithm may proceed with organizing text blocks into text columns, e.g., per method 1500. According to one implementation, creating text columns involves organizing the text blocks into a directed graph.

For instance, according to an illustrative embodiment, two text blocks A and B may be joined (e.g., connected in a graph via an edge directed from A to B) in accordance with operation 1502 of method 1500 if certain conditions are satisfied, such as described below with regard to one exemplary embodiment.

Evaluating condition 1 includes determining whether block B is below block A, i.e., whether B's uppermost y-coordinate value is greater than or equal to A's lowermost y-coordinate value.

Evaluating condition 2 involves determining whether A and B overlap horizontally, i.e., determine whether the length (in pixels) of the intersection of the horizontal spans of blocks A and B is greater than or equal to the product of the Horizontal Intersection Threshold for Columns parameter's value and the larger of the two block widths (in pixels), such as using Equation 4 above.

According to one preferred utilization, especially for evaluating business documents, a suitable default value for the Horizontal Intersection Threshold for Columns is about 0.1.

In addition, the evaluation of condition 3 involves determining whether A and B are close enough vertically. This may be performed according to an expression such as $$B_{top} - A_{bottom} \leq VDTC \times H_{avg} \qquad \text{(Eqn. 7)}$$

where $B_{top}$ is the top coordinate of B, $A_{bottom}$ is the bottom coordinate of A, VDTC is the value of the Vertical Distance Threshold parameter and Have is the average height of text elements in the document.

According to one approach, this evaluation includes determining whether the distance (in pixels) between the uppermost y-coordinate of the lower block and the lowermost y-coordinate of the upper block does not exceed the product of the Vertical Distance Threshold for Columns parameter's value and the average height (in pixels) of text elements in the document. According to one implementation, empirically determined to be particularly suitable for evaluating business documents, a suitable default value for the Vertical Distance Threshold for Columns parameter is about 5.0.

In addition, creating text columns includes evaluating condition 4 by determining whether A and B are (horizontally) separated by any horizontal lines or text blocks present in the space therebetween (i.e. no horizontal line or text block intersecting this space exist in the document image), such as is the case for text segments appearing in vertically adjacent cells of a table having horizontal gridlines, vertically adjacent fields of a form where fields are bounded by a visible rectangle or by horizontal line separators, etc. as would be understood by those having ordinary skill in the art upon reading the present disclosure. In some embodiments, condition 4 may be evaluated according to a predefined tolerance value to help resolve borderline cases.

After all appropriate pairs A and B of text blocks are joined (e.g., by a directed edge in the case of using a graph as an organizational structure) according to the foregoing criteria, select pairs (edges) are preferably removed. For instance, pairs/edges initiating at a node/block where more than one pair/edge initiates are preferably removed. Following this initial phase of the removal process, pairs/edges terminating at nodes/blocks at which more than one pair/edge terminates are also removed (preferably after all multi-initiating edges have been removed).

With such unnecessary pairs/edges removed from the graph/set, it is advantageous to define connected components within the resulting, cleaned up graph/set. In certain implementations, these connected components define text columns within the page image. Connected components of size greater than one always become a column. Connected components of size equal to one become a column if the only block it contains is a list block. Here, "size" refers to the number of text blocks within the connected component. A connected component of size equal to one is a single text block. Text blocks containing vertical lists are very similar to columns, and therefore are preferably designated as text columns.

By joining the rectangles of the text blocks in the appropriate connected component, the inventive algorithm presented herein advantageously obtains the text column's bounding rectangle.

Join Nested and/or Overlapping Columns

Operation 1504 may involve joining text columns that are either partially or wholly contained within other text columns, depending on the value of the parameter Join Nested and/or Overlapping Columns. The step is skipped if this parameter prescribes not to join columns.

According to one embodiment, joining may be performed efficiently, and without suffering information loss, by joining pairs of nested or overlapped columns with edges, finding connected components of the resulting graph, then creating a new column from each connected component by joining the bounding rectangles of the columns belonging to this component.

Splitting Columns

Per operation 1506 of method 1500, and according to one preferred implementation, if a column contains more than one text block, it may be appropriate to split that column into aligned columns. To do so, the inventive concepts presented herein include identifying the predominant alignment type (left alignment, right alignment, center alignment, etc. as defined hereinabove) within the column. To find the predominant alignment, all pairs of neighboring text lines within the column are considered. For each such pair, it is determined whether it is left-aligned, right-aligned, center-aligned or not aligned at all. Then the total number L of all left-aligned pairs is computed, along with the total number R of all right-aligned pairs and the total number C of center-aligned pairs. Then the maximum M of numbers L, R and C is calculated. If M=L, the predominant alignment if left-alignment. Otherwise, if M=R, then the predominant alignment is right-alignment. Otherwise, if M=C, then the predominant alignment is center-alignment. However, if L=R=C=0, then there is no alignment in the column, and the column is preferably discarded.

After the predominant alignment is determined, it is prudent to find maximal subcolumns (series of neighboring blocks) that are aligned in this predominant way. If the whole column is aligned, then no changes are needed to accurately reflect the column characteristics as visually represented in the document. On the other hand, if the column contains one or more aligned subcolumns, then the subcolumn or subcolumns with the maximal length are redefined as individual columns, and the remaining extent of the previous "column" definition is excluded.

Adding Unused List Blocks as Columns

It is possible that at this step some list blocks do not belong to any column. For simplicity, in one approach the presently described inventive concepts address this outcome by defining a new column for each such list block in operation 1508 of method 1500.

Identifying Data Columns

A data column is a column that contains mostly numerical data as opposed to (generally alphabetic, or prose) text, e.g., numbers, dates, phone numbers, various types of identifiers, financial information, etc. as would be understood by those having ordinary skill in the art upon reading the present disclosure. "Data", according to various implementations of the presently described inventive concepts, may be defined and distinguished from other textual elements according to criteria appropriate for the particular application (e.g., document type) to which the inventive concepts described herein are to be applied. For instance, data may be distinguished from other text elements based on the proportion of the text element that is numerical. Alternatively, data may be distinguished from other types of text elements based on being expressed in a certain format (e.g., a numerical date, a number having a decimal separating the final two characters from the remainder of the text element, a number fitting a particular mask or pattern, etc. as would be appreciated by those having ordinary skill in the art upon reading the present disclosure), etc. Further still, data may be distinguished from other types of text elements based on the text element including or being associated with a particular symbol or (sub) string corresponding to a particular unit, such as "$". "£", "¥", "° C.", "° F.", "meters", "cm", etc. as would be understood by those having ordinary skill in the art upon reading the present disclosure. Of course, the following indicia that a particular text element includes "data" as opposed to other types of text elements are provided merely by way of example, and any suitable equivalent or alternative thereof may be employed without departing from the scope of the instant descriptions.

According to select embodiments, data columns may be identified in operation 1510 based at least in part on presence of data text elements, data text segments, and/or data text blocks.

To identify the "data" elements, segments, blocks, columns, etc., a text-processing algorithm is implemented to assign a label to every data text element or group of data text elements (e.g., "_DATE_", "_AMOUNT_", "_SSN_", etc., as would be understood by a person having ordinary skill in the art upon reading the present disclosure).

Then the data blocks are identified as the blocks where certain percentage (e.g., at least 25%, at least 33%, at least 50%, at least 66%, at least 75%, at least 80%, at least 90%, at least 95%, at least 99%, etc.) of text elements are data text elements, according to one embodiment. However, in accordance with preferred approaches, list blocks and related blocks are not classified as data blocks.

Once data blocks are identified, columns where at least a certain percentage (e.g., at least 25%, at least 33%, at least 50%, at least 66%, at least 75%, at least 80%, at least 90%, at least 95%, at least 99%, etc.) of all blocks are data blocks, are designated as data columns, according to another embodiment.

Identifying Table Columns

A table column is a text column that is a column of a table contained in the document or a part of such column. According to operation 1512 of method 1500, it is preferable to identify a text column as a table column if it overlaps vertically with a data text column. The intersection of their vertical spans must be sufficiently large, for example in current embodiment it must be at least 50%.

In this situation, the data text column is also considered to be part of a table.

Discarding Data Text Columns and Table Columns

In select implementations, data text columns and table columns are not necessarily defined or otherwise included in the final collection of columns returned by the text block creation module/component. This approach advantageously and accurately conveys the meaning of a table, since in most implementations one should not read the table columns separately (e.g. all of column 1, then all of column 2, etc.). For instance, adjacent columns may provide additional context or meaning that is important to understanding the context of any given column in the table (such as appropriate units, related data (such as assets/liabilities), related content (such as pricing for various services or products described in an adjacent column), etc. as would be understood by those having ordinary skill in the art upon reading the present disclosure.

Accordingly, in preferred implementations operation 1514 of method 1500 includes discarding such data text columns and/or table columns.

Image Segmentation

Text segmentation may be, and preferably is, accompanied by image segmentation, which uses the image to identify certain segments (e.g., "groups" of related text that are defined by rectangular boundaries) and subsequently to order such segments. It shall be understood that 'segments", in various embodiments, may contain text elements, graphical elements, other segments, and/or plain content, (i.e., structured information and/or unstructured information), thereby constituting a hierarchy. Preferably, information within a given segment is ordered, such that the hierarchy may be represented by an ordered tree, where each node has a location (again, preferably defined by a page index, a location rectangle), and optionally a value.

In particularly preferred approaches, image segmentation involves hierarchy detection, which may include any combination of preprocessing operations and/or functionalities described hereinabove, in isolation or in combination with a graph-building approach focused on building a tree or other similar data structure including classes of information such as cells, rows, columns, nested (rows, columns), teeth, test, and/or grids.

The fundamental information about the page's structure may be derived from graphical lines, e.g., as represented as a quad-edge orthogonal graph. The core constructive operation for hierarchy detection is a covering search algorithm, described in greater detail hereinbelow, that is based on the concept of the covering of a subgraph. The covering search algorithm enables the process of hierarchy detection to have a recursive nature implying the logic of hierarchical organization. Henceforth in this section all references to "line" are understood to mean vertical and/or horizontal graphical lines that have been detected in the image.

For instance, in accordance with one illustrative embodiment, segmenting text depicted within one or more document images may be performed in accordance with a method 1550 as shown in FIG. 15.5. The method 1550 may be implemented in any suitable manner, and may be employed in combination with any other processes and/or aspects thereof as described herein without limitation, unless otherwise expressly indicated. Moreover, method 1550 may be implemented in any suitable environment or form, such as a set of computer program instructions configured to cause a computer (or components thereof, such as a processor, etc.) to perform the steps of method 1550.

As shown in FIG. 15.5, method 1550 includes operation 1552, where a plurality of graphical lines within the one or more document images are aligned.

In operation 1554 of method 1550, a graph representing the aligned graphical lines is built.

Moreover, operation 1556 of method 1550 involves initializing a hierarchy representing one or more regions of the one or more document images, where the one or more regions are defined by the aligned graphical lines.

Operation 1558 of method 1550 includes detecting additional elements and/or structures of the initialized hierarchy.

According to operation 1560, uniform grids within the hierarchy are detected.

In operation 1562, the hierarchy is aggregated and reconciled.

Additional details of image segmentation, according to various embodiments, are described in greater detail hereinbelow. It shall be understood that any permutation, combination, etc. of the following features, operations, embodiments, implementation, etc. may be used in the context of image segmentation generally, without departing from the scope of the presently described inventive concepts, unless expressly stated otherwise herein.

The presently disclosed inventive concepts include detecting graphical lines within images, but in at least some embodiments the detection may fail or be imperfect. In cases of such failure or imperfections, the algorithm may erroneously create graphical lines that are not ideal or even appropriate for subsequent processing. For example, to the human eye a vertical and horizontal line may appear to intersect on the image and create a perfect corner (e.g., where the endpoints of each line are the same pixel), but it may be the case that a small number of pixels in fact separate the detected lines such that they do not actually intersect as represented in the physical document (and/or image thereof). Similarly, the lines may appear to extend slightly longer in the image, such that the endpoints of each line are not the same pixels.

Aligning graphical lines may resolve such imperfections and create "idealized" graphical lines, i.e., what was intended to be drawn (e.g. the meaning of two lines that would form a corner if they were not separated by one pixel is that the lines form a corner) and these idealized (aligned) lines may then be used for subsequent processing in interpreting or creating a hierarchy representing the document structure. In other words, the inventive concepts presented herein deal with imperfections up front such that imperfect alignment of lines do not need to be considered by the hierarchy detection functionality described herein.

Line Alignment

Figure 16:
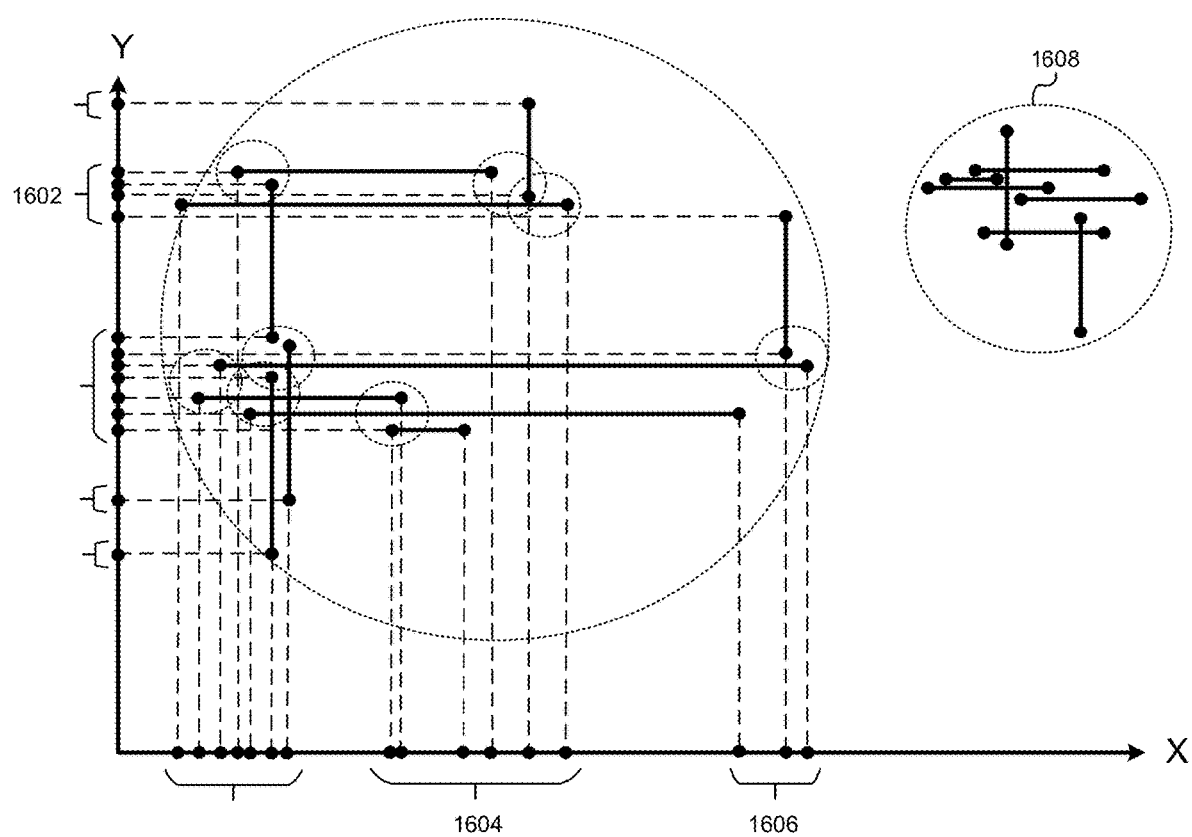
FIG. 16 depicts a simplified schematic of a plurality of lines before and after alignment, according to one implementation.

In preferable implementations line alignment may involve one or more approaches, such as graph-based approaches. For instance, one exemplary line adjustment may imply iterative addition of vertices in a graph, by changing positions according to the tolerance and setting appropriate connections. During this process, it may appear that two already built sequences of connected vertices should be merged (FIG. 16). This situation may require alignment of vertices with potential deletion and replacement of all invalid references with the new references. In such cases, alignment involves iterative monitoring of neighbor vertices, such as neighbor to neighbor monitoring, which may preferably be restricted by a predetermined tolerance value.

In more approaches, a connected components model may be adopted, e.g., for simplicity, and may proceed as described below. The inventive algorithm, according to select implementations, may additionally or alternatively be utilized in the performance of image segmentation and/or text segmentation.

For example, according to one illustrative embodiment, connected components of lines are identified using any suitable technique. For instance, two given lines may be considered as connected if they intersect within a given measure of tolerance, as shown in FIG. 16. In one exemplary implementation, the lines could explicitly intersect or overlap, while in other approaches the lines may approximately intersect or overlap. Intersection or overlap, as discussed presently, may be evaluated using the concept of alignment as defined hereinabove, in select approaches.

In one approach, some or all lines may be divided into connected components before alignment so that every line from one component is far enough from every line in another component according to tolerance, such as exemplified by connected component 1608 as shown in FIG. 16. The case of connection implies that lines are explicitly geometrically intersected, or the vertical or horizontal gap between lines is less than the tolerance value in pixel units. In preferred approaches, the tolerance has a predefined value of about two thirds of the average width of characters appearing on the page, which may be derived from OCR data. Of course, in other embodiments, e.g., depending on the language depicting on the document, other tolerance values may be utilized, such as a tolerance value in a range from about one quarter of the average width of characters appearing on the page to about twice the average width of characters appearing on the page, or any value therebetween, including but not limited to about one third, about one half, about two thirds, about three quarters, about one, about one and a quarter, about one and a third, about one and a half, about one and two thirds, about one and three quarters, about two times, etc. of the average width of characters appearing on the page.

In such cases, an exemplary line alignment algorithm may include: (1) identifying any and all one-dimensional (1D) clusters of lines within the connected components; (2) identifying one or more connected sub-components of lines within lines that form the respective ID cluster(s) (Note: any two given lines within the 1D cluster are preferably considered as "connected" if the lines could be reached only by lines that form a cluster. FIG. 16, depicting, among others, clusters 1602, 1604 and 1606 shows several 1D clusters that each independently have several connected sub-components); and (3) for each sub-component, computing an average value within 1D clusters and updating corresponding line coordinate(s).

1D clusters are identified based on consideration of two sequential points without taking into account distances between arbitrary points. This may lead to grouping of points that are much farther from each other than the predefined tolerance. Accordingly, in alternative or additional embodiments, it is possible to perform the following steps, again making use of the tolerance value (indicated in FIG. 16 by dotted circles surrounding groups of points): (1) sorting of lines; (2) joining of overlapping lines (both vertical and/or horizontal); and (3) removal of very short lines and lines that cross the entire page (again, vertical and/or horizontal).

In further approaches, 1D clusters could be formed by lines from different connected sub-components within another cluster. This may result in the adjustment of a set of points where not even a single pair is closer than the tolerance, but this outcome has not been observed empirically as a common occurrence in the context of document processing, particularly business document processing.

In still further approaches, after adjustment of coordinates within a connected sub-component of lines, the image could be changed, and non-connected components could become connected. This may lead to new non-tolerant intersections, but again this outcome has not been observed empirically as a common occurrence in the context of document processing, particularly business document processing.

According to some embodiments, lines may be adjusted but not joined, in which case it is advantageous to employ additional processing, e.g., by joining overlapping lines. Moreover, small lines could turn into points, in which case it is advantageous to filter lines by length and remove lines of zero length (or some predefined threshold length, such as 1 pixel, 1-3 pixels, 1-5 pixels, etc.) from the image.

Building Graphs

According to select implementations, the hierarchy of a page is detected based on a graphical analysis that is conducted within a structure that is initially defined by the rectangle of the entire page. The fundamental information about the page's structure is derived from graphical lines represented as a quad-edge orthogonal graph. This graph contains information about vertices, edges, and faces (and, optionally, other constructs as defined hereinabove with reference to Definitions: Hierarchy Initialization, Detection, Aggregation, and Reconciliation). Moreover, by definition any face in a quad-edge orthogonal graph has a rectangular covering.

In some approaches, it is advantageous to create a graph of the lines, preferably using the principles, definitions, and concepts set forth hereinabove. Of course, other, particularly graph-based approaches to determining and representing hierarchies may be implemented without departing from the scope of the presently described inventive concepts.

According to one aspect, building graphs involves creating an orthogonal, quad-edge graph, which is a Plane Graph with edges formed by horizontal and vertical line segments and represented by a Quad-Edge data structure G=(V, E) where V is a set of vertices, and E is a set of quad-edges. The illustrative graph includes features such as vertices (which include connections, i.e., lines, between adjacent vertices), quad edges, and faces.

Figure 17:
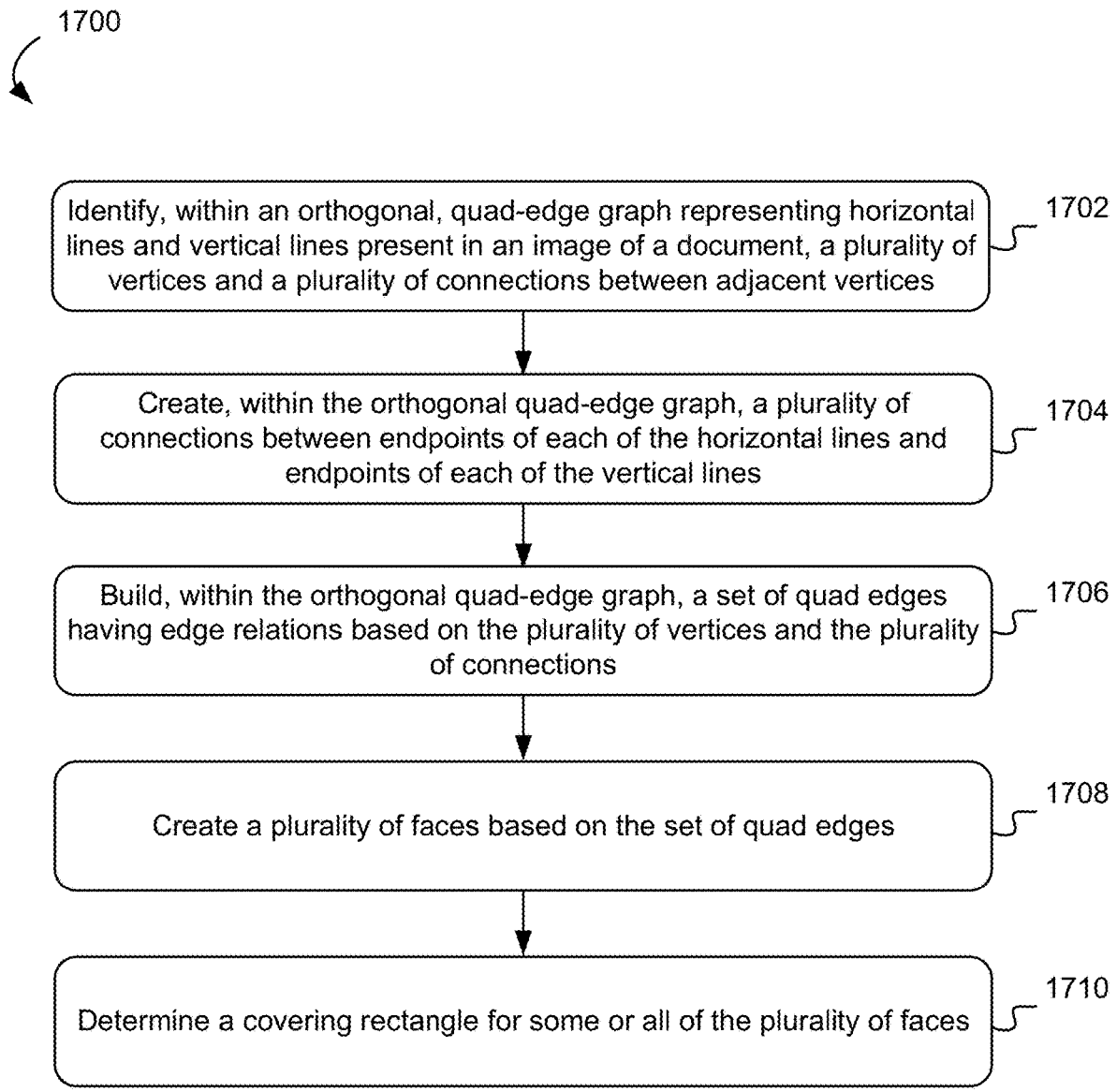
FIG. 17 depicts a simplified flowchart of a method for building graphs, according to one implementation

In accordance with one illustrative implementation, a method 1700 for building graphs from horizontal and vertical graphical lines depicted on a page of a document, particularly a business document, is shown in FIG. 17. The method 1700 may be implemented in any suitable manner, and may be employed in combination with any other processes and/or aspects thereof as described herein without limitation, unless otherwise expressly indicated. Moreover, method 1700 may be implemented in any suitable environment or form, such as a set of computer program instructions configured to cause a computer (or components thereof, such as a processor, etc.) to perform the steps of method 1700.

As shown in FIG. 17, method 1700 involves identifying vertices and connections between adjacent vertices in operation 1702, where "adjacency" refers to the closest vertex to a given vertex in either a downward, rightward, upward, or leftward direction. In some approaches, adjacent vertices may be identified in the foregoing (i.e., counterclockwise) order. Moreover, since orthogonal quad-edge graphs are directed graphs, the connections have a direction, which preferably indicates the direction from the "origin" vertex to the "destination" adjacent vertex, as depicted graphically in FIGS. 4 and 5. In various approaches, connections between vertices may be represented visually within the image by complete, or partial graphical lines.

In some approaches, operation 1704 may include creating a plurality of connections between endpoints of the graphical lines. For instance, horizontal connections may be created between left and right end points of all horizontal lines. This may involve creation of vertices with corresponding coordinates and setting connected references to the corresponding left or right neighbor vertices. Similarly, vertical connections may be created between top and bottom end points of all vertical lines, which may involve creation of vertices with corresponding coordinates (or search for already created vertices with equivalent coordinates) and setting connected references to the corresponding top or bottom neighbor vertices. With such vertical and horizontal connections defined, it is optional but advantageous in select implementations to identify all crossing points among horizontal and vertical lines. If horizontal and vertical lines are intersected, in some approaches operation 1704 may include creating a crossing point (or searching for a previously created vertex with equivalent coordinates) and setting all possible connections in four directions.

Having built the vertices (and connections), method 1700 preferably creates a set of quad edges therefrom in operation 1706. Quad edges correspond to the connections described above, and have the same directional characteristic. Moreover, quad edges preferably are characterized by being "symmetric", in that each connection is represented by two quad edges: a first quad edge proceeding from the origin vertex to the destination vertex, and a second quad edge proceeding from the destination vertex to the origin vertex.

According to certain approaches, creating edges per operation 1706 may include creating appropriate directed edges and directional relationships therebetween (e.g., left, right, origin, destination, next, previous) according to connections between vertices established via operation 1704.

Creating such appropriate directed edges may involve creating directed and symmetric quad-edges for each direction from the instant vertex. Preferably, only "new" edges are created, i.e., edges are not created for connections that are already defined within the graph. Moreover, if the current vertex has an existing connection to another vertex in the given direction, create a quad edge using the current vertex as "origin" and the connected vertex as a "destination", and set this quad edge as "next" to the current vertex in the given direction and as symmetric edge to the connected vertex in the opposite direction. For the same connection, create a quad edge using the current vertex as the "destination" and the connected vertex as the "origin"; meanwhile set this quad edge as "next" to the connected vertex in the opposite direction and as a symmetric edge to the current vertex in the given direction. In the case that the current vertex being evaluated has no connections, it is removed from the set of vertices to avoid isolated vertices within the graph. These evaluations are preferably repeated for all vertices identified in operation 1704, and upon completing said evaluations, edge relations ($L_{prev}$, $L_{next}$, $R_{prev}$, $R_{next}$, $O_{prev}$, $O_{next}$, $D_{prev}$, $D_{next}$, as shown in FIG. 4) are created for each edge.

Building graphs in accordance with the exemplary implementation also includes creating faces in operation 1708. As noted hereinabove, "faces" refer to regions that are bounded by edges, and defined by bounding paths that include the vertices and connecting quad-edges that encompass the face. Preferably, for a given quad edge, such as the exemplary quad edge as shown in FIG. 4, the left face is the region to the left of the quad edge connecting origin vertex 402 and destination vertex 404, and the right face for the quad edge is the face opposite the left quad edge, i.e., the region opposite the symmetric quad edge. Accordingly, faces created in operation 1708 preferably include at least two quad edges.

In some implementations, creating faces in accordance with operation 1708 involves evaluating all edges, and creating left faces for each edge that does not already have a defined left face that connects all edges bounding said left face in a rectangular path. Preferably, creating edges in this manner includes finding a starting edge depending on the given one. This starting edge is searched along the corresponding $L_{prev}$ connections via reverse iteration over a rectangular path until no further iteration can be made, or a closed path is established. The resulting starting edge uniquely defines a convex rectangular face.

Notably, the presently disclosed inventive concepts support both closed and open convex faces. In one implementation, iteration is performed counterclockwise over the left region of a sequence of directed edges (to find the bounding path). For convex faces, the left face for one directed edge turns into a right face for the opposite directed edge. Therefore, in a preferred implementation, the process of building faces is restricted to creating only left faces for all edges. The corresponding right faces are then automatically assigned.

Further, set initial rectangle for the face that is direct geometrical union of all coordinates of edges forming a face boundary. Note, that this rectangle is different from the covering rectangle of the face that is optionally built per operation 1710, below, and according to preferred embodiments initial rectangles are built for all faces prior to determining covering rectangles in operation 1710. With continuing reference to building faces in operation 1708, it is also efficient to leverage the definitions of quad edges and faces to simplify the face building process. In particular, it is possible to assign the bounding face(s) of the current face as left face(s) to the corresponding bounding edge, and as right face(s) to the symmetric edge(s) of the corresponding bounding edge. These evaluations and actions are preferably performed for each edge in the graph, to maximize faces built into the final graph.

In select implementations, building the graph includes iteratively performing operations 1704-1708 for all connections and corresponding vertices identified in operation 1702, until all edges and faces are created and included in the graph.

Figure 19:
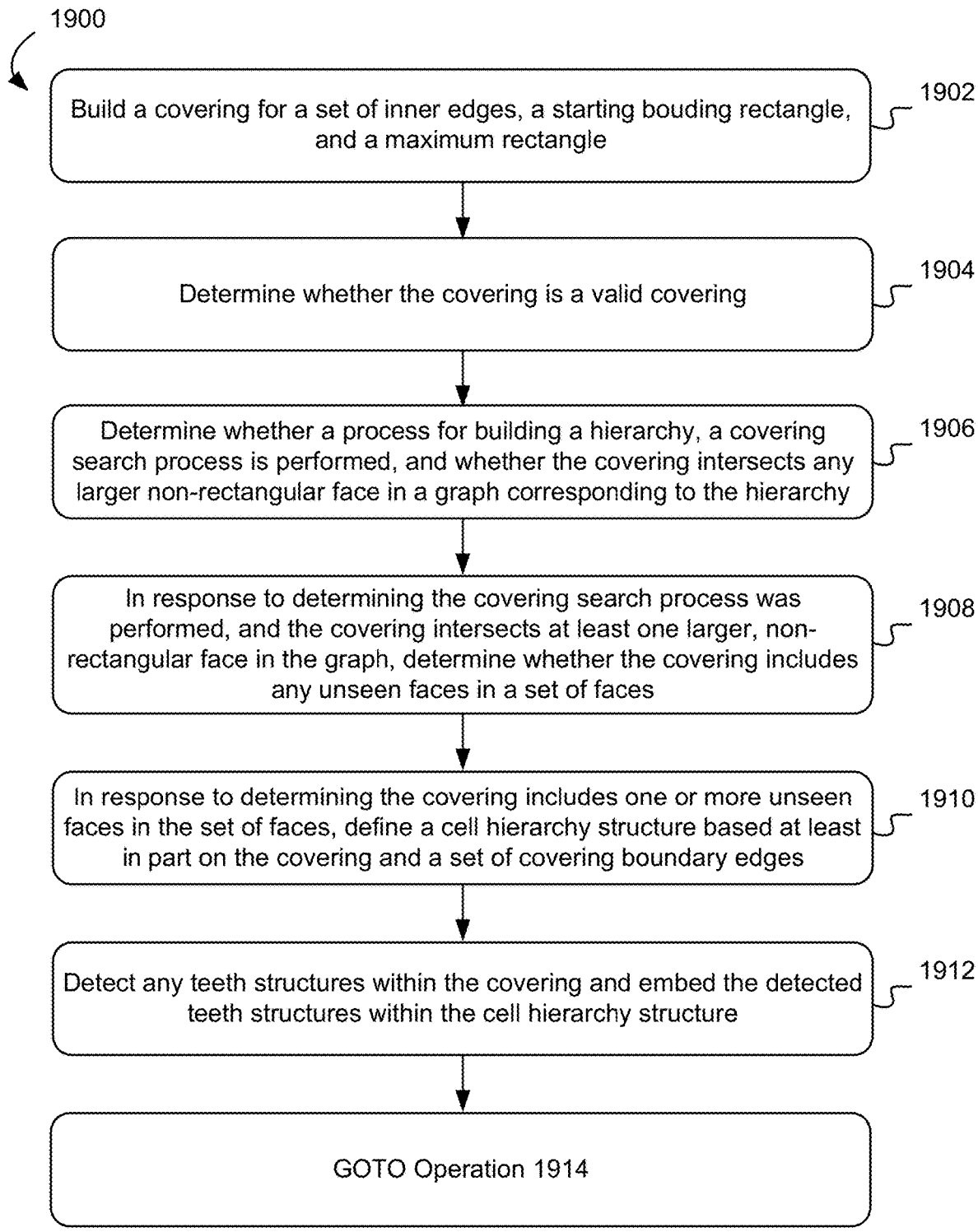
FIG. 19 depicts a simplified flowchart of a method for searching for a covering hierarchy, according to one implementation.
Figure 19:
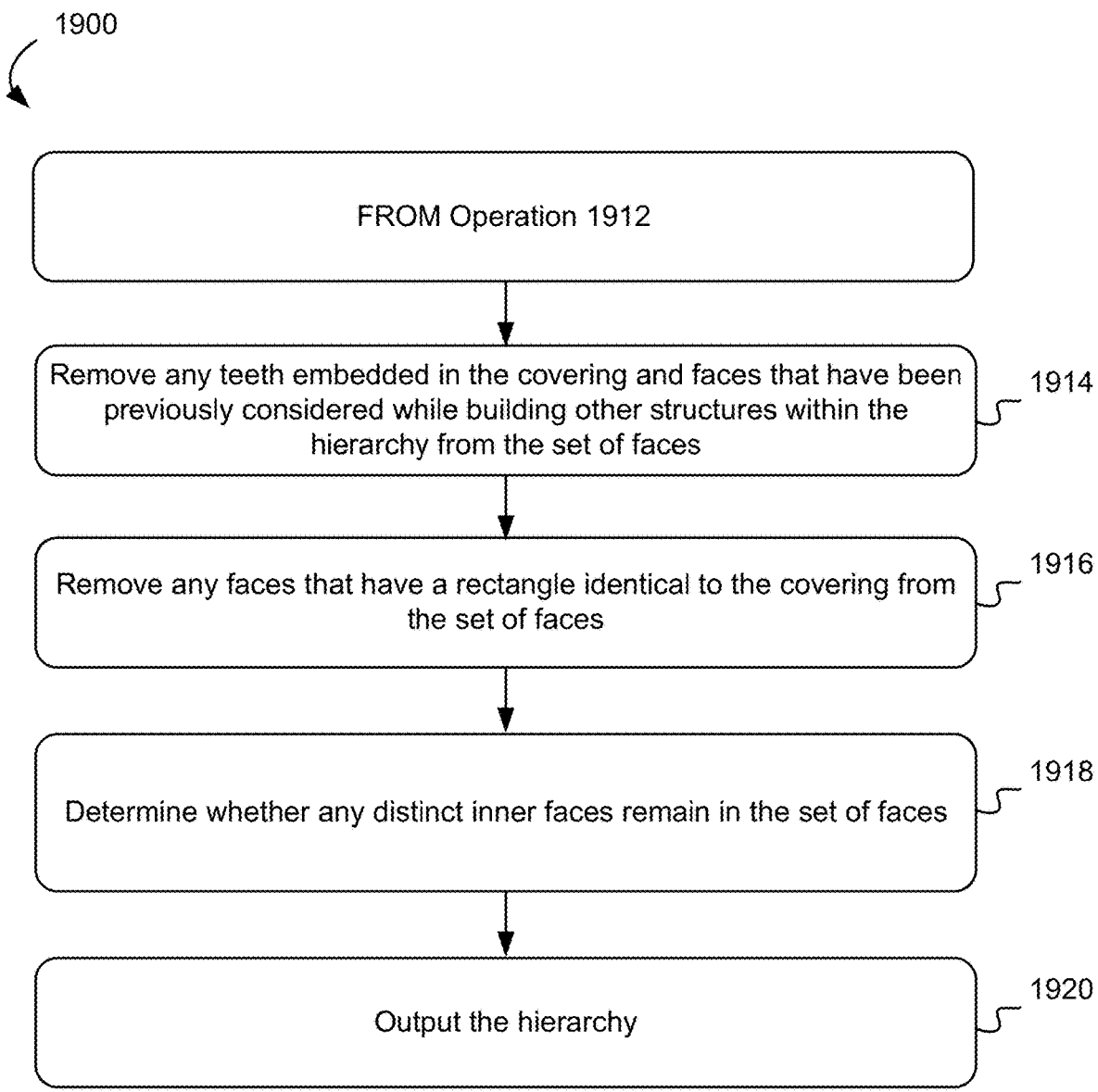

Method 1700 also optionally, but preferably includes determining a covering rectangle for some or (preferably) all identified faces in operation 1710. Building covering rectangles may be accomplished, in one approach, by implementing the covering building algorithm described above with reference to "Searching for Covering Rectangle" and method 1900 as shown in FIG. 19. Notably, if the covering rectangle is equivalent to the initial rectangle identified per operation 1708, the face is rectangular, otherwise it is a nonrectangular face. Rectangular coverings are preferably included in the graph (potentially as labels applied to corresponding faces), while non-rectangular coverings may be retained or discarded, in various approaches.

Once all vertices, edges, and faces are created, e.g. in the manner described above, the graph is complete, and hierarchies therein may be initialized, detected, aggregated, and/or reconciled, e.g., as detailed below.

Hierarchy Initialization

As noted above, according to the inventive concepts described herein, a hierarchy is a tree-based structure comprising a plurality of nodes. Any suitable tree structure may be utilized, in various implementations. In an illustrative implementation, the root node of the tree corresponds to the entire image of the page, while other nodes correspond to particular classes of elements (e.g., CELL, ROW, COLUMN, NESTED, TEETH, TEXT, GRID, etc. as would be appreciated by those having ordinary skill in the art upon reading the present descriptions) within the page, which have corresponding defining characteristics that are set forth in greater detail below, but generally include a designation of the element type (class), a set of coordinates defining a rectangle bounding the element, and a text value of the element as depicted in the page (which may be null, if no text is present within the bounding rectangle). In addition, each node includes or is associated with information defining quad edges of corresponding boundaries within the graph.

Thus, from the perspective of a graph, a node in the corresponding tree is equivalent to a structure of the graph. Similarly, from the perspective of the image of the page, a node in the corresponding tree is equivalent to a region of the image, such as a particular field, cell, portion of text, etc. Of course, other classes, defining characteristics, and graph/image equivalents may be utilized without departing from the scope of the inventive concepts presented herein. With continuing reference to preferred implementations, nodes within the hierarchy are represented by cell hierarchy structures, which are general hierarchy components that may have a set of child hierarchies (i.e., if any children exist, and fit one of the defined classes).

In addition, a cell hierarchy detector component may be used to represent a document as a hierarchy of objects identified using this component.

At any rate, following initialization, an initial hierarchy which is a single structure describing the entire page in created, from which additional elements and structures of the true hierarchy depicted on the page may be derived and extended via hierarchy detection, grid detection, and hierarchy aggregation and reconciliation, detailed below.

Hierarchy Detection

The presently described inventive concepts include detecting hierarchies represented in the document. The hierarchy is determined based on graphical elements, and is preferably based on a graph, such as a quad-edge graph, built using graphical elements that are identified, segmented, aligned, etc. as described hereinabove. Accordingly, hierarchy detection may rely on the result of other aspects described hereinabove, particularly preprocessing, optical mark recognition, text segmentation, line alignment, building graphs, and/or hierarchy initialization, in various approaches.

The following descriptions also refer to various theoretical constructs, prerequisites, formal definitions, and formal logic statements that are defined in greater detail hereinabove with reference to "Definitions: Hierarchy Initialization, Detection, Aggregation, and Reconciliation". Unless otherwise expressly stated hereinbelow, these definitions are to be considered controlling with respect to the descriptions regarding Hierarchy Initialization, Detection, Aggregation and Reconciliation.

Hierarchy detection, according to the presently disclosed inventive concepts, includes using structured and semi-structured information to generate or understand the structure of a document, and is based primarily on interpreting graphical elements and features, particularly graphical lines, more particularly vertical and horizontal graphical lines depicted within the document. The result of hierarchy detection is a tree that includes all (at least vertical and horizontal) graphical lines, and represents the hierarchy as a set of (rectangular) regions, and any (sub) regions contained therein, and any (sub-sub) regions contained therein, etc. as would be understood by those having ordinary skill in the art upon reading the present descriptions.

Detecting the hierarchy (or hierarchies) is a recursive process that seeks to extend the initial hierarchy created in the initialization step to include additional structures and relationships between identified structures. As input, hierarchy detection may rely on the existing structure (which is updated iteratively over the recursive detection process, and is the initial hierarchy for the initial detection recursion), and the complete set of faces identified within the page.

The exemplary hierarchy detection approach is based on two main operations: finding a rectangular covering and detection of the hierarchy. These operations may utilize input and/or components as described below.

In accordance with preferred approaches, there may be several kinds of structural units within the hierarchy (e.g., rows, columns, cells, etc.). These may be considered as "nodes" in the hierarchy. Moreover, the hierarchy may be any suitable type of tree-based structure that would be appreciated by those having ordinary skill in the art upon reading the present disclosure.

Finding Rectangular Coverings

The covering search algorithm is based on the concept of a covering in which, for any inner edge, the corresponding right and left faces (i.e., edges) are also located within the covering rectangle. The covering search algorithm initially aims to extract a rectangular covering for a given set of edges, based on the given starting rectangle, and within the maximum rectangle. In addition to this initial search, the algorithm may be implemented recursively as part of hierarchy detection as a whole.

According to select implementations, this process may consider boundary edges which do not necessarily satisfy the strict definition of a "bounding path", but rather may be slightly non-aligned or not connected.

Regarding input, since a covering in a graph represents a rectangle that encloses a subgraph (edges and faces) for the given edges, rectangular coverings are built on input including: a set of non-covered edges E (which is initialized with the input set of edges), a starting bounding rectangle $R^i$ (which delimits inner and bounding edges of a covering from edges external to the covering), and a maximum rectangle $R^{max}$ for the covering. In various approaches, the given edges do not have to be sequential or connected.

Figure 18:
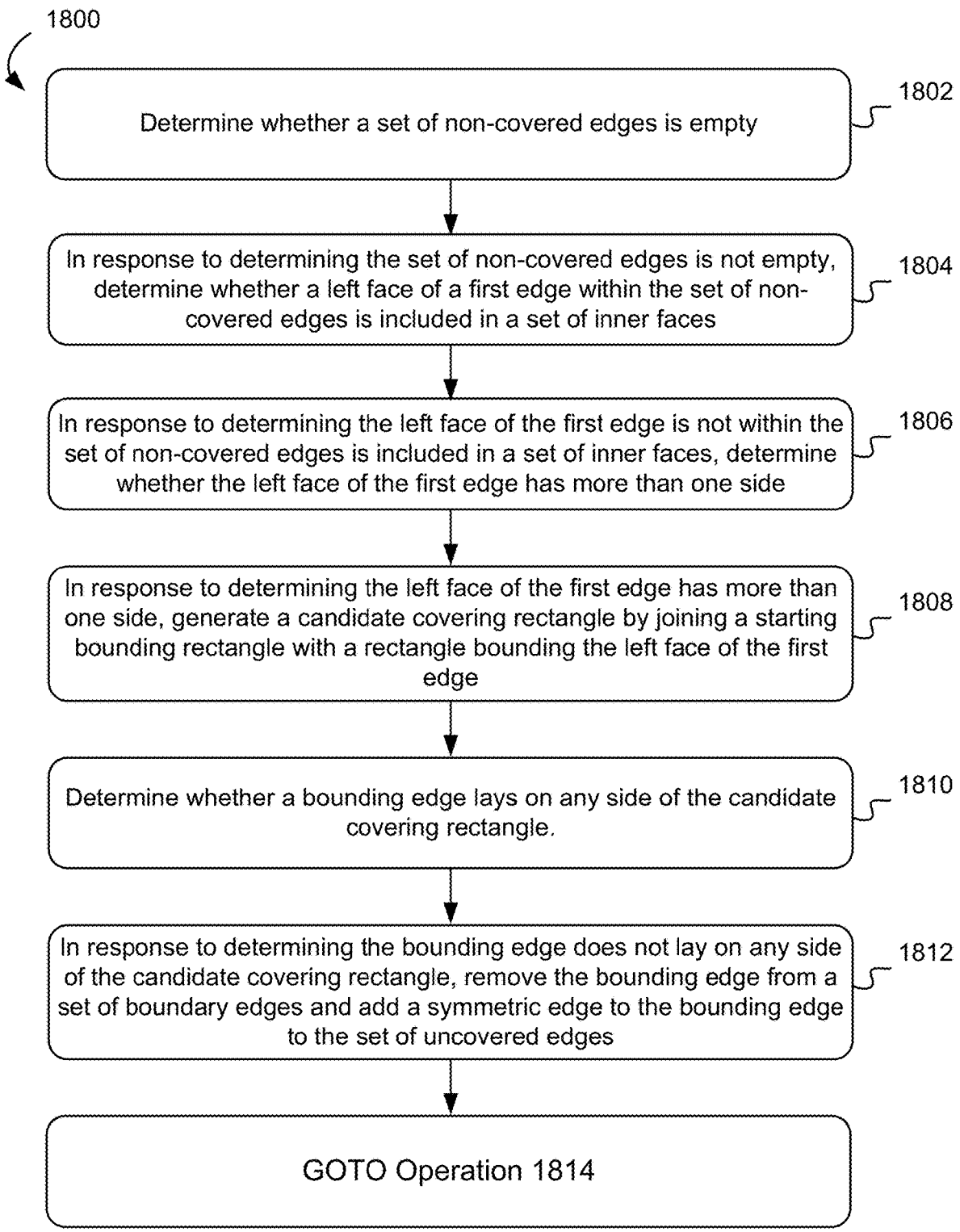
FIG. 18 depicts a simplified flowchart of a method for finding rectangular coverings, according to one implementation.
Figure 18:
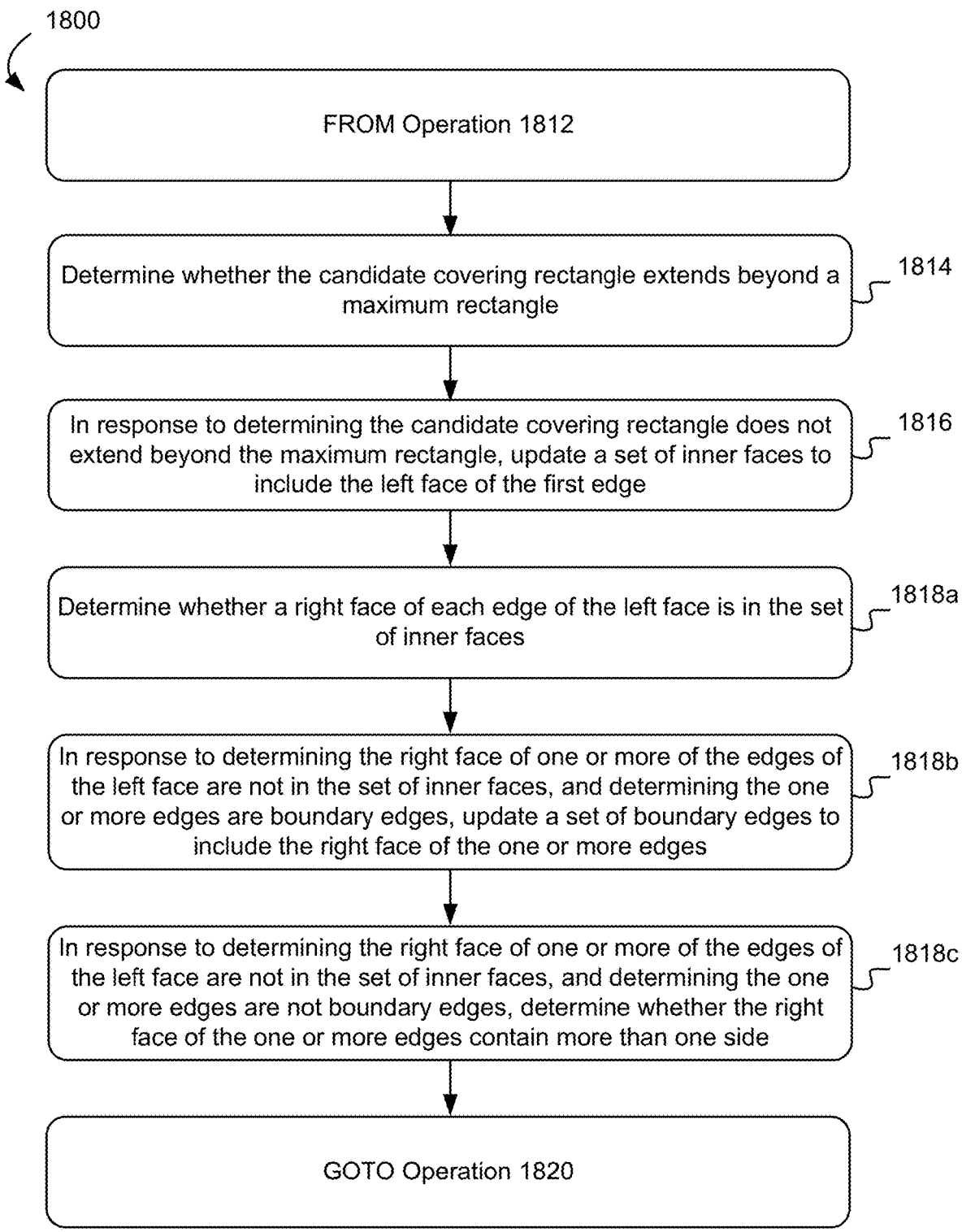
Figure 18:
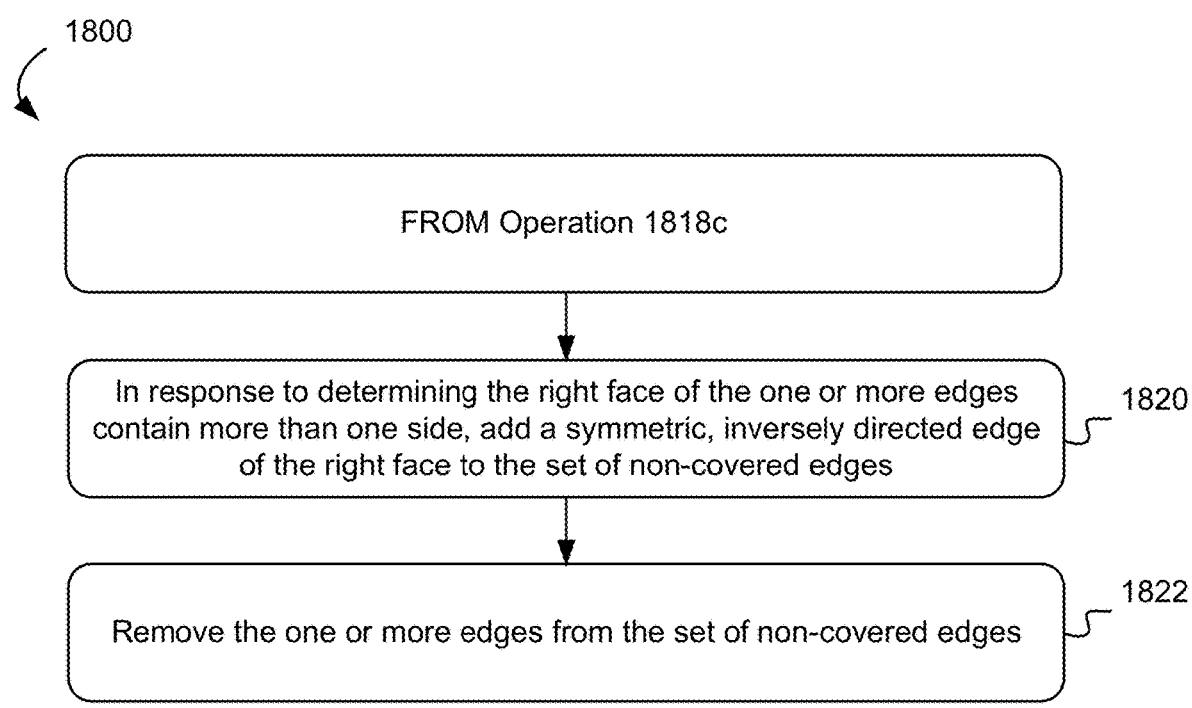

In accordance with one illustrative implementation, a method 1800 for finding rectangular coverings for one or more regions that are defined by horizontal and vertical graphical lines depicted on a page of a document, particularly a business document, is shown in FIG. 18. The method 1800 may be implemented in any suitable manner, and may be employed in combination with any other processes and/or aspects thereof as described herein without limitation, unless otherwise expressly indicated. Moreover, method 1800 may be implemented in any suitable environment or form, such as a set of computer program instructions configured to cause a computer (or components thereof, such as a processor, etc.) to perform the steps of method 1800.

In accordance with an exemplary implementation, a covering search process 1800 includes the following operations.

In operation 1802, determine whether the initialized set of non-covered edges E is empty. If so, the covering is found and the process ends and outputs a positive indication, and/or the covering.

Otherwise, the process proceeds to operation 1804, which involves determining whether the left face of a first edge e within the set of non-covered edges E is included in a set of inner faces $F^{inner}$. If so, edge e is removed from the set of non-covered edges E, and the process returns to operation 1802.

Else, process 1800 proceeds with operation 1806, where it is determined whether the left face of edge e has more than one side.

If so, in operation 1808 the bounding rectangle $R^i$ is updated by joining $R^i$ with the rectangle of the left face of edge e to generate a candidate covering rectangle $R^c$.

Operation 1810 of method 1800 includes validating bounding edges of the covering by determining whether a bounding edge e lays on any side of candidate covering rectangle $R^c$.

If bounding edge e does not lay on any side of candidate covering rectangle $R^c$, bounding edge e is removed from the set of boundary edges $E^{bound}$ and the symmetric edge of bounding edge e is placed into the set of edges E in operation 1812.

Process 1800 proceeds with operation 1814, wherein Re is evaluated to determine whether $R^c$ extends beyond the maximum rectangle $R_{max}$. If so, according to the input restrictions for the bounding rectangle, then candidate covering rectangle Re is not a valid covering, and an indication of this conclusion is output.

If candidate covering rectangle Re is instead determined, in operation 1814, to be within the maximum rectangle $R_{max}$, then in operation 1816 the set of inner faces $F^{inner}$ is updated to include the left face of the edge referenced in operation 1804.

For every edge e' of the left face of e, several evaluations are performed. A first evaluation in operation 1818a determines whether the right face of edge e' is already in the set of inner faces $F^{inner}$. If so, edge e' is skipped, and the same evaluation is performed for all remaining edges e'.

If the right face of edge e' is not in the set of inner faces $F^{inner}$ then operation 1818b proceeds with a second evaluation that involves determining whether edge e' is a boundary. If so, the set of boundary edges $E^{bound}$ are updated to include e', and all boundary edges in $E^{bound}$ are validated as described hereinabove with reference to operations 1810 and 1812. On the other hand, if e' is not a boundary edge, then operation 1818c proceeds with a third evaluation, which includes determining whether the right face of e' contains more than one side.

If so, then operation 1820 involves adding (symmetric, inversely directed) edge e' to the set of non-covered edges E.

In operation 1822, process 1800 removes edge e from the set of non-covered edges E, and returns to operation 1802. In accordance therewith, process 1800 recursively repeats until E is empty, and a final covering $R^{cover}$ is found.

In accordance with covering search process 1800, the resulting covering is considered valid if its bounding rectangle fits rectangle formed by all edges (alternative situation can appear while joining with rectangle of non-rectangular face). When the process is finished, the resulting covering object contains information about the bounding rectangle, inner faces and boundary edges of the covering.

Searching for Covering Hierarchy

In accordance with one illustrative implementation, a method 1900 of searching for a covering hierarchy for horizontal and vertical graphical lines depicted on a page of a document, particularly a business document, is shown in FIG. 19. The method 1900 may be implemented in any suitable manner, and may be employed in combination with any other processes and/or aspects thereof as described herein without limitation, unless otherwise expressly indicated. Moreover, method 1900 may be implemented in any suitable environment or form, such as a set of computer program instructions configured to cause a computer (or components thereof, such as a processor, etc.) to perform the steps of method 1900.

According to preferred embodiments, searching for a covering hierarchy is an iterative process in hierarchy detection, and involves building a covering hierarchy C for a given set of inner edges $F^{inner}$ (which is initialized with the input set of edges), a starting bounding rectangle $R^i$ (which delimits inner and bounding edges of a covering from edges external to the covering), and a maximum rectangle $R^{max}$.

As shown, method 1900 includes operation 1902, where a covering C is built for $F^{inner}$ $R^i$, and $R^{max}$.

In operation 1904, the covering C is preferably evaluated to determine whether it meets the definition of a covering set forth hereinabove, in which case it is valid and the method proceeds, else an indication of invalidity (such as a null parameter) is returned and the process terminates.

In operation 1906, an evaluation is performed to determine whether the covering search process is performed during a row or column extension step of a hierarchy detection and building process (such as described in greater detail below with reference to method 2300 and FIG. 23 under the section "Detecting and Building Hierarchy"), and furthermore whether the resulting covering C does not intersect any larger non-rectangular face in a corresponding graph, in which case the search for a covering hierarchy fails. In some approaches, operation 1906 may discard or disregard narrow putative coverings, also resulting in failure of the search process. Such narrow coverings may be identified using the concept of "tolerance" as described herein, according to select implementations.

Method 1900 proceeds with determining whether the covering C includes any unseen faces that are contained in a set $F^{unseen}$ in operation 1908 (where, prior to hierarchy detection, $F^{unseen}$ is initialized with the full set of faces F in the graph, and $F^{unseen}$ reduces as hierarchy detection proceeds; i.e., upon successfully incorporating the region(s) of the page that correspond to one or more face(s) f' into the hierarchy, the face(s) f' is/are no longer considered "unseen" and are removed from the set of unseen faces $F^{unseen}$).

With continuing reference to operation 1908, if the result of the determination is that C does not include any unseen faces that are contained in $F^{unseen}$, the covering C is determined invalid and process 1900 terminates without any covering hierarchy being built. Operation 1908 may return a null parameter to indicate this outcome, in some embodiments.

If the covering does include unseen faces contained in $F^{unseen}$, a cell hierarchy structure as described hereinabove is defined, with the covering C and corresponding set of covering boundary edges $E^{bound}$, in operation 1910.

Figure 21:
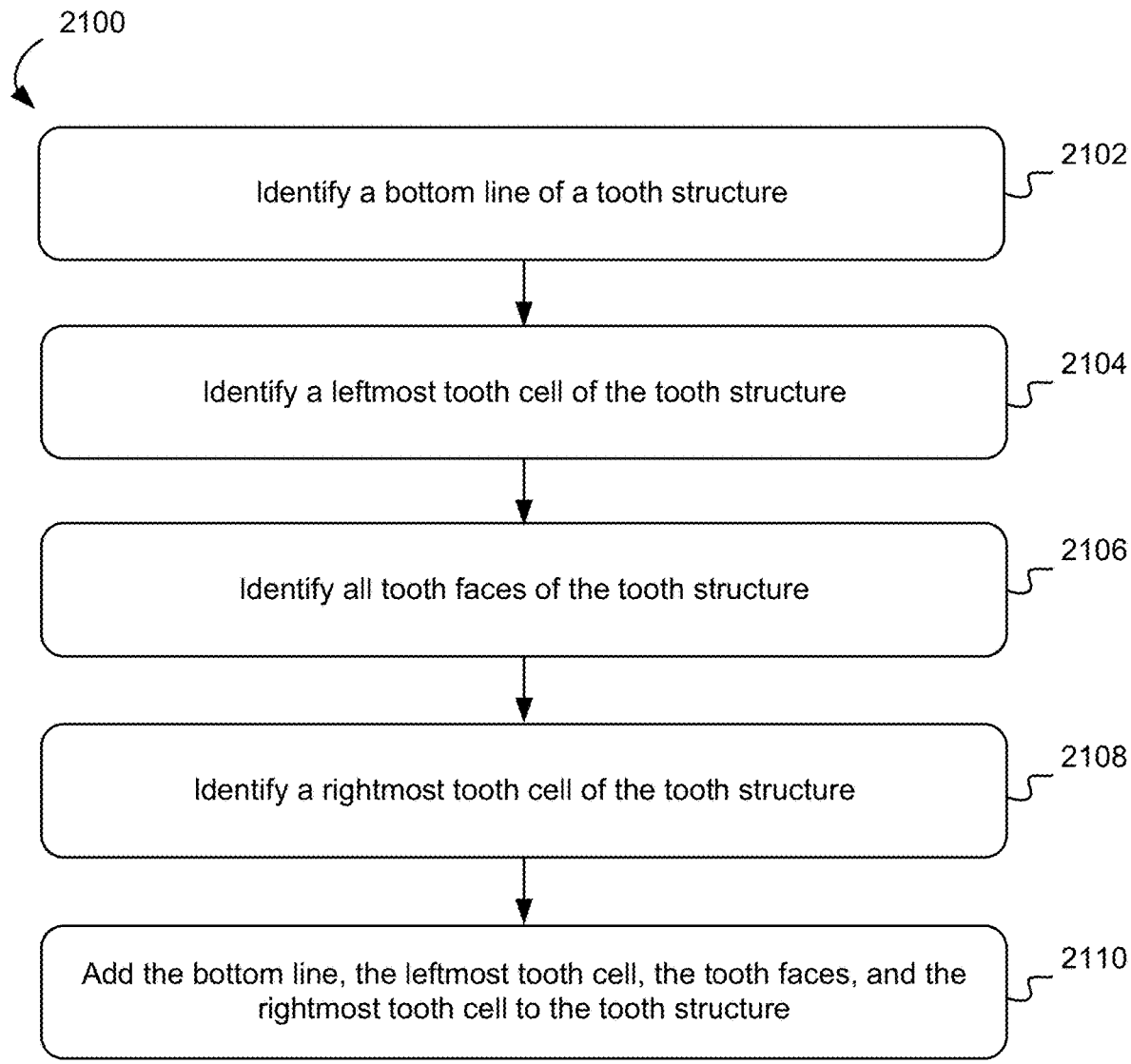
FIG. 21 depicts a simplified flowchart of a method for detecting tooth structures, according to one implementation.
Figure 22:
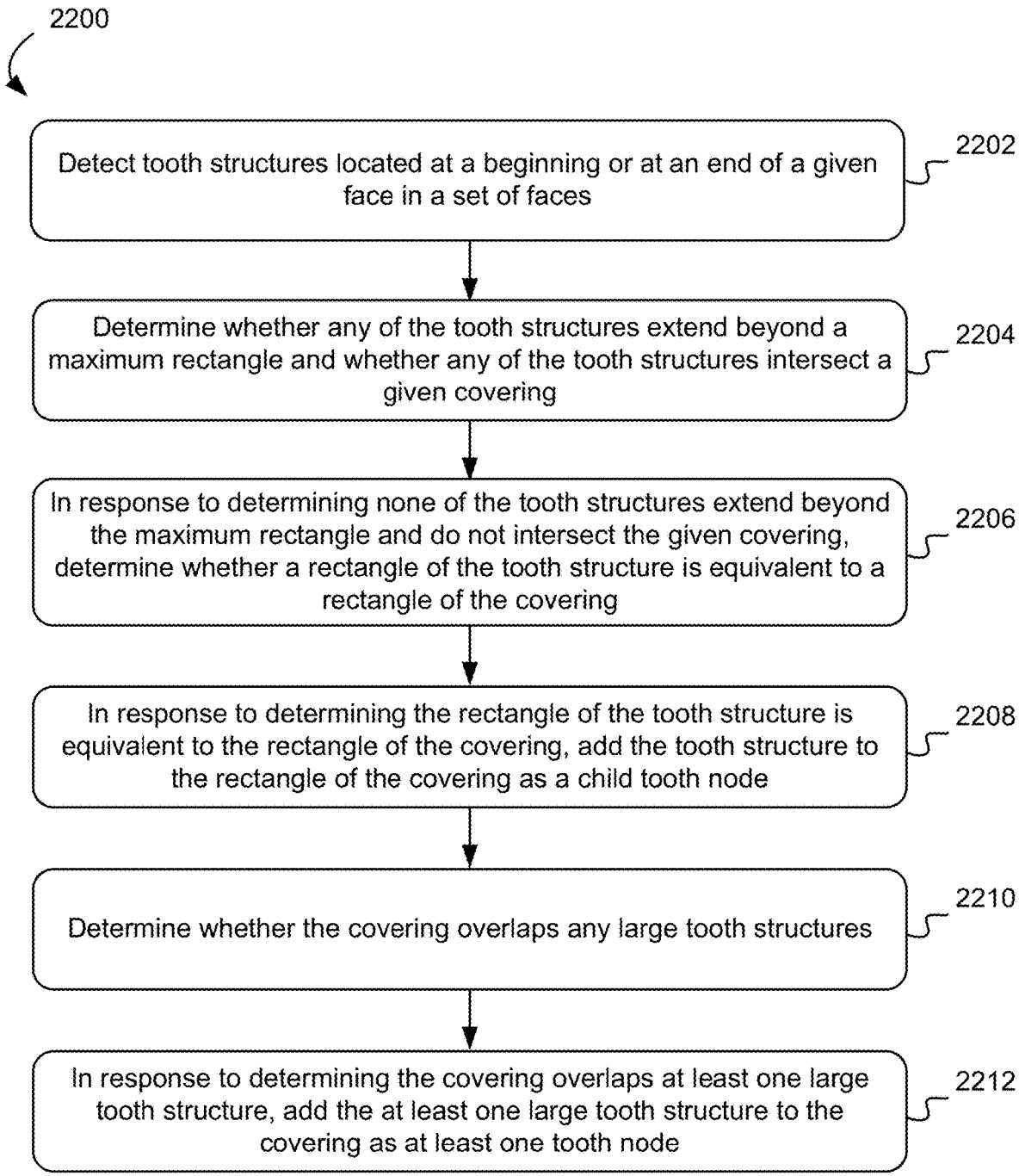
FIG. 22 depicts a simplified flowchart of a method for embedding tooth structures within a hierarchy, according to one implementation.

In operation 1912, method 1900 involves detecting and/or embedding TEETH structures (nodes) within the cell hierarchy structure. According to various approaches, detecting and embedding TEETH as in operation 1912 may include performing operations as shown in FIGS. 21-22, and described with reference to methods 2100-2200 below.

With continuing reference to method 1900, operation 1914 involves pruning $F^{unseen}$ to remove faces that have been previously considered while building other structures (e.g., as discussed hereinabove) within the covering C, and any TEETH structures detected and embedded per operation 1912.

In operation 1916, a determination is made as to whether any faces in $F^{inner}$ have rectangles identical to the covering C. If so, such faces are removed from $F^{unseen}$ to avoid potentially considering distinct non-rectangular faces with equivalent coverings.

Operation 1918 includes determining whether any distinct inner faces remain in $F^{inner}$ and if not, returning the built hierarchy. Conversely, if distinct inner faces do remain in $F^{inner}$, additional hierarchy elements are built within the existing hierarchy using a set of distinct inner faces remaining in $F^{inner}$ and recursively calling the hierarchy detection process as described herein in order to build child hierarchies within the current hierarchical level of the current hierarchy.

The resulting built hierarchy (once all distinct inner faces in $F^{inner}$ are exhausted) is returned in operation 1920.

Detecting Teeth

The illustrative algorithm, according to one exemplary approach, performs processing an extracted covering for a subgraph and introduces tooth structures if any. Two types of faces with the given covering may play a particularly important role in this process.

Figure 20A:
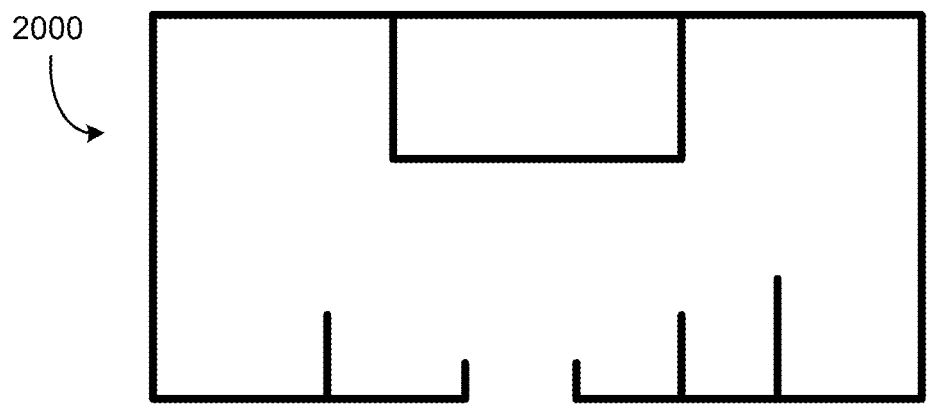
FIGS. 20A-20C depict simplified schematics of faces of a structure formed from vertical and horizontal graphical lines, according to one implementation.

Equivalent faces may exist where a current covering includes several distinct non-rectangular faces, in which case the corresponding covering rectangles could be equivalent to the given covering. Accordingly, equivalent faces are considered to be part of the same structure (and exist at the same level of hierarchy) but may contain separated tooth structures. An exemplary illustration of various types of faces is shown according to the simplified schematics of FIGS. 20A-20C, according to one embodiment.

Figure 20B:
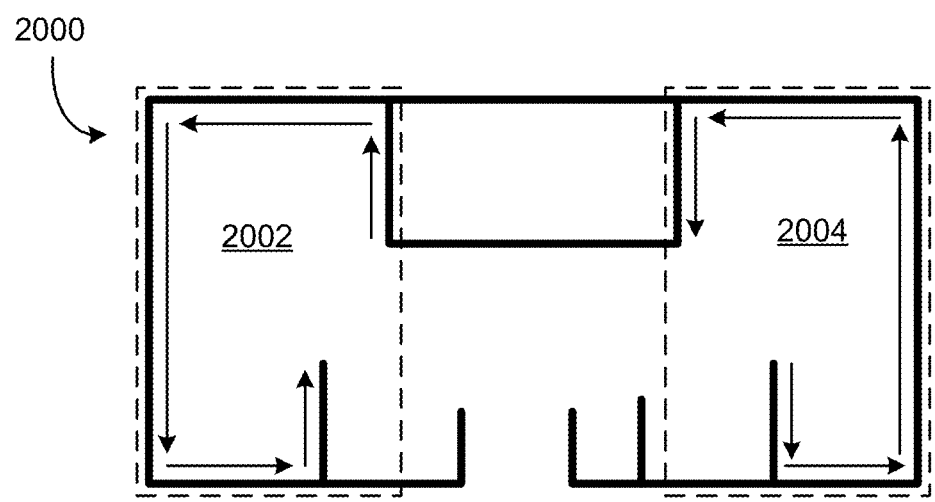
Figure 20C:
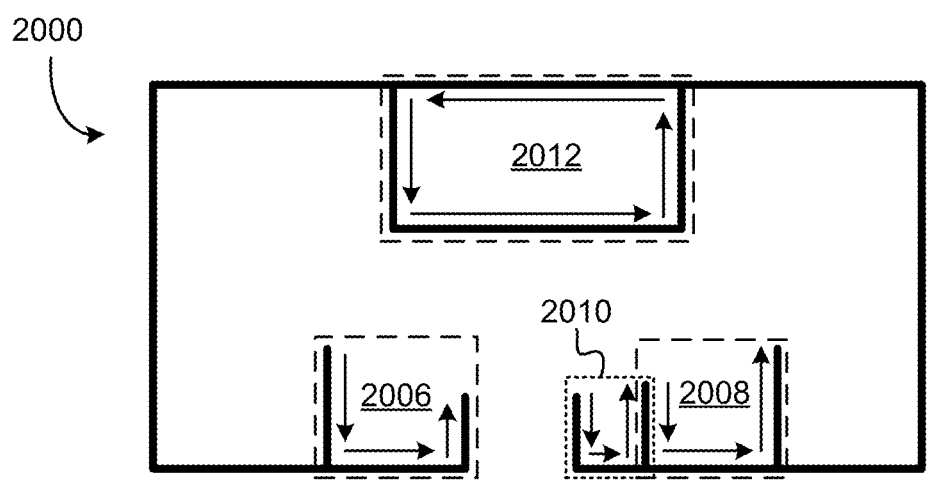

As shown, structure 2000 includes six faces. Recalling that, according to the presently described inventive concepts, faces are defined by a bounding path of edges (indicated in FIGS. 20B and 20C via arrows), formed in a counter clockwise direction, while initial rectangles (dashed bounding line) corresponding to faces 2002 and 2004 is rectangular, the properly defined faces 2002, 2004 are non-rectangular, as can be seen from the bounding paths (arrows) shown in FIG. 20B. Moreover, as shown in FIG. 20C, the right faces 2006, 2008 (indicated by dashed bounding lines and corresponding arrows) of inner edges corresponding to faces 2002, 2004, respectively, meet the definition of rectangular faces as provided hereinabove. Further, face 2010 (dotted bounding lines and arrows) is also a 3-sided rectangular face. Finally, face 2112 (indicated by dashed bounding lines and arrows) is a four-sided rectangular face in accordance with the inventive concepts and definitions provided herein.

Faces 2002 and 2004 correspond to the left and right boundaries, respectively, of structure 2000. Meanwhile, faces 2006, 2008, and 2010 correspond to the bottom boundary of structure 2000, and face 2012 corresponds to the top of the structure 2000. In this case, covering rectangles for non-rectangular faces 2002, 2004 are equivalent to the entire, outermost rectangular contour of structure 2000. In accordance with the presently described inventive concepts, faces 2002, 2004 are understood as equivalent because they have equivalent covering rectangles. However, it should be understood that while "equivalent", faces 2002 and 2004 differ in terms of initial forming edges, as shown in FIG. 20B. In addition to equivalent faces, inner faces may play an important role in the context of detecting TEETH. Inner faces, as understood herein, are faces whose rectangles are strictly contained in the given covering, as is the case for faces 2006, 2008, and 2010, as shown in FIGS. 20B-20C, and according to one implementation.

According to the presently disclosed inventive concepts, a method 2100 for detecting TEETH structures depicted on a page of a document, particularly a business document, is shown in FIG. 21. The method 2100 may be implemented in any suitable manner, and may be employed in combination with any other processes and/or aspects thereof as described herein without limitation, unless otherwise expressly indicated. Moreover, method 2100 may be implemented in any suitable environment or form, such as a set of computer program instructions configured to cause a computer (or components thereof, such as a processor, etc.) to perform the steps of method 2100.

In accordance with one illustrative implementation, TEETH may comprise three parts, designated as "previous face", "tooth face" (or, equivalently, "tooth-like face"), and "last face", in one implementation. Previous and last faces are parts of bounding faces with three or more sides, and tooth-like faces are faces with two sides (bounding faces) or three sides (main part face). In a preferred implementation, the TEETH detection algorithm 2100 extracts all these parts while maintaining information about the unified top and bottom level of tooth cells, and after that concatenates them in a corresponding structure, e.g., as follows.

In a first operation 2102, the bottom (line) of the tooth structure, which should have a continuous x-axis extent and common y-coordinate values (optionally, within a pre-defined threshold to account for variations such as may be caused by skew, distortion, etc. in the image of the document) for all "tooth cells", is identified. If no such line can be found, then there is no tooth structure, and the algorithm 2100 returns a corresponding indication.

Operation 2104 of algorithm 2100 involves identifying the leftmost "tooth cell", which is the "previous face" as defined above, i.e., a face that is part of one or more bounding faces with three or more sides.

In operation 2106, all "tooth faces" (which form the main part of the tooth structure) are identified and designated, again based on the above definition of main part tooth faces, which are faces with three sides (but are not bounding faces).

Operation 2108 includes identifying the rightmost tooth cell, which is a bounding face with two sides, and x-coordinate values that are greater than all other tooth faces and the faces previously identified in operations 2104 and 2106.

Algorithm 2100 also includes creating a tooth structure with the unified height of the tooth cells and the corresponding joined rectangle in operation 2110. This is a TEETH node that formally represents a row with aligned cells within the hierarchy, and may be imbedded therein, e.g., as described below.

Embedding Teeth

In accordance with one illustrative implementation, a method 2200 for embedding teeth structures in a hierarchy representing horizontal and vertical graphical lines depicted on a page of a document, particularly a business document, is shown in FIG. 22. The method 2200 may be implemented in any suitable manner, and may be employed in combination with any other processes and/or aspects thereof as described herein without limitation, unless otherwise expressly indicated. Moreover, method 2200 may be implemented in any suitable environment or form, such as a set of computer program instructions configured to cause a computer (or components thereof, such as a processor, etc.) to perform the steps of method 2200.

Each face within the covering in general may contain two separated tooth structures: at the end and at the beginning of a face. If valid, integration of TEETH is performed for the faces equivalent to the covering. Integration of TEETH is performed for inner faces only if the structure overlaps the given covering and requires extension, e.g., according to the following approach described with reference to method 2200 and FIG. 22.

In select approaches, the following operations of method 2200 are performed, preferably for every inner face f in $F^{inner}$.

In operation 2202, method 2200 includes detecting tooth structures at the beginning and at the end of the face. If they are the same (e.g., located in the same position), keep only one and discard the other.

Operation 2204 involves determining whether each tooth structure extends, in either direction, beyond the maximum rectangle $R^{max}$, and whether the tooth structure intersects with the given covering. If either condition is satisfied, then the tooth structure is invalid and is discarded.

Otherwise, in operation 2206 a determination is made regarding whether the tooth structure rectangle is equivalent to the covering rectangle. If so, the input structure is replaced with tooth structure.

Operation 2208 includes determining whether the face of the covering rectangle contains tooth structure, and if so, adding the tooth structure to the covering rectangle as a child TEETH node.

If operation 2208 results in a determination that the face of the covering rectangle does not contain the tooth structure, then method 2200 proceeds with operation 2210, in which large tooth structures are evaluated to determine whether the covering overlaps said large tooth structures, in which case the covering is extended and the overlapped large tooth structures are added as a child TEETH node to the covering in operation 2212.

Preferably, in accordance with method 2200, non-valid structures (e.g., structures not fitting the definition of a TEETH node) are discarded.

Detecting and Building Hierarchy

Figure 23:
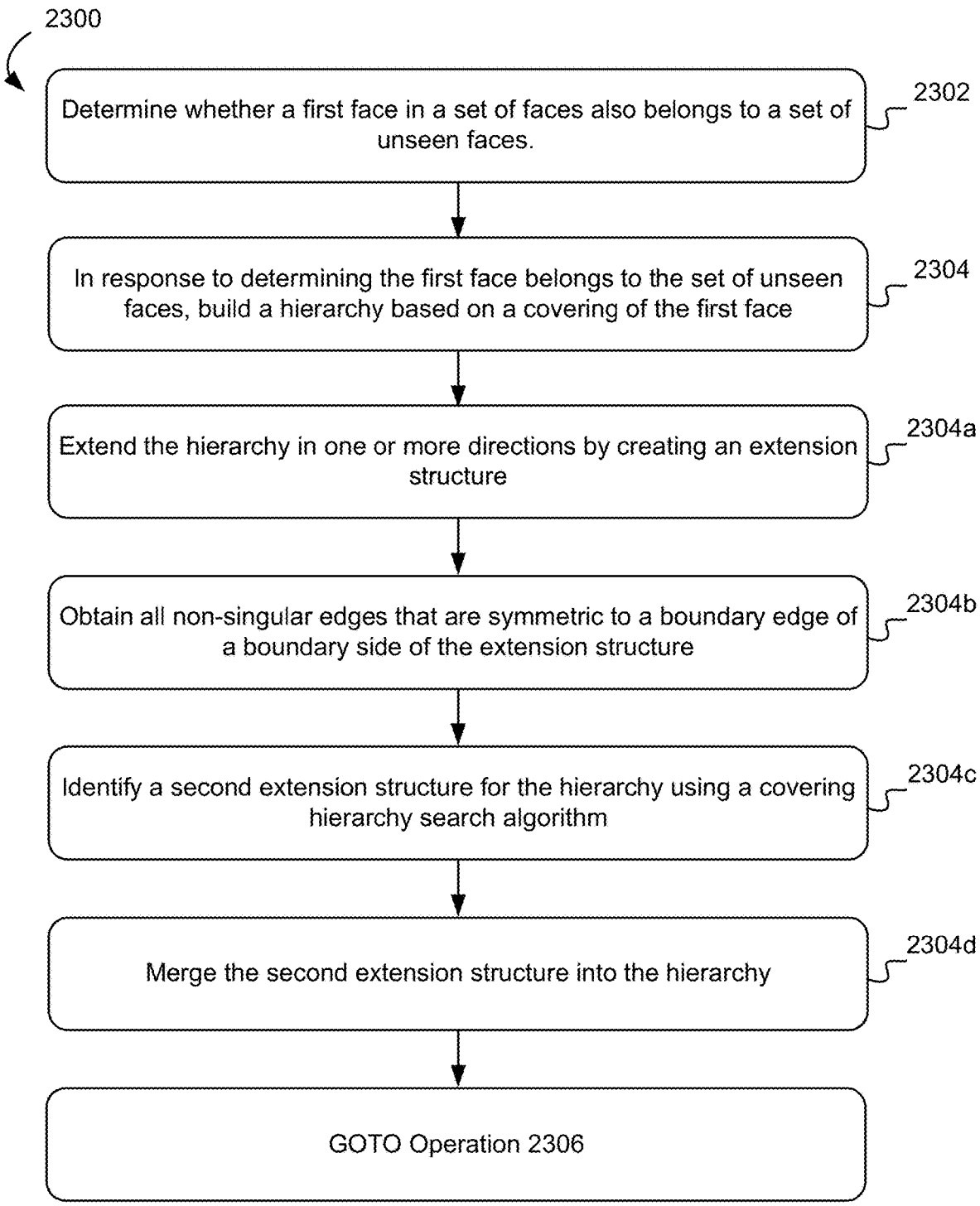
FIG. 23 depicts a simplified flowchart of a method for detecting and building a hierarchy, according to one implementation.
Figure 23:
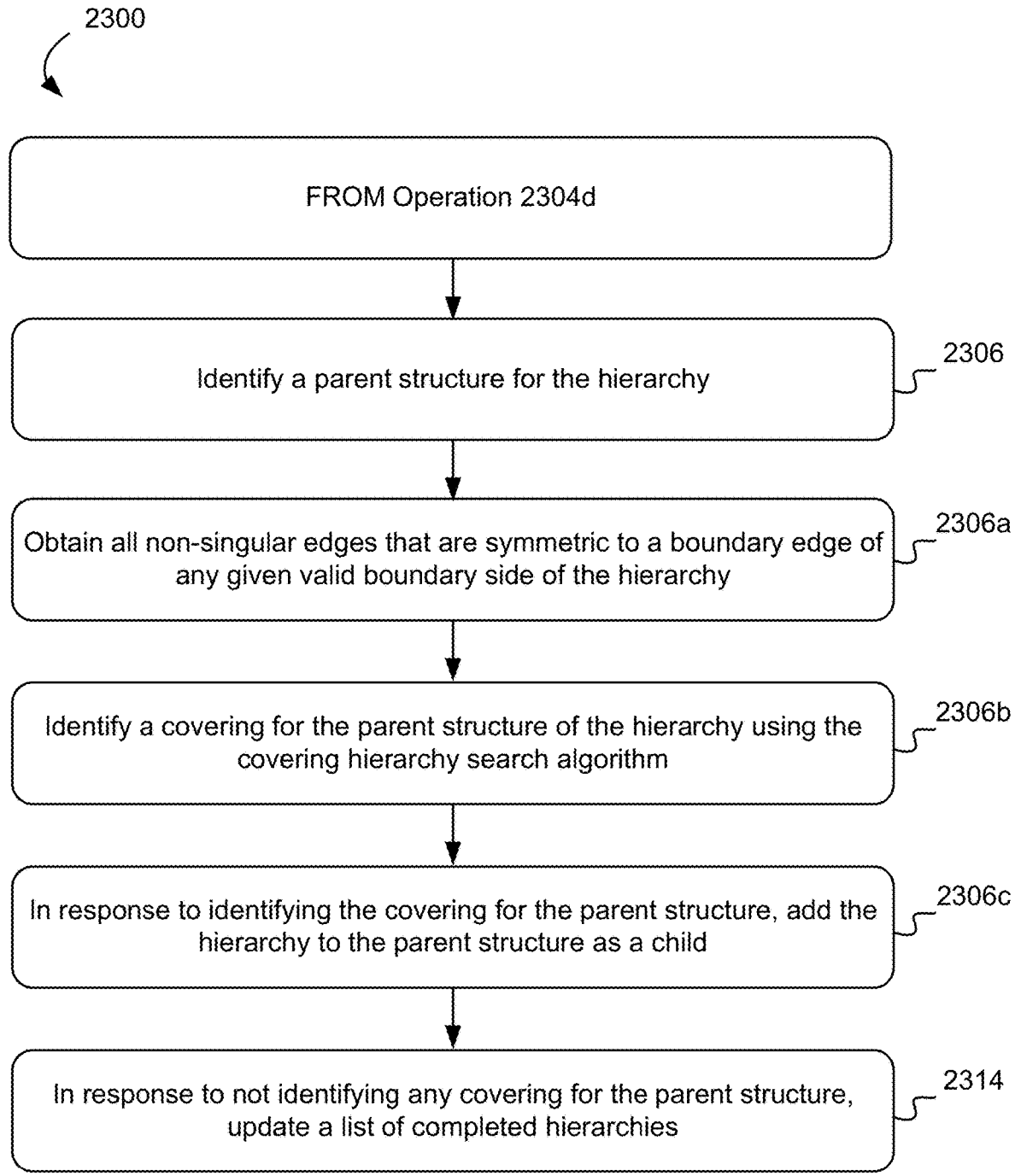

In accordance with one illustrative implementation, a method 2300 for detecting and building a hierarchy representing horizontal and vertical graphical lines depicted on a page of a document, particularly a business document, is shown in FIG. 23. The method 2300 may be implemented in any suitable manner, and may be employed in combination with any other processes and/or aspects thereof as described herein without limitation, unless otherwise expressly indicated. Moreover, method 2300 may be implemented in any suitable environment or form, such as a set of computer program instructions configured to cause a computer (or components thereof, such as a processor, etc.) to perform the steps of method 2300.

The illustrative hierarchy detection and building algorithm is a recursive algorithm that is aimed to detect a hierarchy for the given set of faces within the given parental structure. In select approaches, the detection function is performed for the structure of the entire document page and full set of graph faces F. However, the detection function may be performed multiple times for the page as a whole, or subsections of the page (which do not include the entire page).

According to preferred approaches, prior to performing hierarchy detection per se, the set of input faces (which, at least initially is the full set of graph faces F) are sorted. Face sorting may utilize a face compare operator for face objects based on covering rectangles, which performs regular comparison of central points of the rectangles. If they are equivalent, the compare operator compares the starting vertices.

For example, according to one implementation, if a face strictly contains another face, the larger face is given higher priority in the hierarchy. Non-enclosed faces are sorted according to the compare operator at each level of enclosure. Larger faces preferably are considered first to avoid building a hierarchy that breaks the logic of enclosure, as the compare operator implicitly impacts on the priority of hierarchy types. Accordingly, in preferred implementations, y-x sorting yields the ROW priority, while x-y sorting yields the COLUMN priority.

Now, with reference to hierarchy detection and building per se, according to one approach this process 2300 involves two overarching steps: finding child structures, and merging identified child structures with a given (reference) structure.

Finding child structures, in one approach, may proceed substantially according to a method as shown in FIG. 23, and may take as input a given reference structure $R^{ref}$, a covering rectangle of the reference structure $R^{search}$, a set of faces F, and a set of unseen faces $F^{unseen}$.

With said input, process 2300 may find child structures by performing a set of operations 2302-2306c recursively until the set of faces F is empty. According to a preferred embodiment, these operations include the following.

In operation 2302, assuming the set of faces F is not empty, the first face f therein is evaluated to determine whether f also belongs to $F^{unseen}$. If so, process 2300 proceeds to operation 2304, otherwise f is removed from F, and operation 2302 is repeated until either reaching a face that does belong to $F^{unseen}$, or F is empty. If F is empty, process 2300 proceeds directly to operation 2314 (sorting extracted child structures, described below).

Operation 2304 involves building a starting hierarchy that is based on the covering for the first face considered. This may be accomplished using the covering hierarchy search algorithm described hereinabove with reference to method 1800 and FIG. 18, e.g., to find a rectangular covering for a set of edges $E^{cover}$ containing only one starting edge of the first face, starting with covering rectangle for this face and within the rectangle of the given reference structure. Notably, the rectangle of the resulting structure is equivalent to the covering rectangle of the face f. By way of example, and according to one illustrative embodiment, FIG. 23. shows a simplified schematic of a covering structure for the starting edge.

In preferred implementations, operation 2304 involves performing further iterations in order to introduce possible recursive extensions to the current structure until no extension criteria are met. Extensions are prioritized in the next order: row, column, nested.

For instance, operation 2304a involves attempting to extend the structure into a row or column in one or more "next" directions, which is preferably performed in a predefined prioritized order, such as left, right, top, bottom in one implementation. In other implementations, the order of next directions may be modified, e.g., according to the natural reading order of the language depicted in the document, or according to other document conventions that would be appreciated by those having ordinary skill in the art upon reading the present disclosure.

Upon identifying a suitable extension structure in accordance with operation 2304a, process 2300 involves obtaining all non-singular edges that are symmetric to all boundary edges of a given boundary side in operation 2304b, again preferably according to a predefined, prioritized order of direction(s) of extension, which may be an order such as left, right, top or bottom in one approach.

With continuing reference to performing further iterations of operation 2304, operation 2304c includes attempting to identify an extension structure for the current hierarchy using the covering hierarchy search algorithm described hereinabove with reference to FIG. 19. The extension structure may be identified within a previously obtained set of edges, and preferably comprises a thin starting rectangle that contains all such edges and is within a maximum rectangle of a region extended to the left, right, top, or down from the current structure and is within the search rectangle.

If an extension structure is found, the extension is merged into the current structure in operation 2304d to create a row or column (depending on the direction the extension extended the current structure, as would be understood by those having ordinary skill in the art upon reading the present disclosure). Notably, the set of starting edges need not necessarily be sequential and connected. The concept of tolerance as described herein allows combining slightly aligned rectangles into a row/column. Advantageously, finding the covering for all, even disconnected, boundary side edges, guarantees the search will identify the fullest possible extension for the current structure, avoiding loss of information represented by graphical lines within the page.

This iterative process represented by operations 2304a-2304d is preferably repeated until no further extensions can be identified, and may be accompanied or followed by attempting to extend the current structure into nested structures, as described in greater detail below with reference to operations 2306, et seq.

In particular, according to select implementations operation 2306 includes identifying a parent structure for the current hierarchy within the covering rectangle of the reference structure $R^{search}$.

Upon identifying such a parent structure in operation 2306, process 2300 involves obtaining all non-singular edges that are symmetric to all boundary edges of any given valid boundary side of the current hierarchy in operation 2306a.

In operation 2306b, and again using the covering hierarchy search algorithm described hereinabove with reference to FIG. 19, a covering for the parent structure identified in operation 2306 $R^{parent}$ is identified for a set of edges, starting with the rectangle of the current hierarchy within the covering rectangle of the reference structure $R^{search}$.

If the parent structure is found, the current hierarchy is added as a child to the parent structure in operation 2306c, resulting in nested structure, and process 2300 reverts to operation 2304a.

Otherwise, the hierarchy is complete, is added to a container and a list of completed hierarchies is updated in operation 2314, and process 2300 reverts to operation 2302 until F is empty, upon which child structures in the container are be merged with reference structure $R^{ref}$.

Merging Child Structures Into Hierarchy

Figure 24:
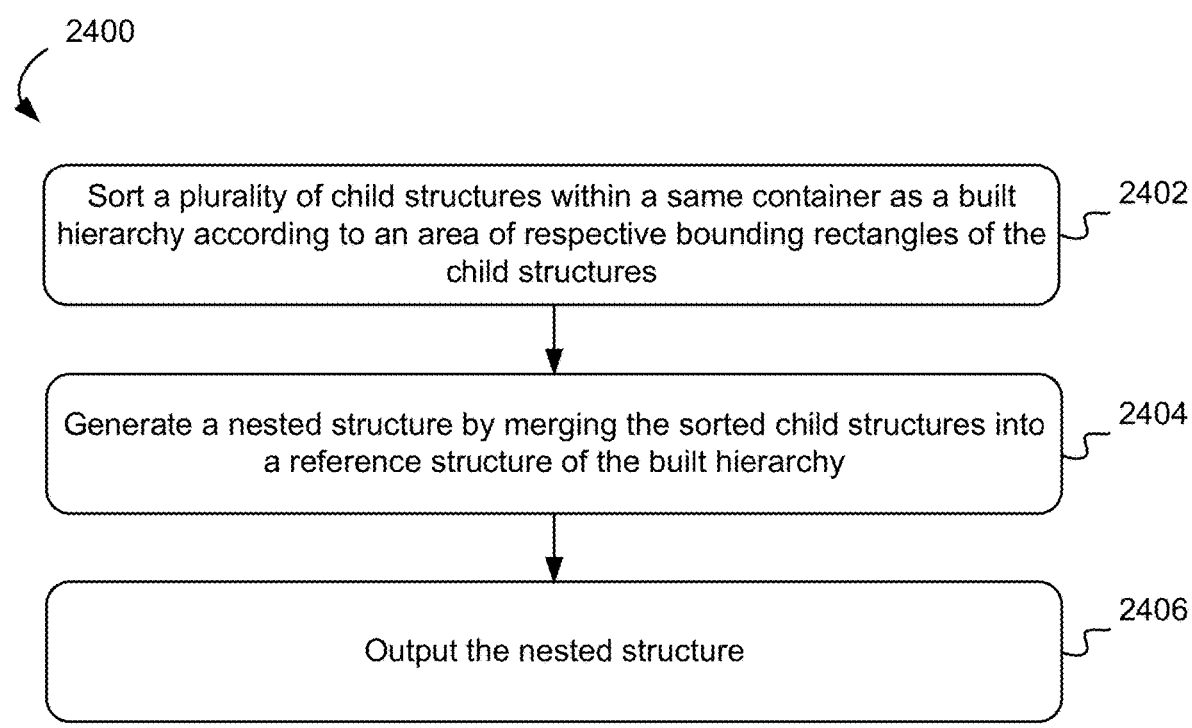
FIG. 24 depicts a simplified flowchart of a method for merging child structures into a hierarchy, according to one implementation.

In accordance with one illustrative implementation, a method 2400 for merging child structures into a hierarchy representing horizontal and vertical graphical lines depicted on a page of a document, particularly a business document, is shown in FIG. 24. The method 2400 may be implemented in any suitable manner, and may be employed in combination with any other processes and/or aspects thereof as described herein without limitation, unless otherwise expressly indicated. Moreover, method 2400 may be implemented in any suitable environment or form, such as a set of computer program instructions configured to cause a computer (or components thereof, such as a processor, etc.) to perform the steps of method 2400.

With continuing reference to detecting and building hierarchies, this process may also include merging child structures into the built hierarchy, e.g. according to a process 2400, as shown in FIG. 24, and according to one embodiment involves performing the following operations.

In operation 2402, child structures (e.g., children in the container referenced in operation 2314) are sorted according to the area of their respective bounding rectangles, preferably from large to small. This advantageously allows process 2400 to locate larger structures first, and insert smaller structures inside already located structures (if needed).

The sorting operation advantageously sorts sub-structures (children) inside the hierarchy, which is particularly useful for representing a natural reading order in the final hierarchy representation. For example, according to one embodiment, if two children overlap along the y-axis but not the x-axis, sorting is performed only using the x-coordinate value of a center point of each child. Otherwise, children are sorted first by y-axis center point value, then again by x-axis center point value.

Operation 2404 includes merging the sorted child structures with the reference structure $R^{ref}$, forming a nested structure. If a given child rectangle is smaller than reference rectangle, operation 2404 involves performing an insertion of the child structure in the reference structure, forming the nested structure. Otherwise, if the given child rectangle and reference rectangles are equivalent, operation 2404 involves moving children from the child structure to the reference structure, and deleting the child.

Upon merging all child structures in the container into the reference structure $R^{ref}$, the resulting (detected) hierarchy is located within the resulting reference structure $R^{ref}$, which is output in operation 2406.

Detecting Uniform Grids in Hierarchy

Figure 25A:
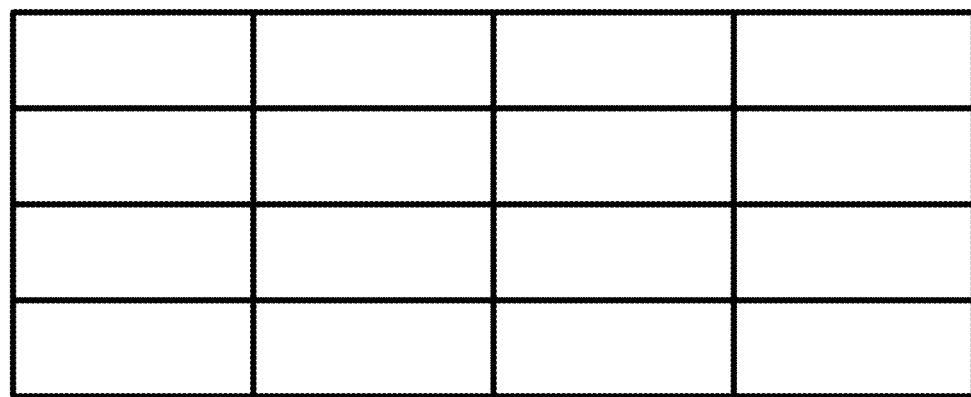
FIGS. 25A-25B depict simplified schematics of exemplary uniform grids, according to one implementation.
Figure 25B:
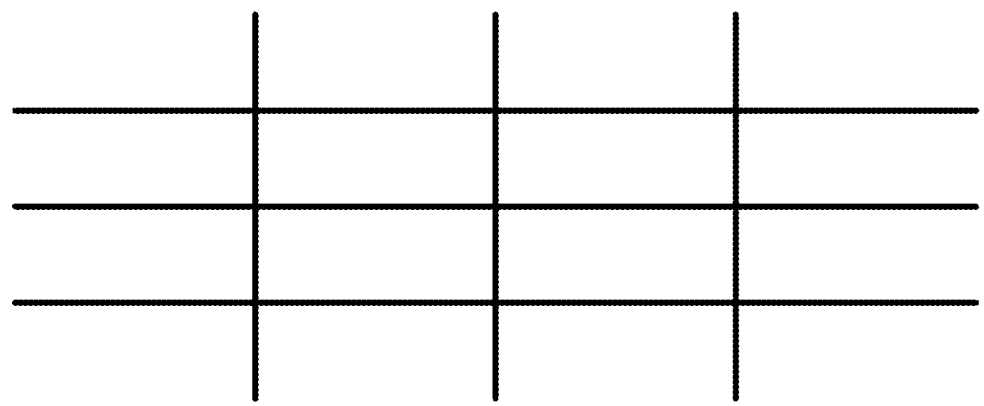

In some approaches, image segmentation may include detecting uniform grids. Uniform grids are unique structures that may exist as part of the hierarchy, wherein a set of adjacent cells form the typical table-like structure wherein each cell is (almost) the same size, aligned such that columns and rows may be formed, etc. For example, FIG. 25A depicts a simplified schematic of a uniform grid 2500, according to one embodiment. FIG. 25B depicts a simplified schematic of another example of a uniform grid 2510 (with open ended sides), according to another embodiment.

In preferred implementations, uniform grids are detected for, among others, the purpose of rendering the information contained therein in a way that reflects the grid-like structure. For example, most commonly, the information contained within grids is intended to be interpreted as a table, where column and/or row headers indicate meaning, etc. This intended meaning or the grid structure may be conveyed in textual form in many possible ways, e.g., using syntax such as inherent to JSON, XML, Markdown Language, or any other suitable data structure or language as would be appreciated by those having ordinary skill in the art upon reading the present disclosure.

Hierarchy Aggregation and Reconciliation

Having identified OMR elements, Text elements, and Image elements (and corresponding higher-level structures of each type as described above) and built respective hierarchies therefor, the inventive concepts preferably include an aggregation and reconciliation process to fully integrate the various types of information into a single, fully descriptive hierarchy representing all information on the page. According to various embodiments, the Image Hierarchy may be, and preferably is, guaranteed to be a complete hierarchy (i.e., all children have parents leading to the root, which again, corresponds to the image of the entire page) while Text and/or OMR hierarchies may be partial (i.e., all children do not necessarily have a parent). In order for the final, aggregated and reconciled hierarchy to be complete, in preferred embodiments the presently described inventive concepts involve incorporating Text and OMR hierarchies into the Image hierarchy.

Adding Optical Marks to Hierarchy

Adding OMR elements, such as OMR Groups, OMR Values, OMR Keys, and/or OMR Selections, involves creating a unified representation of the page by adding the results of Optical Mark Recognition as discussed hereinabove to the hierarchy.

In one approach, Simple OMR Groups (e.g., OMR Groups with only two children, where one child is an OMR Key, and the other child is an OMR Selection) are added as TEXT nodes in the hierarchy. Similarly, any remaining OMR Key (i.e. that is not part of a Simple OMR Group) is added as a TEXT node in the hierarchy. Moreover, Composite OMR Groups (e.g., any OMR Group that is not a Simple OMR Group) and OMR Values are added as CELL nodes to the hierarchy.

Adding Text to Hierarchy

Adding text, such as text elements, segments, blocks, and/or columns, involves creating a unified representation of the page by adding the results of text segmentation as discussed hereinabove to the hierarchy.

In one approach, text columns are added as CELL nodes in the hierarchy, i.e., as if the bounding rectangle of the text column were delimited by graphical lines. Each text column is preferably inserted into the hierarchy according to its defining rectangle, e.g., in similar manner as inserting a node into a tree structure (or, optionally, replacing the node if e.g. a text column corresponds to an existing cell defined by graphical lines).

Moreover, in some approaches text blocks are added into the hierarchy as a unique node type called "TEXT". Conversely, in certain implementations CELL nodes may be created either from text columns or from graphical lines during hierarchy detection. Again, for each text block, a corresponding TEXT node is inserted (or replaced) into the hierarchy based upon the bounding rectangle of the text block. Note that in some approaches, TEXT nodes may be added to the hierarchy as described above with reference to Simple OMR Groups in the section entitled "Adding Optical Marks to Hierarchy".

In various approaches, inclusion of text to the hierarchy produced via hierarchy detection and/or grid detection may be accomplished using a similar process of finding children for a given element of the hierarchy, and merging valid children with the parent to extend the tree. Accordingly, similar operations as described hereinabove for finding rectangular coverings, searching for covering structures, detecting and embedding teeth, detecting and building the hierarchy, etc., may be employed in the context of adding text to the hierarchy.

Narrative Generation

Having identified various text elements, graphical elements, and structural information describing the same, as well as deriving the order and hierarchy of the document, the next step of the presently described inventive concepts involves rendering that hierarchy into a textual form, i.e., into a narrative. According to various approaches, this may include rendering the hierarchy representation, which is created as described hereinabove, using syntax, e.g., such as inherent to various tree-based data structures or computer languages (e.g. XML, HTML, etc.). According to a preferred implementation, the hierarchy may be rendered as a JSON object.

As will be understood by those having ordinary skill in the art upon reading the present disclosure, there are many ways in which the hierarchy can be rendered. For example, the simplest rendering involves creating a "flat" representation where only the leaves of the tree are listed, in the correct order. In another approach, the hierarchy may be rendered exhaustively, where every node in the hierarchy tree would be a node in the data structure, and many of these nodes would "contain" other nodes, i.e. their children. Of course, skilled artisans will appreciate myriad other possibilities between these two extremes upon reading the present descriptions, which may be implemented in any suitable manner without departing from the scope of the inventive concepts disclosed herein.

Notably, in the context of rendering images of documents, particularly business documents, into textual representations capable of being fully understood by generative models such as LLMs, the inventors found experimentally that an exhaustive representation can be counter-productive for extraction purposes, i.e., the included information served to distract more than facilitate. Accordingly, in various approaches and applications it may be advantageous to prune or simplify information before or after rendering the information (including the hierarchy, text segments, graphical lines, etc.) into textual form. The particular manner of such pruning or simplification may vary according to the application, type of information being transformed, type of subject matter, etc. as would be understood by those having ordinary skill in the art upon reading the present disclosure.

In any event, according to preferred implementations, the rendering of the hierarchy (and included text elements, etc.) to generate the narrative is based at least in part on the natural reading order of the language depicted in the document.

In general, representing the determined hierarchy involves rendering the hierarchy into a structured, textual representation, also referred to herein as a "narrative". This may be accomplished in many possible ways. In general, some kind of structured textual representation such as JSON or XML would be used to render the text within the hierarchy in a way that the hierarchical information conveyed by the layout is preserved. Several possible examples are presented hereinbelow, by way of illustration rather than limitation.

For instance, a column node and its sub-nodes may be represented by a JSON structure, according to one illustrative approach. Notably, each node in the hierarchy text (which may be, and preferably also is a tree-based structure) should be accompanied by information defining the location of that node on the page in question. This can be done, according to one approach, explicitly using a page index and four coordinates that define a rectangle. Alternatively, defining the location of nodes can be performed equivalently via a node ID that can then be used as a reference from which the literal location information (page index, rectangle) may be indexed (e.g. create a mapping of node IDs to node locations, then looking up the location as necessary).

In another embodiment, the hierarchy may be represented more simply, wherein only the leaves of the hierarchy tree are rendered into the textual representation, and the higher-level nodes in the hierarchy tree (not leaves) are used only to order the leaves within the textual representation (e.g. via the usual ways in which trees may be traversed). In this way, the hierarchy information is implicit in the textual representation rather than explicit (as above for the column).

For example, consider the illustrative page snippet 2600 as shown in FIG. 26, which contains several text blocks that are outside of any cell, and other text blocks that reside within a cell.

One way of rendering this information would be to explicitly indicate this hierarchy (e.g. via nested nodes in JSON). Another way is to indicated the hierarchy implicitly and only render the leaves in the correct order. For example, and with reference to the exemplary JSON structure 2700 shown in FIG. 27, the JSON keys 1,2,3, etc. are node IDs the indicate location and the JSON values are the textual value of each node.

There are many other possible ways to render the hierarchy into a textual narrative as well. Which is best depends on the use case, i.e., what would be the downstream processing of the narrative. For example, if extraction is the purpose, then explicitly grouping the items within the box does not provide any advantage (since the information is not strictly related).

However, there are other possible cases wherein maintaining the explicit hierarchy information would be advantageous. For instance, considering the above example where there are two boxes, one for person A and one for person B, maintaining the correspondence between the person in question and the associated text blocks would be important to understanding the intended meaning of the graphical layout.

According to one illustrative implementation, hierarchy representation may include the following concepts and operations.

Any hierarchical node may be represented by its bounding rectangle and a list of child entities (which can be an empty list, e.g., in the case there are no children). Depending on the data structure representation tactics (e.g., syntax), some hierarchical nodes could be represented with its concatenated textual content (e.g., CELL, ROW, COLUMN, NESTED, TEXT, TEETH, GRID). These nodes are preferably provided with a list of document field IDs, and characteristics of each are detailed below, according to an exemplary approach.

Figure 28:
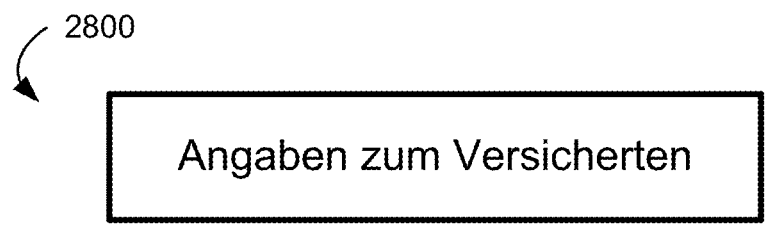
FIG. 28 is a simplified schematic of a TEXT node of a hierarchy, according to one illustrative implementation.

A "TEXT node" 2800, such as shown in FIG. 28 according to one approach, represents a text region on a page and meets the following requirements: (1) the corresponding list of children is always empty; (2) the node has textual value that is represented as a string ("Angaben zum Versicherten" as shown in FIG. 28A); (3) insertion of the TEXT node into the representation does not change the parent node type; (4) if inserting a first TEXT node into a second TEXT node, the insertion is performed next to the second TEXT node and both TEXT nodes are placed at the same level of the hierarchy; (5) if, during insertion, the TEXT node overlaps with any other structure, the TEXT node is given priority and the other structure is removed or reconstructed into one or more children of the TEXT node. Such information may be represented, according to an exemplary approach, as a tree-based data structure, preferably a JSON object.

Figure 29:
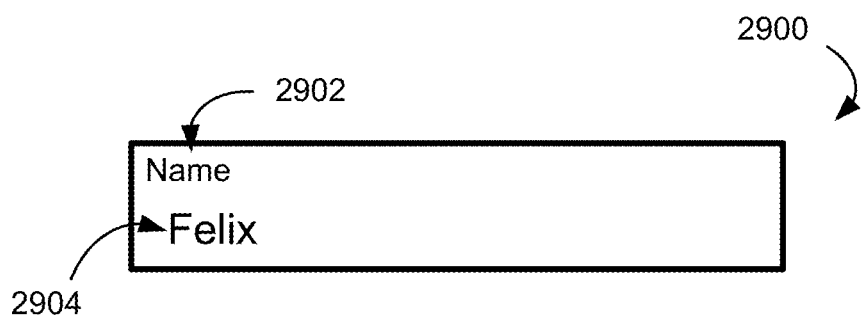
FIG. 29 is a simplified schematic of a CELL node of a hierarchy, according to one illustrative implementation.

Moreover, a "CELL node" preferably represents a unit node in a hierarchy and does not contain any children except TEXT nodes (also, in some approaches, inserting any non-TEXT node into a CELL node converts the CELL node into a "NESTED" node. Depending on the tactics of hierarchy representation, CELL nodes may contain separated text entities (e.g., a field label 2902 and corresponding value 2904 as shown for CELL node 2900 in FIG. 29 according to one embodiment) or concatenated text sequence with a corresponding concatenated list of field IDs. Such information may be represented, according to an exemplary approach and as would be understood by a person having ordinary skill in the art upon reading the present descriptions, as a tree-based data structure, preferably a JSON object.

Figure 30:
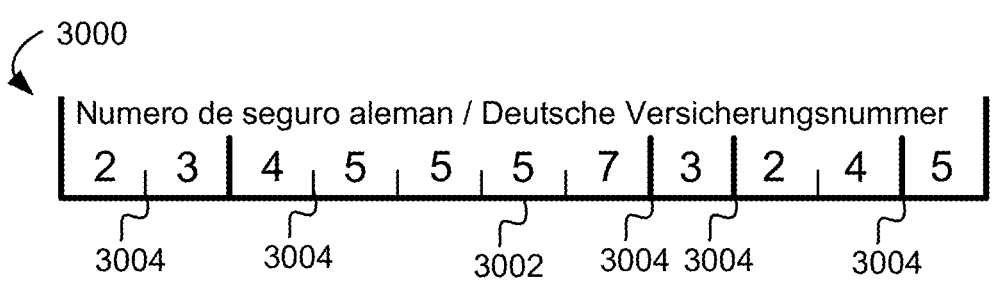
FIG. 30 is a simplified schematic of a TEETH node of a hierarchy, according to one illustrative implementation.

With continuing reference to the exemplary implementation of hierarchy representation, a structure that has specific geometrical pattern without top horizontal edges, with uniform bottom horizontal edge(s) 3002 and with at least one upper-directed vertical edge 3004, such as shown in FIG. 30 form CELL nodes within a TEETH node. TEETH nodes also satisfy the following criteria, and according to one implementation, may be represented, according to an exemplary approach and as would be understood by a person having ordinary skill in the art upon reading the present descriptions, as a tree-based data structure, preferably a JSON object.

Moreover, TEETH nodes satisfy the following criteria, according to preferred implementations: (1) TEETH nodes contain at least one CELL child node; (2) all CELL child nodes of a given TEETH node are adjacent and horizontally aligned; (3) TEETH nodes may contain TEXT child nodes that are not entirely owned by any of the CELL child nodes of the TEETH node; (4) the content (or unstructured text) of TEETH nodes is concatenated, with delimiters (such as space characters, although other delimiters may be implemented without departing from the scope of the inventive concepts discussed herein). In preferred approaches, if something other than a TEXT node is inserted into a CELL child node of a TEETH node, the TEETH node is reclassified as a NESTED node.

In certain embodiments, and as shown in one illustrative implementation in FIG. 31 ROW nodes 3100 correspond to regions of a document that resemble a row of a table. ROW nodes preferably satisfy at least two criteria: (1) each ROW node contains at least two child nodes 3102, 3104; and (2) the child nodes of a ROW node are adjacent and horizontally aligned, such as shown in 31. ROW nodes may be represented, according to an exemplary approach and as would be understood by a person having ordinary skill in the art upon reading the present descriptions, as a tree-based data structure, preferably a JSON object.

In more embodiments, COLUMN nodes correspond to regions of a document that resemble a column of a table, such as exemplified in FIG. 32 via column node 3200. COLUMN nodes preferably satisfy at least two criteria: (1) each COLUMN node contains at least two child nodes (e.g., child nodes 3202, 3204, 3206, and 3208 as shown in FIG. 32); and (2) the child nodes of a COLUMN node are adjacent and vertically aligned. COLUMN nodes may be represented, according to an exemplary approach and as would be understood by a person having ordinary skill in the art upon reading the present descriptions, as a tree-based data structure, preferably a JSON object.

Figures 33, 34:
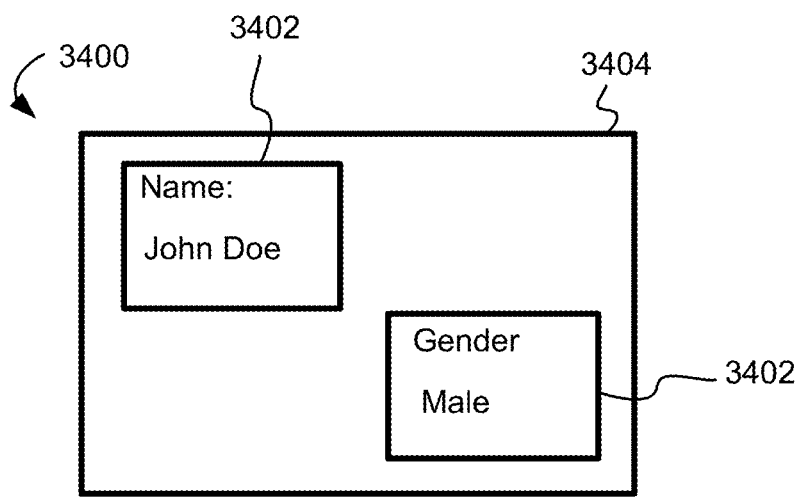
FIG. 33 is a simplified schematic of a TABLE node of a hierarchy, according to one illustrative implementation.
FIG. 34 is a simplified schematic of a NESTED node of a hierarchy, according to one illustrative implementation.

GRID nodes, in accordance with the preferred implementation, represent a table, and: (1) contain at least two child ROW nodes which, in turn, include only CELL nodes that are vertically aligned; (2) the child ROW nodes of the GRID node are adjacent and vertically aligned. One example of a GRID node 3300 is shown in FIG. 33. GRID nodes may also be represented, according to an exemplary approach and as would be understood by a person having ordinary skill in the art upon reading the present descriptions, as a tree-based data structure, preferably a JSON object. Preferably, the child ROW nodes of a GRID node are provided with indices, as are child CELL nodes of the ROW nodes. In some approaches, the representation of GRID nodes includes all constituent nodes, even if empty (e.g., devoid of text).

NESTED nodes, as mentioned above, are created under certain conditions upon attempting to assert select node types into other particular node types. According to the preferred implementation, and as shown in FIG. 34, NESTED nodes 3400 include non-aligned child node entities 3402 within a larger bounding rectangle 3404, and the child node(s) refer to the same parent node. COLUMN nodes may be represented, according to an exemplary approach and as would be understood by a person having ordinary skill in the art upon reading the present descriptions, as a tree-based data structure, preferably a JSON object.

Page Aggregation

Documents may, of course, be comprised of several pages, and the resulting textual narrative preferably encompass all pages (i.e. one narrative for an entire document, not one narrative for each page). This may be accomplished in various ways.

For example, in one approach, pages may be processed separately (advantageously creating separate hierarchies and separate narratives for each page independently) may then be joined into one document-level narrative. This is possible because the narrative is text, and one may append data structure (e.g., JSON) nodes into a contiguous stream of pages.

Alternatively, all page images may be joined into a single composite image for the entire document, and hierarchy detection and text rendering may be performed on the resulting composite image. For example, in one approach, on page N all x-coordinates would be unchanged, but y-coordinates would take into account the page heights on the preceding (N−1) pages (y=y+sum (heights)).

In still further approaches, features from a composite image (particularly graphical lines and text) may be combined into a single structure without page boundaries, and used for Hierarchy Detection purposes.

General Computing Concepts

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 35:
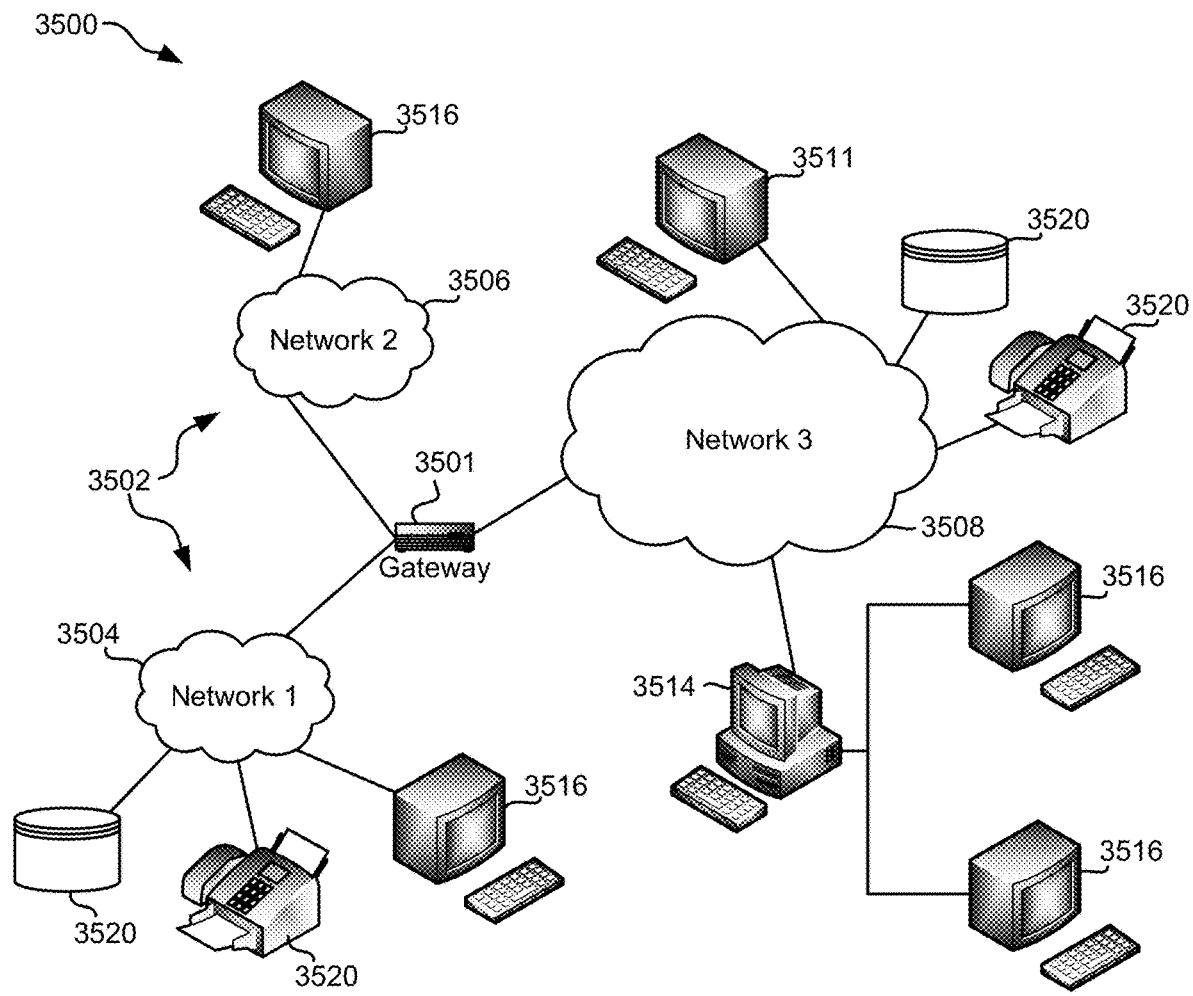
FIG. 35 illustrates an architecture, in accordance with one embodiment.

FIG. 35 illustrates an architecture 3500, in accordance with one embodiment. As an option, the present architecture 3500 may be implemented in conjunction with features from any other embodiment listed herein, such as those described with reference to the other FIGS. Of course, however, such architecture 3500 and others presented herein may be used in various applications and/or in permutations which may or may not be specifically described in the illustrative embodiments listed herein. Further, the architecture 3500 presented herein may be used in any desired environment.

As shown in FIG. 35, a plurality of remote networks 3502 are provided including a first remote network 3504 and a second remote network 3506. A gateway 3501 may be coupled between the remote networks 3502 and a proximate network 3508. In the context of the present network architecture 3500, the networks 3504, 3506 may each take any form including, but not limited to a LAN, a WAN such as the Internet, public switched telephone network (PSTN), internal telephone network, etc.

In use, the gateway 3501 serves as an entrance point from the remote networks 3502 to the proximate network 3508. As such, the gateway 3501 may function as a router, which is capable of directing a given packet of data that arrives at the gateway 3501, and a switch, which furnishes the actual path in and out of the gateway 3501 for a given packet.

Further included is at least one data server 3514 coupled to the proximate network 3508, and which is accessible from the remote networks 3502 via the gateway 3501. It should be noted that the data server(s) 3514 may include any type of computing device/groupware. Coupled to each data server 3514 is a plurality of user devices 3516. Such user devices 3516 may include a desktop computer, laptop computer, hand-held computer, printer or any other type of logic. It should be noted that a user device 3511 may also be directly coupled to any of the networks, in one embodiment.

A peripheral 3520 or series of peripherals 3520, e.g., facsimile machines, printers, networked storage units, etc., may be coupled to one or more of the networks 3504, 3506, 3508. It should be noted that databases, servers, and/or additional components may be utilized with, or integrated into, any type of network element coupled to the networks 3504, 3506, 3508. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 3504, 3506, 3508, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 36:
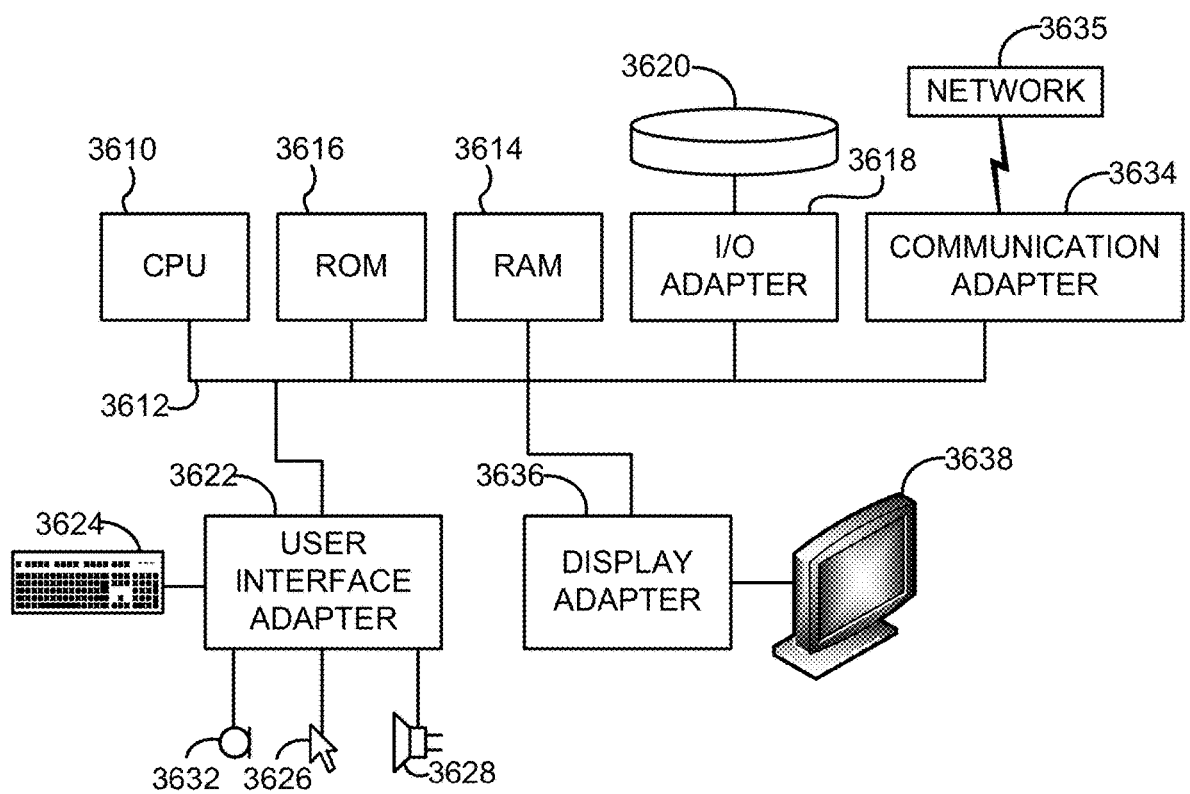
FIG. 36 illustrates a representative hardware environment associated with a user device and/or server of FIG. 35, in accordance with one embodiment.

FIG. 36 shows a representative hardware environment associated with a user device 116 and/or server 114 of FIG. 1, in accordance with one embodiment. Such figure illustrates a typical hardware configuration of a workstation having a central processing unit 3610, such as a microprocessor, and a number of other units interconnected via a system bus 3612.

The workstation shown in FIG. 36 includes a Random Access Memory (RAM) 3614, Read Only Memory (ROM) 3616, an I/O adapter 3618 for connecting peripheral devices such as disk storage units 3620 to the bus 3612, a user interface adapter 3622 for connecting a keyboard 3624, a mouse 3626, a speaker 3628, a microphone 3632, and/or other user interface devices such as a touch screen and a digital camera (not shown) to the bus 3612, communication adapter 3634 for connecting the workstation to a communication network 3635 (e.g., a data processing network) and a display adapter 3636 for connecting the bus 3612 to a display device 3638.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

While the foregoing inventive concepts are presented above in the form of methods, it shall be understood said concepts are equally capable of being implemented in other forms, e.g., in the form of a computer program product including a computer readable storage medium having program instructions embodied therewith and configured to cause a computing device, upon execution thereof, to perform the foregoing method(s), portion(s) thereof, combination(s) thereof, and/or permutation(s) thereof. Similarly, the inventive concepts presented herein may be embodied as systems, e.g., systems including a processor and logic executable by the processor to cause the processor to perform the foregoing method(s), portion(s) thereof, combination(s) thereof, and/or permutation(s) thereof.

Moreover, the inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the claims and their equivalents.

What is claimed is:

1. A computer-implemented method for automated transformation of information present in one or more document images into a textual representation, the method comprising:
   hierarchically segmenting:
      a plurality of optical marks depicted in the one or more document images;
      a plurality of text elements depicted in the one or more document images; and
      a plurality of regions of the one or more document images, wherein the plurality of regions are defined by graphical lines depicted in the one or more document images, and
   wherein hierarchically segmenting the plurality of regions comprises:
      aligning some or all of the plurality of graphical lines;
      building a graph representing the aligned graphical lines;
      initializing a hierarchy representing the plurality of regions; and
      detecting additional elements and/or structures of the initialized hierarchy; and
   aggregating and reconciling the hierarchically segmented plurality of optical marks, the hierarchically segmented plurality of text elements, and the hierarchically segmented plurality of regions into a single hierarchy; and
   generating a textual narrative based on the single hierarchy.

2. The computer-implemented method as recited in claim 1, wherein hierarchically segmenting the plurality of optical marks comprises:
   determining a plurality of optical mark segments, wherein the plurality of optical mark segments comprise optical mark keys, optical mark selections, optical mark values, and optical mark groups; and
   determining relationships between some or all of the plurality of optical mark segments.

3. The computer-implemented method as recited in claim 1, wherein hierarchically segmenting the plurality of text elements comprises:
   determining a plurality of text blocks based at least in part on the plurality of text elements; and
   determining one or more text columns based at least in part on the plurality of text blocks.

4. The computer-implemented method as recited in claim 1, wherein the graph is an orthogonal, quad-edge graph.

5. The computer-implemented method as recited in claim 1, wherein detecting the additional elements and/or structures of the initialized hierarchy comprises:
   finding a rectangular covering for the initialized hierarchy;
   searching for coverings within the initialized hierarchy;
   building the additional elements and/or structures into the initialized hierarchy; and
   merging child structures into the initialized hierarchy.

6. The computer-implemented method as recited in claim 1, wherein the aggregating and reconciling comprises:
   merging a first hierarchy representing the hierarchically segmented plurality of optical marks and a second hierarchy representing the hierarchically segmented plurality of text elements into a third hierarchy representing the hierarchically segmented plurality of regions to create the single hierarchy.

7. The computer-implemented method as recited in claim 1, wherein generating the textual narrative comprises: rendering the single hierarchy into a tree-based data structure.

8. The computer-implemented method as recited in claim 1, wherein the textual narrative is arranged according to a natural reading order of a language depicted in the one or more document images.

9. The computer-implemented method as recited in claim 1, wherein the single hierarchy represents structured information of the one or more document images and unstructured information of the one or more document images.

10. A computer-implemented method for automated transformation of information present in one or more document images into a textual representation, the method comprising:
   interpreting, using an intelligent narrator, structured information and unstructured information present on one or more document images to generate a computer data structure comprising a narrative representing the structured information and the unstructured information;
   wherein generating the narrative is based at least in part on a natural reading order of a language depicted in the one or more document images;
   wherein the natural reading order of the language comprises:
      a natural starting position for reading the language;
      a natural end position for reading the language; and
      an orientation of textual elements according to the language; and
   wherein the natural starting position is selected from the group consisting of: a top-left portion of the one or more document images, a top-right portion of the one or more document images, a bottom-left portion of the one or more document images, a bottom-right portion of the one or more document images, a top-left portion of a given segment depicted in the one or more document images, a top-right portion of the given segment depicted in the one or more document images, a bottom-left portion of the given segment depicted in the one or more document images, and a bottom-right portion of the given segment depicted in the one or more document images;
   wherein the natural end position is selected from the group consisting of: the top-left portion of the one or more document images, the top-right portion of the one or more document images, the bottom-left portion of the one or more document images, the bottom-right portion of the one or more document images, the top-left portion of the given segment depicted in the one or more document images, the top-right portion of the given segment depicted in the one or more document images, the bottom-left portion of the given segment depicted in the one or more document images, and the bottom-right portion of the given segment depicted in the one or more document images; and wherein the orientation of textual elements is selected from the group consisting of: left-to-right, right-to-left, top-to-bottom, bottom-to-top, and combinations thereof.

11. The computer-implemented method as recited in claim 10, wherein generating the narrative comprises:
performing image segmentation and/or text segmentation on the one or more document images, wherein performing the image segmentation and/or text segmentation identifies:
a plurality of segments represented on the one or more document images; and
any content within each segment;
ordering the identified segments based at least in part on:
geometric relationships between the plurality of segments; and
the natural reading order of a language in which the content is represented;
ordering the content, if any, within each segment, wherein the ordering of the content is based at least in part on the natural reading order of a language in which the content is represented; and
generating a data structure representing a structure of the one or more document images, wherein the data structure is generated based at least in part on either or both of:
the ordering of the plurality of segments; and/or
the ordering of the content.

12. The computer-implemented method as recited in claim 11, wherein the structure of the one or more document images comprises a hierarchy of the plurality of segments.

13. The computer-implemented method as recited in claim 11, wherein performing the text segmentation and/or the image segmentation further comprises determining a hierarchy of the plurality of segments.

14. The computer-implemented method as recited in claim 11, wherein each segment corresponds to a unique rectangular region represented within the one or more document images.

15. The computer-implemented method as recited in claim 10, wherein the interpreting comprises employing, using the intelligent narrator, a plurality of expert modules, wherein each expert module is configured to perform one or more tasks selected from the group consisting of: image processing, text recognition, optical mark recognition, image segmentation, text segmentation, narrative generation, and page aggregation; and
wherein the method further comprises:
orchestrating execution, by a hardware processor, of the plurality of expert modules, wherein orchestrating the execution of the plurality of modules involves controlling the order in which the modules are executed; and
resolving conflicts within some or all results of executing the plurality of expert modules to generate resolved results.

16. The computer implemented method as recited in claim 15, wherein some or all of the expert modules independently comprise at least one neural network.

17. The computer-implemented method as recited in claim 15, wherein the optical mark recognition comprises:
identifying a plurality of optical marks depicted within the one or more document images, wherein the plurality of optical marks comprise a plurality of graphical lines each independently associated with one or more text elements;
determining a status of the plurality of optical marks; and
building an optical mark element hierarchy of the plurality of optical marks.

18. The computer-implemented method as recited in claim 17, wherein identifying the plurality of optical marks utilizes a visual object detection machine learning technique.

19. The computer-implemented method as recited in claim 17, wherein identifying the plurality of optical marks utilizes a heuristic image processing technique.

20. The computer-implemented method as recited in claim 17, wherein identifying the plurality of optical marks utilizes a combination of a visual object detection machine learning technique and a heuristic image processing technique.

21. The computer-implemented method as recited in claim 15, wherein the text segmentation comprises:
creating a plurality of text segments based at least in part on text elements represented within the one or more documents;
creating a plurality of text blocks based at least in part on the plurality of text segments; and
creating a plurality of text columns based at least in part on the plurality of text blocks.

22. The computer-implemented method as recited in claim 15, wherein the image segmentation comprises:
aligning a plurality of graphical lines depicted on the one or more document images;
building a graph representing the aligned graphical lines;
initializing a hierarchy based at least in part on the graph;
detecting additional elements and/or structures of the hierarchy based at least in part on the graph.

23. The computer implemented method as recited in claim 22, further comprising aggregating and reconciling the additional elements and/or structures of the initialized hierarchy to generate a final hierarchy representing the structured information and the unstructured information present on the one or more document images.

24. The computer-implemented method as recited in claim 15, wherein the narrative generation comprises generating a data structure representing a hierarchy of the structured information and the unstructured information present on the one or more document images.

25. The computer-implemented method as recited in claim 24, wherein the hierarchy comprises:
a plurality of optical mark recognition (OMR) elements recognized by performing the optical mark recognition task;
a plurality of text segments, text blocks, and/or text columns identified by performing the text segmentation task; and
a plurality of image segments identified by performing the image segmentation task.

26. The computer-implemented method as recited in claim 24, wherein the narrative is a textual representation of the hierarchy.

27. The computer-implemented method as recited in claim 26, wherein the textual representation is arranged according to a natural reading order of a language depicted in the one or more document images.

* * * * *